(12) United States Patent
Eguchi

(10) Patent No.: US 10,032,257 B2
(45) Date of Patent: *Jul. 24, 2018

(54) SUPER RESOLUTION PROCESSING METHOD, DEVICE, AND PROGRAM FOR SINGLE INTERACTION MULTIPLE DATA-TYPE SUPER PARALLEL COMPUTATION PROCESSING DEVICE, AND STORAGE MEDIUM

(71) Applicant: Lightron International Co., Ltd., Saitama (JP)

(72) Inventor: Mitsuo Eguchi, Saitama (JP)

(73) Assignee: Lightron International Co. Ltd., Saitamashi Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/115,994

(22) PCT Filed: Dec. 26, 2014

(86) PCT No.: PCT/JP2014/084484
§ 371 (c)(1),
(2) Date: Aug. 2, 2016

(87) PCT Pub. No.: WO2015/115018
PCT Pub. Date: Aug. 6, 2015

(65) Prior Publication Data
US 2017/0186140 A1 Jun. 29, 2017

(30) Foreign Application Priority Data
Feb. 3, 2014 (JP) ................. 2014-018700

(51) Int. Cl.
*G06T 5/00* (2006.01)
*G06T 1/20* (2006.01)
*G06T 3/40* (2006.01)

(52) U.S. Cl.
CPC ............ *G06T 5/003* (2013.01); *G06T 1/20* (2013.01); *G06T 3/4053* (2013.01);
(Continued)

(58) Field of Classification Search
None
See application file for complete search history.

(56) References Cited

U.S. PATENT DOCUMENTS 5,535,291 A * 7/1996 Spencer ............... G06T 5/002
382/254
2006/0245667 A1* 11/2006 Lertrattanapanich G06K 9/0051
382/275

(Continued)

FOREIGN PATENT DOCUMENTS

JP 2009-65333 3/2009
JP 2011-128978 12/2009

(Continued)

OTHER PUBLICATIONS

Sang Cheol Park, Min Kyn Park, Moon Gi Kang *Super-Resolution Image Reconstruction: A Technical Overview* IEEE Signal Processing Magazine. May 2003.

*Primary Examiner* — Ryan D McCulley
(74) *Attorney, Agent, or Firm* — Harrington & Smith

(57) ABSTRACT

Method, device, and program for solving the problem where a conventional image restoration method based on Bayesian probability theory uses nonlinear equations and requires a plurality of convolution operations, thereby not being appropriate for a single interaction multiple data-type (SIMD) super parallel computation processing device. This provides a method in which a computer causes a SIMD super parallel computation device to assign operations which include one convolution operation based on a Bayesian probability theory linear equation; a device based on the method; first and third programs for causing a computer to execute the (Continued)

program, and second and fourth programs for configuring the device to the computer and causing the device to run; and storage mediums for storing the programs. Optical degradation contained in TV video and images is reduced thereby restoring the TV video and images to a state close to the pre-degradation state of the TV video and images.

5 Claims, 31 Drawing Sheets

(52) U.S. Cl.
CPC .............................. *G06T 2200/28* (2013.01); *G06T 2207/10016* (2013.01); *G06T 2210/52* (2013.01)

(56) References Cited

U.S. PATENT DOCUMENTS

| | | | |
|---|---|---|---|
| 2009/0324029 A1* | 12/2009 | Araikum | G06T 5/003 382/128 |
| 2010/0214472 A1 | 8/2010 | Tomonaga | |
| 2012/0105655 A1 | 5/2012 | Ishii et al. | 348/208.4 |
| 2014/0223368 A1* | 8/2014 | Nakano | G06F 3/04845 715/810 |
| 2014/0267915 A1* | 9/2014 | Bailey | H04N 5/14 348/575 |
| 2014/0348441 A1* | 11/2014 | Tezaur | G06T 5/003 382/255 |
| 2016/0055628 A1* | 2/2016 | Hayashi | H04N 5/23212 382/254 |
| 2016/0171667 A1* | 6/2016 | Tezaur | G06T 5/003 382/275 |
| 2017/0287117 A1* | 10/2017 | Ebihara | G06T 5/002 |

FOREIGN PATENT DOCUMENTS

| | | |
|---|---|---|
| JP | 4521468 B1 | 8/2010 |
| JP | 2011-165013 | 8/2011 |
| JP | 2013-003610 | 1/2013 |
| WO | WO 2005/069217 A2 | 7/2005 |
| WO | WO 2006/041126 A1 | 4/2006 |
| WO | WO 2006/041127 A1 | 4/2006 |
| WO | WO 2011/099244 A1 | 5/2012 |

* cited by examiner

Fig.10

[41]: FIRST CUMULATIVE-SUM COMPUTATION AREA   [42]: SECOND CUMULATIVE-SUM COMPUTATION AREA
[43]: CUMULATIVE-SUM COMPUTATION AREA
[44]: ADDITION DATASET   [45]: RESTORED-IMAGE-PIXEL-VALUE AREA
FC (i, j) ··· VALUE OF PIXEL AT COORDINATES (i, j) OF CORRECTED-RESTORED-IMAGE INITIAL VALUES 6
H (h, k) ··· VALUE OF PIXEL AT COORDINATES (h, k) OF PSF 4
F (l, m) ··· VALUE OF PIXEL AT COORDINATES (l, m) OF RESTORED-IMAGE INITIAL VALUES 5
G (n, o) ··· VALUE OF PIXEL AT COORDINATES (n, o) OF DEGRADED IMAGE 1
※ X ADDRESS VALUE AT LEFT OF EACH AREA SIGNIFIES BEGINNING X ADDRESS OF SAME AREA.

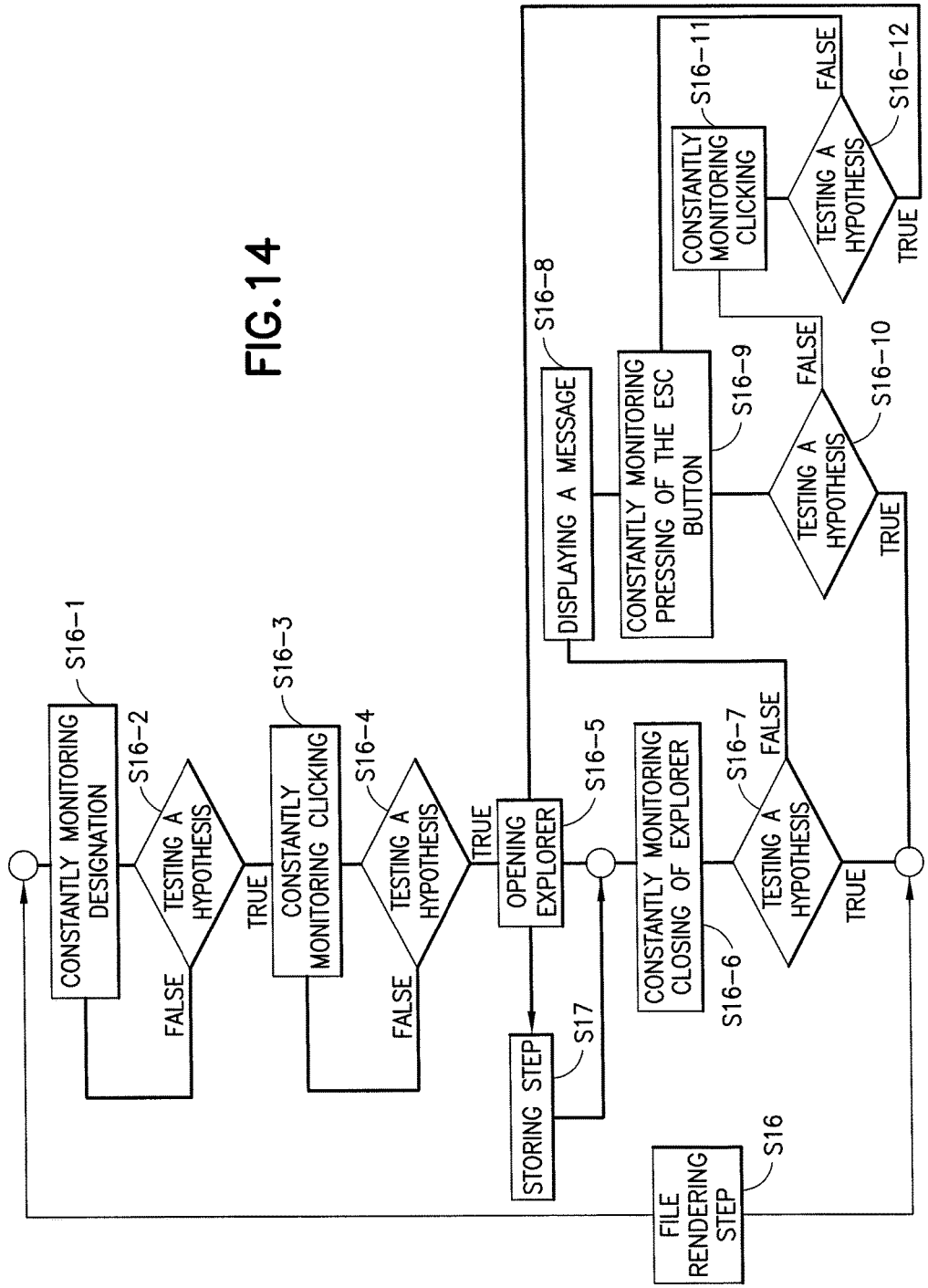

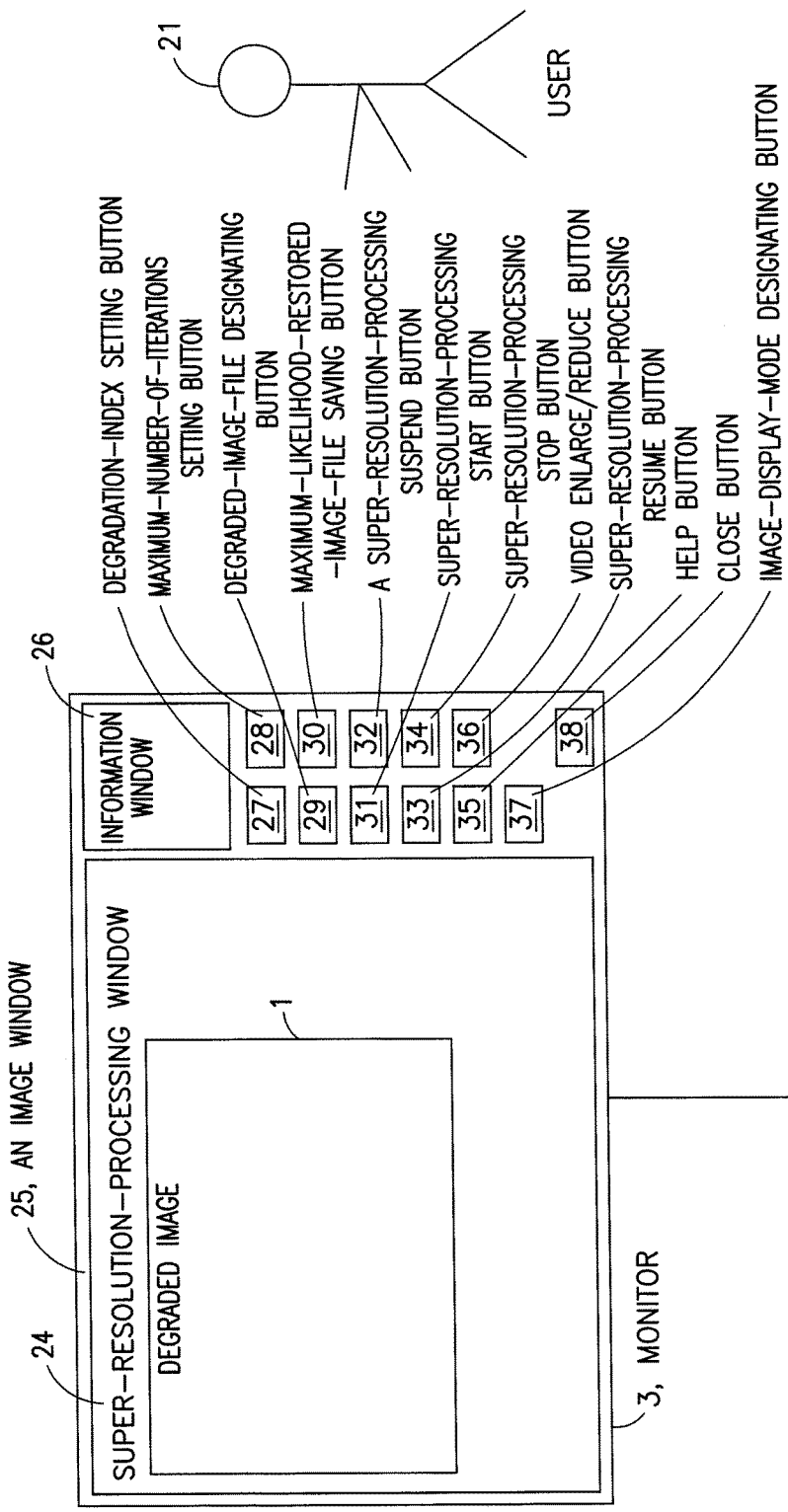

SUPER RESOLUTION PROCESSING METHOD, DEVICE, AND PROGRAM FOR SINGLE INTERACTION MULTIPLE DATA-TYPE SUPER PARALLEL COMPUTATION PROCESSING DEVICE, AND STORAGE MEDIUM

TECHNICAL FIELD

The present invention relates to image processing for SIMD (Single Instruction Multiple Data) super-parallel computational processing devices. In particular, the present invention relates to a super-resolution processing method and device for an SIMD super-parallel computational processing device and a TV-video super-resolution processing method and device for an SIMD super-parallel computational processing device, these methods and devices making it possible to remove degraded information included in images, such as optical blurring or unsharpness, by way of mathematical computational processing based on Bayesian probability theory, thereby restoring the images to original pre-degradation images, and also relates to first to fourth programs and first to fourth storage media.

BACKGROUND ART

Recently, technology that can process a variety of digital content substantially in real time, such as audio, image, and video, is commonly being used. For example, in terrestrial digital TV, substantially real-time processing of data exceeding 2M pixels/frame, such as 1080i (1920 (horizontal)×1080 (vertical), 29.97 frames/second), is required. For such applications, SIMD super-parallel computational processing devices have been developed. An SIMD super-parallel computational processing device includes a plurality of programmable arithmetic processor elements (PEs), and a single computation based on a single instruction is executed concurrently by all the PEs, thereby enabling high-speed computational processing. Depending on the algorithm used, however, data preparation in advance, post-processing of the obtained computation results, and/or data transfer constitutes a bottleneck in the overall speed, and this might prohibit high-speed operation. In an example configuration, an SIMD super-parallel computational processing device includes input and output memory blocks for storing data involved in processing, and a plurality of PEs that read data from the input memory block in units of a preset number of bits, such as 1, 2, 4, or 8 bits, and that execute computational processing and write the computation results to the output memory block in units of the same number of bits. The individual PEs are configured in the form of arrays and are connected to each other via channels, which allows concurrent processing for a variety of computations. Examples of SIMD super-parallel computational processing devices that are mass-produced include MX-G from Renesas Electronics Corporation and C-ViA from Toshiba Corporation.

In the case of terrestrial digital TV, there is a problem in that each frame constituting TV video includes degraded information, such as optical blurring or unsharpness, although it is not blurred to such an extent that objects in the frame are indistinguishable.

FIG. 1 shows an example of optically degraded information included in a frame of TV video. FIG. 1 includes two images: the left image represents a frame constituted only of Y (luminance) components of TV video acquired by using an X-ray pinhole camera; on the other hand, the right image represents an image restored by subjecting the left image in FIG. 1 to super-resolution processing using related art invented by the inventor of the present invention (Patent Literatures 1 and 2). A comparison between the images in FIG. 1 indicates that TV video before the super-resolution processing includes degraded information, such as optical blurring or unsharpness.

In the image restoration technologies invented by the inventor of the present invention (Patent Literatures 1 and 2), while repeating iterations according to formulas based on Bayesian probability theory for obtaining a restored image from information about one still image including degraded information, such as optical blurring or unsharpness, a maximum-likelihood OTF (Optical Transfer Function), which is a Fourier transform product of a maximum-likelihood PSF (Point Spread Function) having a maximum likelihood for the luminance distribution of the still image, as well as a maximum-likelihood restored image, are estimated through numerical computations. However, since the image restoration technologies employ algorithms involving computations executed in real space and in the spatial frequency domain according to nonlinear equations, it is necessary to execute a Fourier transform and an inverse Fourier transform multiple times per iteration, which results in a huge amount of computational processing. Thus, there has been a problem in that it is difficult to handle TV video, which requires real-time processing. Also, data preparation in advance, post-processing of the computation results, and data transfer constitute bottlenecks in the overall speed when using an SIMD super-parallel computational processing device. Thus, there has been a problem in that the algorithms are not suitable for SIMD super-parallel computational processing devices.

The inventor of the present application has filed a patent application, which is now on file, for technology L in which the inventor improved the image restoration technologies invented by himself (Patent Literatures 1 and 2) to allow substantially real-time processing of TV video. In technology L, the inventor changed the type of numbers handled in the computations in the image restoration technologies according to the related art (Patent Literatures 1 and 2) from complex numbers to real numbers and also changed the type of computational processing device from a software implementation to a hardware implementation using FPGAs (Field Programmable Gate Arrays), allowing substantially real-time processing. However, there have been problems in that the number of gates in the hardware implementation is as large as 1.5 million gates, and thus, costs are high and the installation area is large. Also, in order to realize substantially real-time processing, the possible number of iterations is six at most, and thus there has been a concern that this might result in inadequate robustness of super-resolution processing. Furthermore, since the algorithms used are based on nonlinear equations, there has been a problem in that data preparation in advance, post-processing of the computation results, and data transfer constitute bottlenecks in the overall speed when using an SIMD super-parallel computational processing device, which makes the algorithms unsuitable for SIMD super-parallel computational processing devices.

The image restoration ability of technology L is comparable to those of the image restoration technologies (Patent Literatures 1 and 2) in the case where a frame is not blurred to such an extent that objects in the frames are indistinguishable. However, convergence is so slow that there are many cases where about six iterations are required before an image is fully restored. Thus, problems may arise in terms of the processing speed for applications involving substantially real-time processing of TV video with a large screen, such as 2K to 4K, which requires even higher operation speeds and further improvement in the convergence speed. Accordingly, in order to further increase the operation speed of technology L, the inventor of the present invention improved the algorithms employing nonlinear equations based on Bayesian probability theory used in the image restoration technologies (Patent Literatures 1 and 2), thereby inventing an accelerated algorithm that employ nonlinear equations based on Bayesian probability theory, and has filed a patent application for this accelerated algorithm. In the TV-video super-resolution processing technology based on this accelerated algorithm, the PSF restoring step used in the image restoration technologies (Patent Literatures 1 and 2) and technology L is omitted. Furthermore, a first PSF associated with a degradation index corresponding to the degree of degradation of a degraded image and a second PSF obtained by sharpening the first PSF in advance are used. This makes it possible to provide an image restoration ability comparable to that of technology L just with two iterations by using Bayes probability formulas for obtaining a restored image from information about a still image including degraded information. With the TV-video super-resolution processing technology based on the accelerated algorithm, however, the amount of computation is still large since the algorithm is based on nonlinear equations. Furthermore, there has been a problem in that data preparation in advance, post-processing of the computation results, and data transfer constitute bottlenecks in the overall speed when using an SIMD super-parallel computational processing device, which makes the algorithm unsuitable for SIMD super-parallel computational processing devices.

As an example of an already disclosed algorithm invented by other inventors and suitable for super-parallel computational processing devices, there is a method in which image blurring is removed based on equation (1) by using an MISD (Multiple Instruction stream, Single Data stream) SAP (Systolic Array Processor) in which processors are arrayed two-dimensionally (Patent Literature 3). However, since this method involves iterations based on the linear equation according to equation (1), which are processed by the MISD SAP, there has been a problem that it is not directly applicable to an SIMD super-parallel computational processing device.

[Eq. 1]

$$U(n+1)=U(n)-k*(H*U(n)-Yb)-S*U(n) \qquad (1)$$

In equation (1), U signifies an original image, H signifies a PSF, Yb signifies a degraded image, k signifies a feedback operator, and S signifies a smoothing operator. These are all two-dimensional functions constituted of m×n elements. * signifies a two-dimensional convolution operator.

As other super-resolution algorithms based on linear equations, for example, in a method and device disclosed in Patent Literature 4, a state space model (a state equation constituted of an original image and an observation equation constituted of the original image and noise) is configured without estimating autoregression parameters of a degraded image, and image restoration is executed by using a Kalman filter on the state space model. With this method and device, however, there is a problem in that what is restored is only a region in the vicinity of a pixel of interest, not an entire image, and there is a possibility that the method and device were not developed for SIMD super-parallel computational processing devices.

CITATION LIST

Patent Literature

{PTL 1}
International Publication No.: Japanese Patent Publication No. 4568730 (WO2006/041127)
{PTL 2}
International Publication No.: Japanese Patent No. 4575387 (WO2006/041126)
{PTL3}
Patent Publication No.: WO2005/069217 A3
{PTL4}
Patent Publication No.: Japanese Unexamined Patent Application, Publication No. 2011-165013

SUMMARY OF INVENTION

Technical Problem

With any of the methods described in Patent Literatures 1 to 4, there has been a problem in that it is not possible to restore a pre-degradation image and video by reducing optical degradation from the entire image and video substantially in real time by using an SIMD super-parallel computational processing device, which can be mass-produced and inexpensive. Accordingly, in order to overcome the problems described above, it is an object of the present invention to provide a super-resolution processing method and device for an SIMD super-parallel computational processing device, a TV-video super-resolution processing method and device for an SIMD super-parallel computational processing device, first to fourth programs, and first to fourth storage media.

Solution to Problem

In order to achieve the above object, a first invention according to the present invention provides a super-resolution processing method for an SIMD super-parallel computing device. The super-resolution processing method for an SIMD super-parallel computing device is the same as that described in Claim 1. A general-purpose computer assigns some computations based on equation (3) (described later) representing a linear equation based on Bayesian probability theory to an SIMD super-parallel computational processing device according to a first program written in a language that can be executed, loaded, and decoded, thereby reducing optical degradation included in an entire degraded image substantially in real time, whereby the degraded image is restored to an image that is close to the pre-degradation image.

The super-resolution processing method for an SIMD (Single Instruction Multiple Data) super-parallel computing device is characterized by including (S1) a degraded-image preparing step of preparing, from a designated degraded-image file, a degraded image constituted of a luminance distribution and displaying the degraded image on a monitor; (S2) a PSF preparing step of identifying a PSF suitable for a degradation state of the degraded image while the monitor is being viewed; (S3) a restored-image-initial-value preparing step of copying the degraded image and setting the degraded image as restored-image initial values; (S4) a maximum-number-of-iterations setting step of setting a maximum number of iterations with the general-purpose computer; (S5) an I resetting step of resetting a counter I that counts the number of iterations by setting the counter I to 0;

(S6) a PSF-size obtaining step of obtaining the size of the PSF to obtain a PSF size; (S7) a restored-image-initial-value correcting step of copying the restored-image initial values and setting the restored-image initial values as corrected-restored-image initial values, then calculating, from the PSF size, a region that becomes an excluded region when the PSF is convolved with the corrected-restored-image initial values, and pasting the region in mirror symmetry to the outside of the corrected-restored-image initial values, thereby correcting the corrected-restored-image initial values; (S8) a data preparing step of creating and preparing computation data such that datasets for one iteration can be assigned with maximum efficiency in an execution-data storage area in the SIMD super-parallel computational processing device; (S9) an image restoring step of transferring the computation data to the execution-data storage area in the SIMD super-parallel computational processing device and executing computation to obtain a restored image; (S10) an I incrementing step of incrementing the counter I by 1; (S11) an I determining step of testing a hypothesis that the value of the counter I is greater than or equal to the maximum number of iterations, proceeding to (S12) if the test result is false, and proceeding to (S14) if the test result is true; (S12) a substituting step of substituting the restored image for the restored-image initial values; (S13) a jumping step of returning to step (S7); (S14) an outputting step of outputting the restored image; (S15) a maximum-likelihood-restored-image rendering step of obtaining a maximum-likelihood restored image in an RGB format from the degraded-image file and the restored image; (S16) a file rendering step of rendering the maximum-likelihood restored image into a maximum-likelihood-restored-image file; and (S17) a storing step of storing the maximum-likelihood-restored-image file in a designated storage area.

In order to achieve the above object, a second invention according to the present invention provides a super-resolution processing device for an SIMD super-parallel computing device. The super-resolution processing device for an SIMD super-parallel computing device is the same as that described in Claim 2. In accordance with the super-resolution processing method for an SIMD super-parallel computing device of the first invention according to the present invention, a general-purpose computer implements all means and executes all the means according to a second program written in a language that can be executed, loaded, and decoded so as to assign some computations to an SIMD super-parallel computational processing device, thereby reducing optical degradation included in a degraded image substantially in real time, whereby the degraded image is restored to an image that is close to the pre-degradation image.

The super-resolution processing device for an SIMD super-parallel computing device is characterized by including (W1) a degraded-image preparing means for preparing, from a designated degraded-image file, a degraded image constituted of a luminance distribution and displaying the degraded image on a monitor; (W2) a PSF preparing means for identifying a PSF suitable for a degradation state of the degraded image while the monitor is being viewed; (W3) a restored-image-initial-value preparing means for copying the degraded image and setting the degraded image as restored-image initial values; (W4) a maximum-number-of-iterations setting means for setting a maximum number of iterations with the general-purpose computer; (W5) an I resetting means for resetting a counter I that counts the number of iterations by setting the counter I to 0; (W6) a PSF-size obtaining means for obtaining the size of the PSF to obtain a PSF size; (W7) a restored-image-initial-value correcting means for copying the restored-image initial values and setting the restored-image initial values as corrected-restored-image initial values, then calculating, from the PSF size, a region that becomes an excluded region when the PSF is convolved with the corrected-restored-image initial values, and pasting the region in mirror symmetry to the outside of the corrected-restored-image initial values, thereby correcting the corrected-restored-image initial values; (W8) a data preparing means for creating and preparing computation data such that datasets for one iteration can be assigned with maximum efficiency in execution-data storage areas in the SIMD super-parallel computational processing device; (W9) an image restoring means for transferring the computation data to the execution-data storage areas in the SIMD super-parallel computational processing device and executing computation to obtain a restored image; (W10) an I incrementing means for incrementing the counter I by 1; (W11) an I determining means for testing a hypothesis that the value of the counter I is greater than or equal to the maximum number of iterations, proceeding to (W12) if the test result is false, and proceeding to (W14) if the test result is true; (W12) a substituting means for substituting the restored image for the restored-image initial values; (W13) a jumping means for returning to means (W7); (W14) an outputting means for outputting the restored image; (W15) a maximum-likelihood-restored-image rendering means for obtaining a maximum-likelihood restored image in an RGB format from the degraded-image file and the restored image; (W16) a file rendering means for rendering the maximum-likelihood restored image into a maximum-likelihood-restored-image file; and (W17) a storing means for storing the maximum-likelihood-restored-image file in a designated storage area.

In order to achieve the above object, a third invention according to the present invention provides a first program. The first program is the same as that described in Claim 3. The first program causes a general-purpose computer to execute the super-resolution processing method for an SIMD super-parallel computing device according to the first invention.

In order to achieve the above object, a fourth invention according to the present invention provides a first storage medium. The first storage medium is the same as that described in Claim 4. The first storage medium stores the first program according to the third invention, allows connection to a general-purpose computer, and allows loading and execution of the first program by the general-purpose computer.

In order to achieve the above object, a fifth invention according to the present invention provides a second program. The second program is the same as that described in Claim 5. The second program causes a general-purpose computer to function as the super-resolution processing device for an SIMD super-parallel computing device according to the second invention.

In order to achieve the above object, a sixth invention according to the present invention provides a second storage medium. The second storage medium is the same as that described in Claim 6. The second storage medium stores the second program according to the fifth invention, allows connection to a general-purpose computer, and allows loading and execution of the second program by the general-purpose computer.

In order to achieve the above object, a seventh invention according to the present invention provides a TV-video super-resolution processing method for an SIMD super-parallel computing device. The TV-video super-resolution processing method for an SIMD super-parallel computing device is the same as that described in Claim 7. Optical degradation in the entire TV video is reduced substantially in real time by using the super-resolution processing method for an SIMD super-parallel computing device according to the first invention to restore the TV video to TV video that is close to the pre-degradation TV video.

The TV-video super-resolution processing method for an SIMD super-parallel computing device is characterized by including (S20) a degraded-frame obtaining step of extracting a degraded image constituted of a single-frame luminance distribution from TV video signals, outputting, with a delay corresponding to one frame, TV video signals remaining after removing single-frame signals from the TV video signals, storing color differences U and V of the degraded image, and then displaying the degraded image on a monitor while subjecting the degraded image to degamma processing; (S21) a step in which a user determines super-resolution processing conditions constituted of a maximum number of iterations and a degradation index by using an image restoring computation step constituted of steps S2 to S14 constituting the super-resolution processing method for an SIMD super-parallel computing device and in which a restored image is obtained from the degraded image in accordance with the super-resolution processing conditions; (S22) a second maximum-likelihood-restored-image rendering step of subjecting the restored image output in the outputting step of the image restoring computation step to gamma processing and obtaining a maximum-likelihood restored image in an RGB format from the restored image and the color differences U and V of the degraded image stored in the degraded-frame obtaining step; and (S23) a restored-TV-video-signal outputting step of combining the maximum-likelihood restored image in the RGB format and the remaining TV video signals into a single-frame restored TV video signal and outputting the single-frame restored TV video signal.

In order to achieve the above object, an eighth invention according to the present invention provides a TV-video super-resolution processing device for an SIMD super-parallel computing device. The TV-video super-resolution processing device for an SIMD super-parallel computing device is the same as that described in Claim 8. Optical degradation in TV video is reduced substantially in real time in accordance with the TV-video super-resolution processing method for an SIMD super-parallel computing device according to the seventh invention to restore the TV video to TV video that is close to the pre-degradation TV video.

The TV-video super-resolution processing device for an SIMD super-parallel computing device is characterized by including (W20) a degraded-frame obtaining means for extracting a degraded image constituted of a single-frame luminance distribution from TV video signals, outputting, with a delay corresponding to one frame, TV video signals remaining after removing single-frame signals from the TV video signals, storing color differences U and V of the degraded image, and then displaying the degraded image on a monitor while subjecting the degraded image to degamma processing; (W21) a means with which the user determines the super-resolution processing conditions constituted of the maximum number of iterations and the degradation index by using an image restoring computation means constituted of means W2 to W14 constituting the super-resolution processing device for an SIMD super-parallel computing device and with which a restored image is obtained from the degraded image in accordance with the super-resolution processing conditions; (W22) a second maximum-likelihood-restored-image rendering means for subjecting the restored image output from the outputting means of the image restoring computation means to gamma processing and obtaining a maximum-likelihood restored image in an RGB format from the restored image and the color differences U and V of the degraded image stored by the degraded-frame obtaining means; and (W23) a restored-TV-video-signal outputting means for combining the maximum-likelihood restored image in the RGB format and the remaining TV video signals into a single-frame restored TV video signal and outputting the single-frame restored TV video signal.

In order to achieve the above object, a ninth invention according to the present invention provides a third program. The third program is the same as that described in Claim 9. The third program causes a general-purpose computer to execute the TV-video super-resolution processing method for an SIMD super-parallel computing device according to the seventh invention.

In order to achieve the above object, a tenth invention according to the present invention provides a third storage medium. The third storage medium is the same as that described in Claim 10. The third storage medium stores the third program according to the ninth invention, allows connection to a general-purpose computer, and allows loading and execution of the third program by the general-purpose computer.

In order to achieve the above object, an eleventh invention according to the present invention provides a fourth program. The fourth program is the same as that described in Claim 11. The fourth program causes a general-purpose computer to function as the TV-video super-resolution processing device for an SIMD super-parallel computing device according to the tenth invention.

In order to achieve the above object, a twelfth invention according to the present invention provides a fourth storage medium. The fourth storage medium is the same as that described in Claim 12. The fourth storage medium stores the fourth program according to the eleventh invention, allows connection to a general-purpose computer, and allows loading and execution of the fourth program by the general-purpose computer.

Advantageous Effects of Invention

The present invention provides a method of removing optically degraded information from only information about a degraded image according to equations based on Bayesian probability theory. In this method, convolution, which involves a huge amount of computation compared with the four basic arithmetic operations, is executed only once. Thus, data preparation in advance, post-processing of the computation results, or data transfer does not constitute a bottleneck in the overall speed when using an SIMD super-parallel computational processing device. This makes it possible to use an SIMD super-parallel computational processing device, which can be mass-produced and is inexpensive. Thus, an economical advantage and an energy-saving advantage owing to the use of an existing SIMD super-parallel computational processing device, which can be mass-produced and for which development kits are fully available, and a speed advantage made possible by high-speed computational processing due to the reduction of the number of convolutions to just one can be expected. In addition, since the present invention is applicable irrespective of the type of radiation source used for TV video, for example, video acquired by using an infrared camera or an X-ray camera may be used. That is, another advantage is afforded in that the range of applications is broad. These advantages listed above are realized at least partially.

BRIEF DESCRIPTION OF DRAWINGS

FIG. 10 is a drawing showing an example of a first dataset and a second dataset created in the data preparing step according to the present invention.

FIG. 14 is a flowchart showing an example of a file rendering step according to the present invention.

DESCRIPTION OF EMBODIMENTS

The best mode for carrying out the invention will be described in detail with reference to the drawings.

Figure 1:
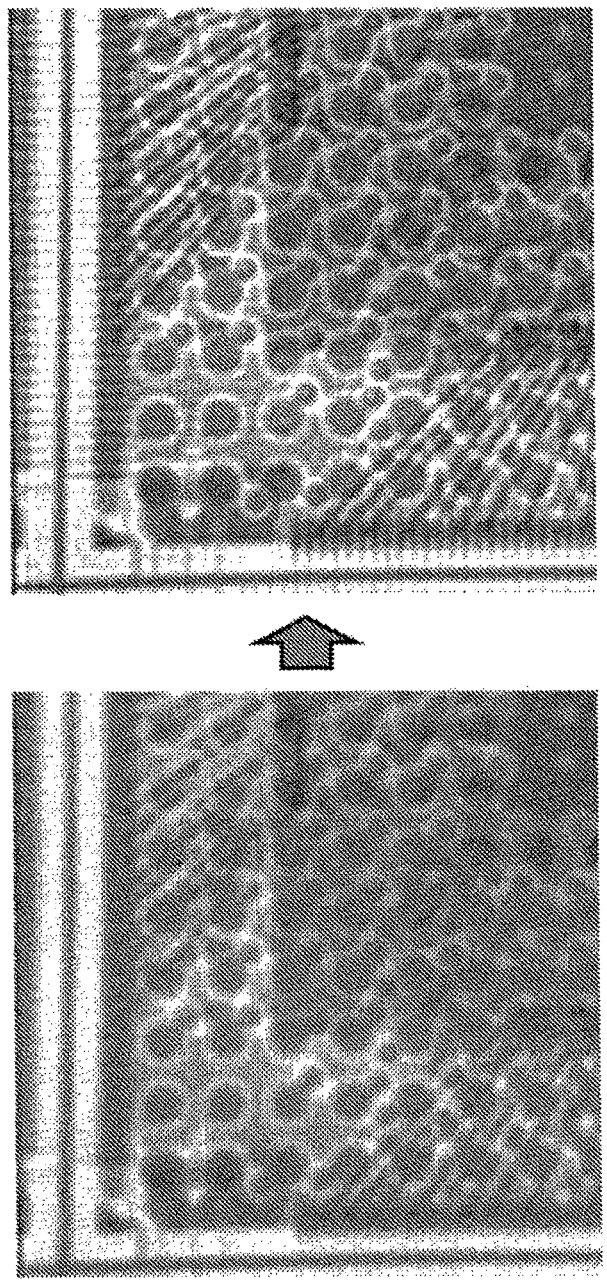
FIG. 1 is a drawing showing an example of optically degraded information included in a frame of TV video.
Figure 2:
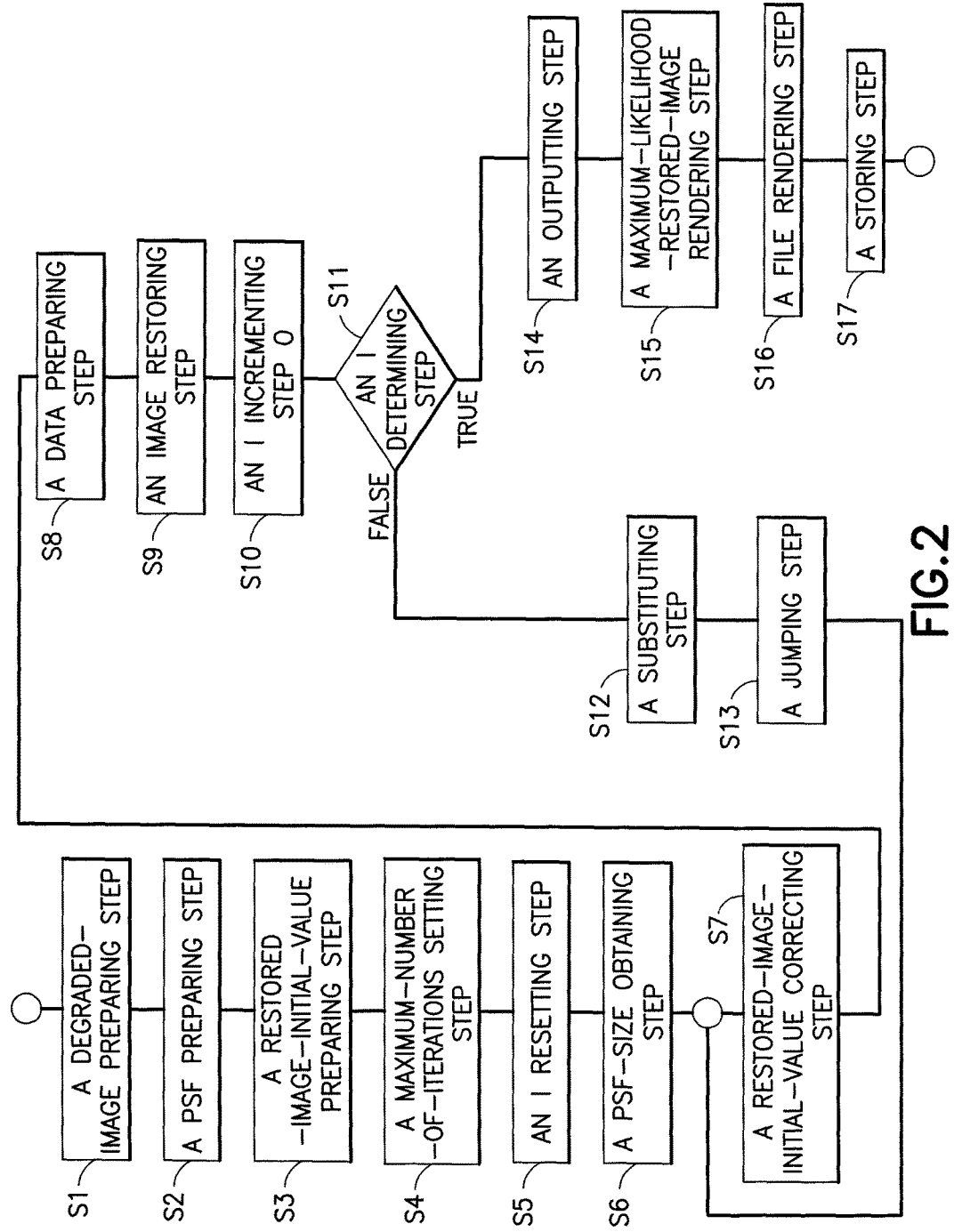
FIG. 2 is a flowchart showing an example of a processing procedure in a super-resolution processing method for an SIMD super-parallel computing device according to the present invention.

FIG. 2 is a flowchart relating to an example of a processing procedure in a super-resolution processing method for an SIMD super-parallel computing device. The super-resolution processing method for an SIMD super-parallel computing device, shown in FIG. 2, is characterized by including (S1) a degraded-image preparing step of preparing, from a designated degraded-image file 2, a degraded image 1 constituted of a luminance distribution and displaying the degraded image 1 on a monitor 3; (S2) a PSF preparing step of identifying a PSF 4 suitable for a degradation state of the degraded image 1 while the monitor 3 is being viewed; (S3) a restored-image-initial-value preparing step of copying the degraded image 1 and setting the degraded image 1 as restored-image initial values 5; (S4) a maximum-number-of-iterations setting step of setting a maximum number of iterations 7 with the general-purpose computer 8; (S5) an I resetting step of resetting a counter I 9 that counts the number of iterations by setting the counter I 9 to 0; (S6) a PSF-size obtaining step of obtaining the size of the PSF 4 to obtain a PSF size 10; (S7) a restored-image-initial-value correcting step of copying the restored-image initial values 5 and setting the restored-image initial values 5 as corrected-restored-image initial values 6, then calculating, from the PSF size 10, a region that becomes an excluded region when the PSF 4 is convolved with the corrected-restored-image initial values 6, and pasting the region in mirror symmetry to the outside of the corrected-restored-image initial values 6, thereby correcting the corrected-restored-image initial values 6; (S8) a data preparing step of creating and preparing computation data 13 such that datasets for one iteration can be assigned with maximum efficiency in an execution-data storage area 12 in an SIMD super-parallel computational processing device 11; (S9) an image restoring step of transferring the computation data 13 to the execution-data storage area 12 in the SIMD super-parallel computational processing device 11 and executing computation to obtain a restored image 14; (S10) an I incrementing step of incrementing the counter I 9 by 1; (S11) an I determining step of testing a hypothesis that the value of the counter I 9 is greater than or equal to the maximum number of iterations 7, proceeding to (S12) if the test result is false, and proceeding to (S14) if the test result is true; (S12) a substituting step of substituting the restored image 14 for the restored-image initial values 5; (S13) a jumping step of returning to step (S7); (S14) an outputting step of outputting the restored image 14; (S15) a maximum-likelihood-restored-image rendering step of obtaining a maximum-likelihood restored image 15 in an RGB format from the degraded-image file 2 and the restored image 14; (S16) a file rendering step of rendering the maximum-likelihood restored image 15 into a maximum-likelihood-restored-image file 16; and (S17) a storing step of storing the maximum-likelihood-restored-image file 16 in a designated storage area.

In a super-resolution processing method for an SIMD super-parallel computing device of a first invention according to the present invention, according to equation (3) derived from equation (2) serving as a model in which an original image F that is free of optical degradation is degraded by a PSF H to become a degraded image G, n iterations are executed by using an SIMD super-parallel computational processing device 11 to estimate a maximum-likelihood restored image 15, which is a restored image obtained in the n-th iteration. This method is faster compared with existing methods.

[Eq. 2]

$$G = F(*)H \quad (2)$$

[Eq. 3]

$$Fn+1 = Fn + G - Fn(*)H \quad (3)$$

(b=0, 1, 2 ... k)

In equations (2) and (3), F signifies an original image, Fn signifies a restored image, H signifies a PSF, G signifies a degraded image, and (*) signifies a convolution. Furthermore, in equation (3), F0 signifies restored-image initial values 5. F, Fn, and G have the same pixel size, and these images are constituted of pixels that are frameless and that can be designated by using coordinates. When F, Fn, and G are superimposed on each other, pixels at the same coordinates are located at the same position, overlapping in the vertical direction. H is constituted of frameless pixels having the same pixel size as F, Fn, and G, and each of the pixels can be designated by using coordinates. The image size of H is the same as that of F, Fn, and G, or is smaller than that of F, Fn, and G in the case where H is point-symmetrical and is shift-invariant.

Figure 3:
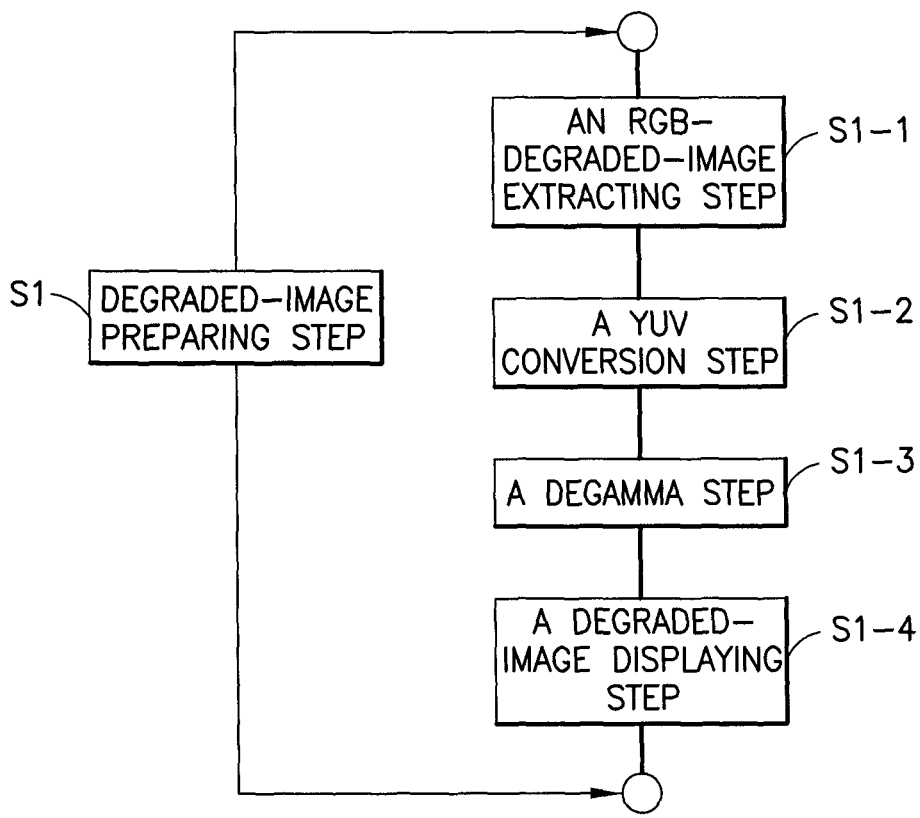
FIG. 3 is a flowchart showing an example of a processing procedure in a degraded-image preparing step according to the present invention.

The degraded-image preparing step S1 is further divided into a plurality of sub-steps. FIG. 3 is a flowchart showing an example of a processing procedure in the degraded-image preparing step S1. The degraded-image preparing step S1 shown in FIG. 3 is characterized by including (S1-1) an RGB-degraded-image extracting step of reading the degraded-image file 2 and extracting, from the degraded-image file 2, an RGB degraded image constituted of RGB pixel data; (S1-2) a YUV conversion step of subjecting the RGB degraded image 17 to YUV conversion to extract a Y degraded image 18 constituted of Y (luminance) components, a U degraded image 19 constituted of U (blue color difference) components, and a V degraded image 20 constituted of V (red color difference) components; (S1-3) a degamma step of subjecting the Y degraded image 18 to degamma processing and setting the Y degraded image 18 after the degamma processing as the degraded image 1; and (S1-4) a degraded-image displaying step of displaying the degraded image 1 on the monitor 3. In FIG. 3, since the steps such as the RGB-degraded-image extracting step S1-1 are the sub-steps of the degraded-image preparing step S1, the numbers of these sub-steps are indicated with hyphens.

In the present invention, the degraded image 1 that is handled may be any image as long as the image is not compressed and has not been subjected to any artificial processing, and as long as the image extracted from a file is a 24-bit or 32-bit RGB bitmap image. Furthermore, the degraded image 1 may also be an image in the YUV 444 format; in this case, however, the RGB-degraded-image extracting step S1-1 has to be modified so as to allow handling of YUV images. YUV images cannot be handled in the example shown in FIG. 3. The reason for choosing a degraded image 1 constituted of an image luminance distribution as an image to be handled in the present invention is that the color composition may change if an image that is degraded in the individual RGB primary colors is handled. It is known from experience that a sufficient super-resolution effect is attained even if a luminance image is handled. Furthermore, in the present invention, RGB to YUV and YUV to RGB conversion, gamma conversion, and degamma conversion are executed according to Table 3.5 "Colorimetric parameters" in BTA S-001C version 1.0 "1125/60 HDTV PRODUCTION SYSTEMS" (http://www.arib.or.jp/english/html/overview/doc/2-BTA_S-001_C1_0.pdf), which is a standard of the Association of Radio Industries and Businesses, established in August 1987 and revised to version C 1.0 in July 2009.

Figure 4:
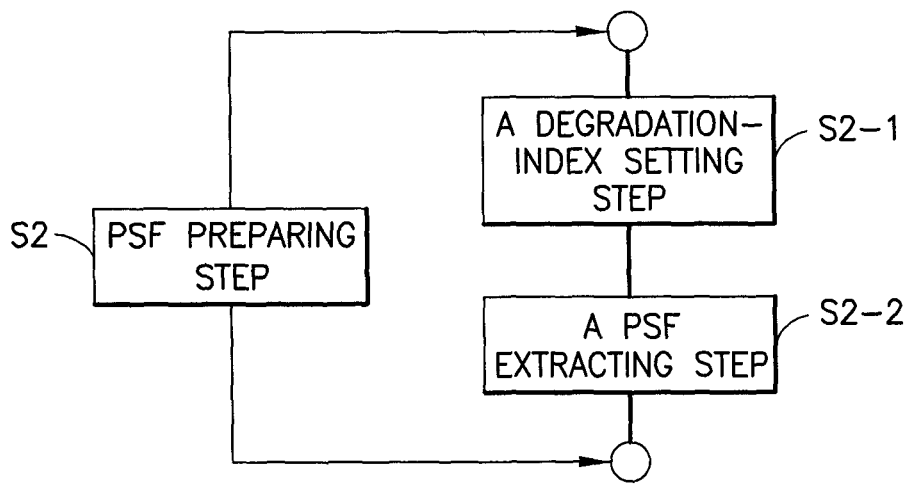
FIG. 4 is a flowchart showing an example of a processing procedure in a PSF preparing step according to the present invention.

FIG. 4 is a flowchart showing an example of a processing procedure in the PSF preparing step S2. The PSF preparing step S2 shown in FIG. 4 is characterized by including (S2-1) a degradation-index setting step in which a user 21 sets, via a general-purpose computer 8, a degradation index 22 suitable for a degradation state of the degraded image 1 while viewing the monitor 3; and (S2-2) a PSF extracting step of selecting and extracting a PSF 4 matching the degradation index 22 from a PSF database 23 in which PSFs are created and organized in association with degradation indices.

In the present invention, since an image degraded to such an extent that objects are unclear and indistinguishable are not handled, a PSF having a size of 5×5 pixels and having a two-dimensional normal distribution with a maximum luminance at the center is used as the PSF 4. Without limitation to this example, however, any PSF having a size not exceeding the size of the degraded image may be used as the PSF 4. However, the computation speed becomes slower as the PSF size 10 increases.

The degradation index 22 is an integer in the range of 0 to 255. 0 indicates no optical degradation, and 255 indicates the maximum optical degradation. The degradation index 22 is set via the general-purpose computer 8. Specifically, the degradation index 22 is set by operating a degradation-index setting button 27 in a super-resolution-processing window 24 on the monitor 3. The super-resolution-processing window 24 is displayed on the monitor 3 by the general-purpose computer 8 when a first program 51 is activated. All operations relating to super-resolution processing are allowed on the super-resolution-processing window 24.

Figure 5:
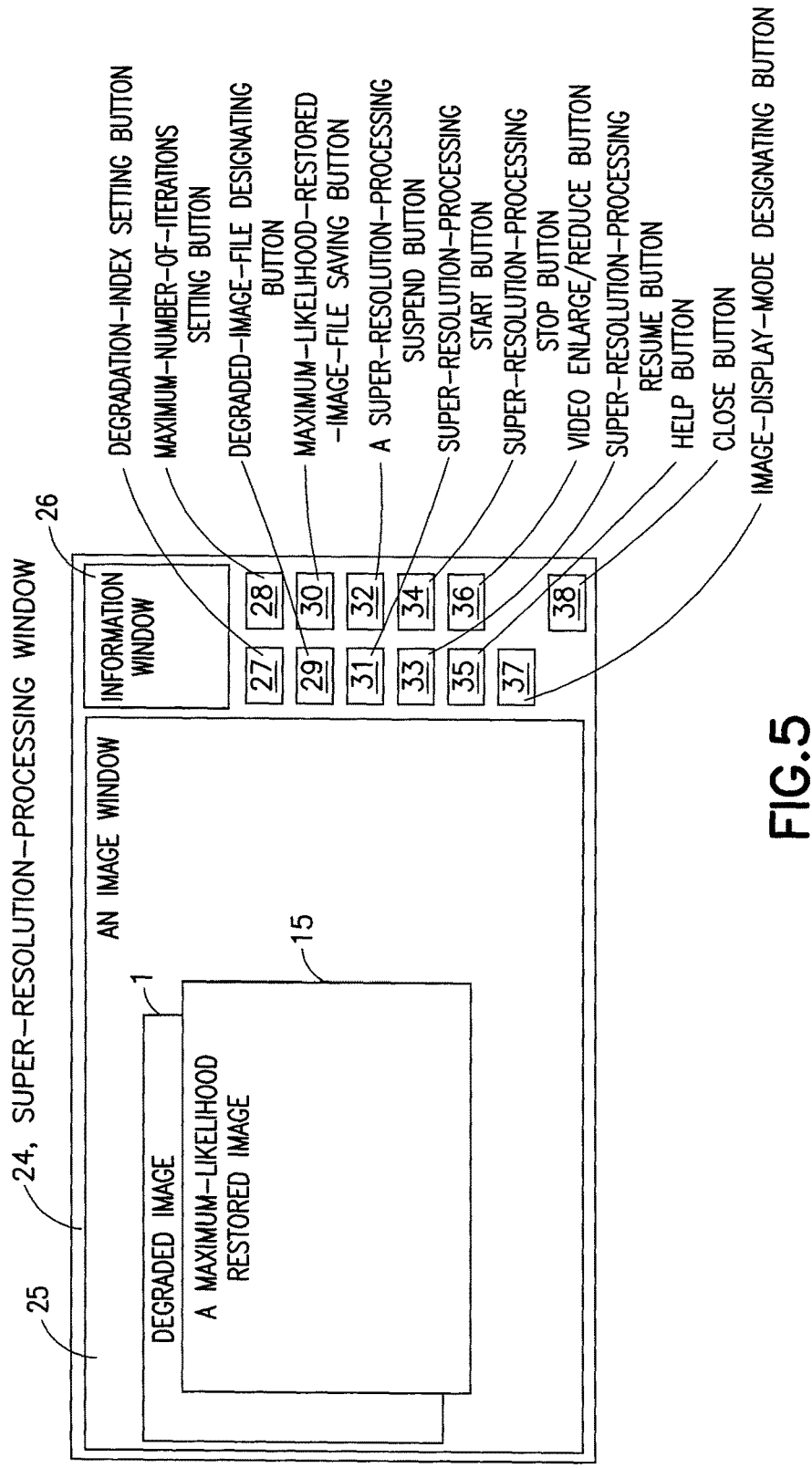
FIG. 5 is an illustration showing an example relating to the configuration of a super-resolution processing window according to the present invention.

FIG. 5 is an illustration showing an example relating to the configuration of the super-resolution-processing window 24. The super-resolution-processing window 24 shown in FIG. 5 includes an image window 25 for displaying a degraded image 1, a maximum-likelihood restored image 15, etc.; an information window 26 for displaying the current date and time, super-resolution conditions, a degraded-image filename, system messages, etc., and provided with a vertical scroll bar at the right end thereof; a degradation-index setting button 27 for setting the degradation index 22 by designating a number from 0 to 255 representing 256 levels from a pull-down menu (a default value is indicated by a pale blue background in the pull-down menu in the present invention); a maximum-number-of-iterations setting button 28 used to select a value from a list in a combo box that opens when the button is clicked on or to directly enter and set a maximum number of iterations 7 over a default value displayed in a text box; a degraded-image-file designating button 29 that allows designating a file by designating one of the files displayed in a file-management-system window that opens when the button is clicked on; a maximum-likelihood-restored-image-file saving button 30 with which, when a maximum-likelihood restored image 15 displayed in the image window 25 is designated by clicking on it and then the button is clicked on, the file-management-system window opens, and then a desired directory is designated, a filename is entered in a filename field in the file-management-system window, a file format is designated, and "Save" is clicked on, whereby the maximum-likelihood restored image is stored in the designated directory; a super-resolution-processing start button 31 that is clicked on to start super-resolution processing under the set conditions; a super-resolution-processing suspend button 32 that is clicked on to suspend super-resolution processing; a super-resolution-processing resume button 33 for resuming suspended super-resolution processing; a super-resolution-processing stop button 34 that is clicked on to stop super-resolution processing; a help button 35 for opening a help-window and searching and displaying help content; a video enlarge/reduce button 36 that is used after an image that is to be enlarged or reduced in the image window 25 is designated by clicking, the designated image being displayed in an enlarged form when "+" in this button is pressed, in a reduced form when "−" is pressed, and at the original default magnification factor when "0" is pressed; an image-display-mode designating button 37 that is used to select, from a pull-down menu, either "Tile" or "Cascade" as a display mode for the image in the image window 25; and a close button 38 used to close the super-resolution-processing window 24.

In the maximum-number-of-iterations setting step S4, the maximum-number-of-iterations setting button 28 in the super-resolution-processing window 24 is operated to set the maximum number of iterations 7.

The restored-image-initial-value correcting step S7 is a step for solving the problem of an excluded region, for which computation is prohibited and which occurs when convolving the corrected-restored-image initial values with the PSF 4 according to equations (4) and (5). In this step, pixels in the excluded region are copied in advance in mirror symmetry to the outside of the outermost region of the corrected-restored-image initial values to move the outermost region of the corrected-restored-image initial values to the outside of the excluded region, thereby solving the problem of the excluded region.

[Eq. 4]

$$G(i,j)=F(i,j)\circledast H(m,n) \qquad (4)$$

[Eq. 5]

$$G(i,j)=\sum_{n=-N/2}^{N/2}\sum_{m=-M/2}^{M/2}F(i-m,j-n)\cdot H(m,n) \qquad (5)$$

In equations (4) and (5), G signifies a degraded image, G(i, j) signifies a pixel at coordinates (i, j) of the degraded image, F signifies a restored image, F(i−m, j−n) signifies a pixel at coordinates (i−m, j−n) of the restored image, H signifies a PSF, H(m, n) signifies a pixel at coordinates (m, n) of the PSF, a symbol containing an asterisk "*" in a white circle signifies a convolution, and a middle dot "·" signifies multiplication. Furthermore, i, j, m, n, M, and N are positive integers.

According to equation (5), the PSF size is 2M+1 pixels horizontally and 2N+1 pixels vertically. In this case, the excluded region can be obtained according to equations (6) and (7), and the excluded region has EL pixels vertically and EW pixels horizontally.

[Eq. 6]

$$EL=\mathrm{INT}((2N+1)/2) \qquad (6)$$

[Eq. 7]

$$EW=\mathrm{INT}((2M+1)/2) \qquad (7)$$

In equations (6) and (7), INT( ) is a function for extracting only the integer part of the numerical value inside the parentheses. In the present invention, since the PSF size is 5×5, and this corresponds to N=M=2. In this case, EL=EW=2. Thus, the excluded region is the region of the outermost two pixels of the restored-image initial values 5.

Figure 6:
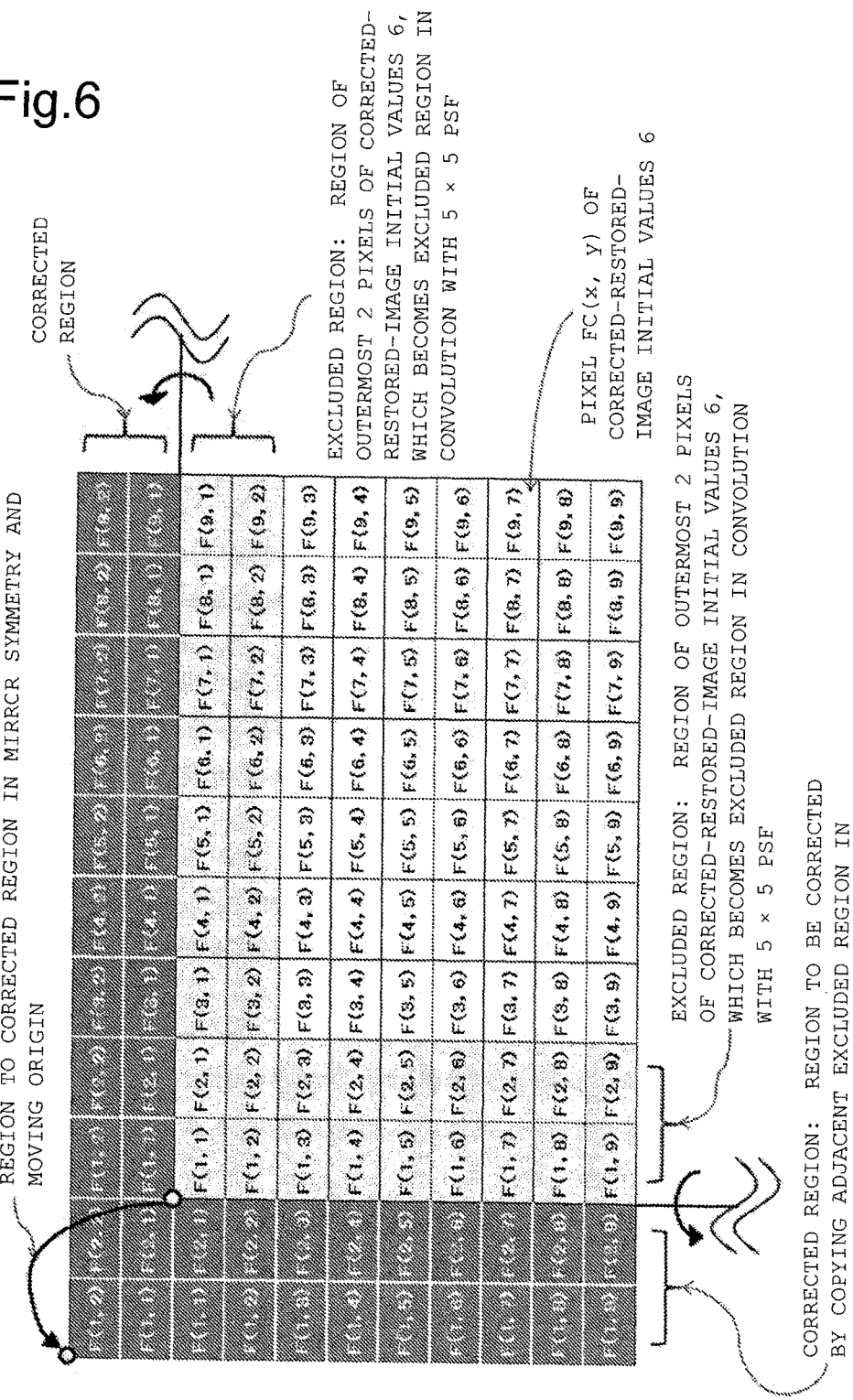
FIG. 6 is a drawing showing an example of the occurrence of an excluded region that occurs as a result of convolution used in the present invention, as well as a method of correcting the excluded region.

FIG. 6 is a diagram showing an example of the occurrence of an excluded region that occurs with a convolution used in the present invention, as well as a method of correcting the excluded region. In the example shown in FIG. 6, the state in the vicinity of the top left corner in the case where a 5×5. PSF is convolved with the corrected-restored-image initial values is illustrated as an example. The excluded region in this case is the entire region constituted of the outermost two pixels of the corrected-restored-image initial values. In the example shown in FIG. 6, the state after copying the restored-image initial values 5 and setting the restored-image initial values as the corrected-restored-image initial values 6 is shown. The problem of the excluded region of the corrected-restored-image initial values 6 is solved by copying the outermost two pixels of the corrected-restored-image initial values to the excluded region in mirror symmetry for correction and further moving the origin. With this operation, the origin after the convolution matches the origin of the corrected-restored-image initial values 6 before correction, i.e., the origin of the restored-image initial values 5.

Figure 7:
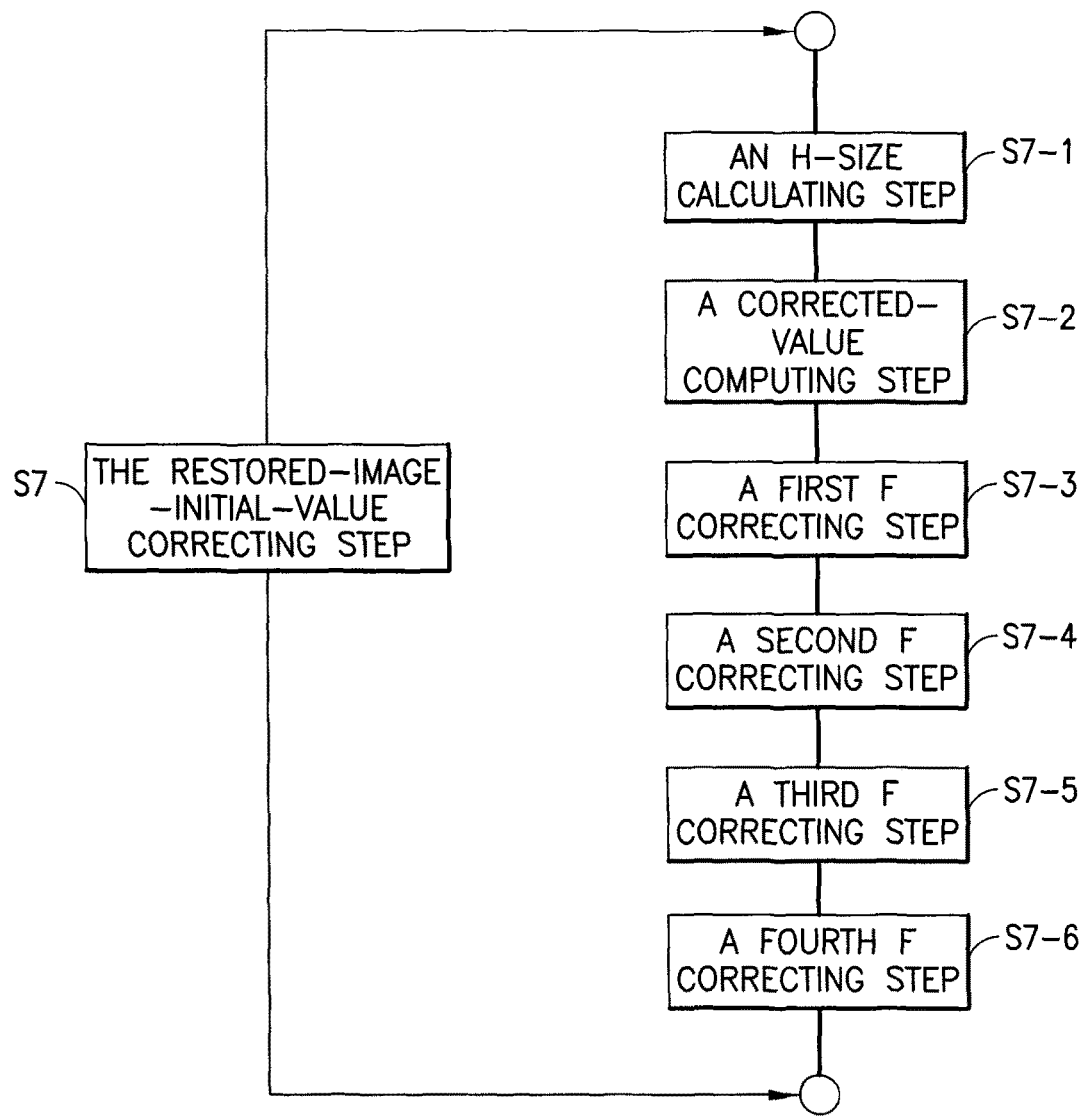
FIG. 7 is a flowchart showing an example of a processing procedure in a restored-image-initial-value correcting step according to the present invention.

FIG. 7 is a flowchart showing an example of a processing procedure in the restored-image-initial-value correcting step S7. The restored-image-initial-value correcting step S7 shown in FIG. 7 includes (S7-1) an H-size calculating step of obtaining a PSF size 10 in the form of values representing the horizontal number of pixels HW and the vertical number of pixels HL; (S7-2) a corrected-value computing step of setting the integer part of the quotient obtained by dividing HW by 2 as a horizontal-size corrected value Cw and setting the integer part of the quotient obtained by dividing HL by 2 as a vertical-size corrected value Cl; (S7-3) a first F correcting step of copying, in mirror symmetry, Cl pixel rows located on the inner side of the top edge of the corrected-restored-image initial values 6 to the outer side of the corrected-restored-image initial values 6; (S7-4) a second F correcting step of copying, in mirror symmetry, Cw pixel columns located on the inner side of the right edge of the corrected-restored-image initial values 6 to the outer side of the corrected-restored-image initial values 6 and newly setting the result as corrected-restored-image initial values 6; a third F correcting step of copying, in mirror symmetry, Cl pixel rows located on the inner side of the bottom edge of the corrected-restored-image initial values 6 to the outer side of the bottom edge of the corrected-restored-image initial values 6 and newly setting the result as corrected-restored-image initial values 6; and (S7-6) a fourth F correcting step of copying, in mirror symmetry, Cw pixel columns located on the inner side of the left edge of the corrected-restored-image initial values 6 to the outer side of the left edge of the corrected-restored-image initial values 6 and newly setting the result as corrected-restored-image initial values 6.

In the data preparing step S8, the computation data 13 refers to a dataset for a single iteration, specifically, a dataset needed for calculating the right-hand side of the equal sign in equation (3) by using the SIMD super-parallel computational processing device 11. The data preparing step S8 is necessary because the SIMD super-parallel computational processing device 11 is a computing device that executes the four basic arithmetic operations and LUT (Look Up Table) logical operations concurrently with a preset degree of parallelism, by using data stored in the execution-data storage areas 12 in the SIMD super-parallel computational processing device 11 in units of a preset size, such as 2 bits, 4 bits, 8 bits, or 16 bits. Thus, it is necessary to transfer the computation data 13 and store the computation data 13 in the execution-data storage areas 12 in advance such that computation by the SIMD super-parallel computational processing device 11 is possible. The computation data 13 is created in advance such that the computation data 13 can be assigned with maximum efficiency in the execution-data storage areas 12.

In the present invention, the execution-data storage area 12 for each computation unit has two (left and right) 512-bit banks, and thus a capacity of 1024 bits. Each of the left and right banks has 1 to 512 X addresses and 1024 Y addresses. Thus, by designating either the left bank or the right bank and further designating an address (X, Y), it is possible to select any register in the designated bank. The computation units execute the four-basic arithmetic operations and LUT operations in 2 bits. The degree of parallel computation of the computation units and the execution-data storage areas 12 is 1024. Now, an example relating to the configuration of the data preparing step S8 will be described in the context of an example of creating the computation data 13 in the case where the SIMD super-parallel computational processing device 11 is used.

Figure 8:
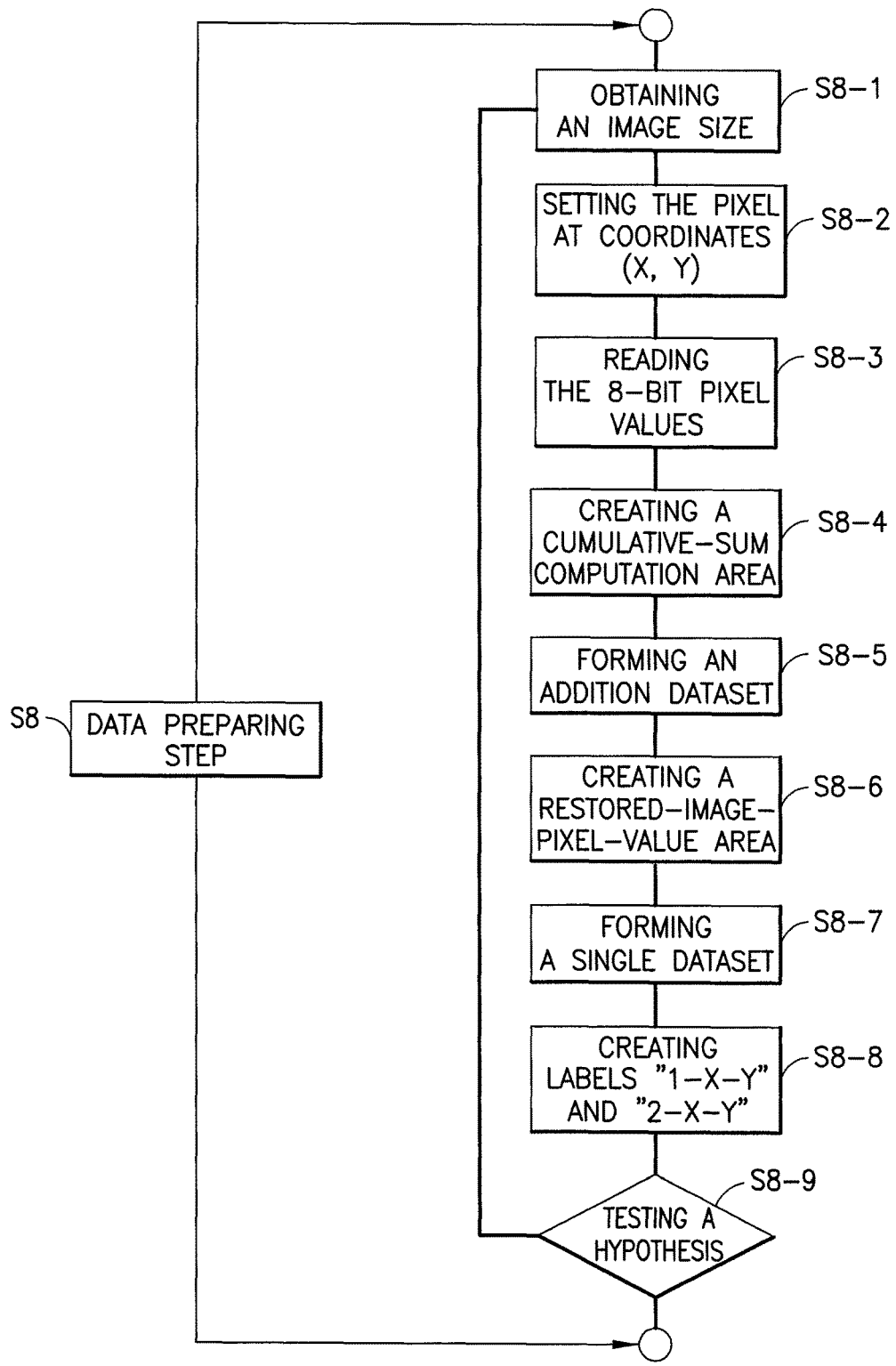
FIG. 8 is a flowchart showing an example of a processing procedure in a data preparing step according to the present invention.

FIG. 8 is a flowchart showing an example of a processing procedure in the data preparing step S8. The data preparing step S8 shown in FIG. 8 includes (S8-1) a step of obtaining an image size based on the number of pixels of the restored-image initial values 5, and generating coordinates (x, y) of a pixel in order by using the pixel at the top left corner of the restored-image initial values 5 as the origin, moving horizontally from a left-end pixel to a right-end pixel, then moving vertically downward by one pixel and returning to the horizontal left end, again moving from a left-end pixel to a right-end pixel, and so forth; (S8-2) a step of setting the pixel at coordinates (x, y) of the corrected-restored-image initial values 6 as the origin, reading the 8-bit pixel values of the pixels in a region including the origin and formed of 5 pixels in the rightward direction×five pixels in the downward direction, and setting the pixel values as FC(i, j); (S8-3) a step of reading the 8-bit pixel values of the 5×5 pixels of the PSF 4, setting the pixel values as H(i, j) having the origin at the top left corner thereof, and in order to allow multiplication of the pixel values of FC(i, j) by the pixel values of H(i, j) having the same coordinates, while changing the coordinates of H(i, j) and FC(i, j) so as to move vertically downward from the origin, then moving horizontally by one pixel, again moving vertically downward, and so forth, creating, for each combination of i (integer from 1 to 5) and j (integer from 1 to 5), a dataset in which the 8-bit value of FC(i, j), the 8-bit value of H(i, j) having the same coordinates, and a 12-bit area used to write the product of these values are concatenated together in this order, setting the first 17 datasets as a first dataset 39 that is to be transferred to and stored in the left bank of the execution-data storage area 12, and setting the remaining 8 datasets as a second dataset 40 that is to be transferred to and stored in the right bank of the execution-data storage area 12; (S8-4) a step of creating a cumulative-sum computation area 43 formed by concatenating together a first cumulative-sum computation area 41 and a second cumulative-sum computation area 42, the first cumulative-sum computation area 41 having a 12-bit width and used to read products from the product storage areas of the first dataset 39 and the second dataset 40 one by one while avoiding duplicates and to add up the products, and the second cumulative-sum computation area 42 having a 12-bit width and used to store the sum obtained by adding up the products; (S8-5) assuming that the degraded image 1 has the origin at the top left corner of the pixel plane thereof and an arbitrary pixel of the degraded image 1 can be indicated as G(x, y) and that the restored-image initial values 5 have the origin at the top left corner of the pixel plane thereof and an arbitrary pixel of the restored-image initial values 5 can be indicated as F(x, y), a step of forming a data pair so as to allow addition of the 8-bit pixel value of G(x, y) and the 8-bit pixel value of F(x, y), and adding and concatenating, to the data pair, an empty area having a 12-bit width and used to store the result, thereby forming an addition dataset 44; (S8-6) a step of creating a restored-image-pixel-value area 45 having a 12-bit width and used to subtract the result stored in the first cumulative-sum computation area 41 from the value in the result storage area in the addition dataset 44 and to store the pixel value of the restored image 14 obtained by the subtraction; (S8-7) a step of concatenating the cumulative-sum computation area 43 after the second dataset 40, further concatenating the addition dataset 44, and further concatenating the restored-image-pixel-value area 45, thereby forming a single dataset; (S8-8) a step of creating labels "1-*x*-*y*" and "2-*x*-*y*" from x and y and labeling the first dataset 39 as "1-*x*-*y*" and the second dataset 40 as "2-*x*-*y*"; and (S8-9) a step of testing a hypothesis that no pixel for which computation has not been executed remains in the restored-image initial values 5, returning to S8-1 if the test result is false, and terminating the procedure if the test result is true.

The first dataset 39 and the second dataset 40 constitute a data pair for the same single computation unit and serve as computation data for one pixel of the restored image 14.

Figure 9:
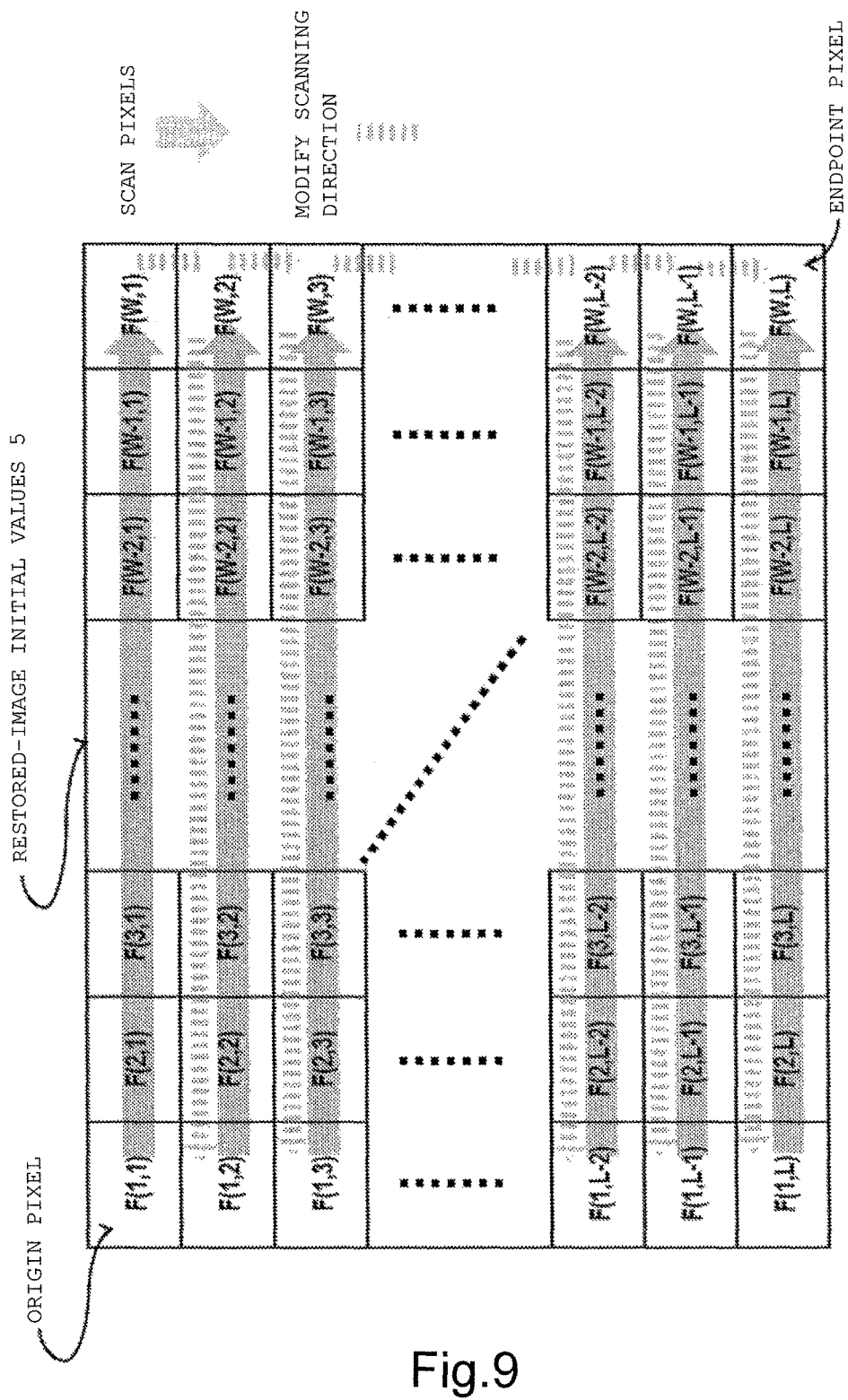
FIG. 9 is a drawing showing an example of a method of scanning the pixels of restored-image initial values in the data preparing step according to the present invention.

FIG. 9 is a drawing showing an example of a method of scanning pixels when generating the coordinates of the pixels of the restored-image initial values 5 in step S8-1. In the method shown in FIG. 9, when generating the coordinates of all the pixels of the restored-image initial values 5 one by one, the pixels are scanned by starting from the pixel at the top left corner of the restored-image initial values 5 as the origin, moving horizontally from a left-end pixel to a right-end pixel, then moving vertically downward by one pixel and returning to the horizontal left end, moving from a left-end pixel to a right-end pixel, and so forth. However, the scanning direction is not limited to this example and may be arbitrary. In FIG. 9, the image size of the restored-image initial values 5 is Wx pixels horizontally and Ly pixels vertically. Each pixel is indicated as F(x, y), where x is an integer from 1 to Wx, and y is an integer from 1 to Ly.

FIG. 10 is a drawing showing an example of the first datasets 39 and the second datasets 40 created in the data preparing step S8. Referring to FIG. 10, the datasets at the same Y address among the first datasets 39 and the second datasets 40 are datasets for executing computation for a specific pixel of the restored image 14 according to the right-hand side of equation (3). Datasets for 1024 pixels are included in the entire Y-address space. The areas at X addresses 1 to 504 in the left bank and X addresses 1 to 224 in the right bank are used to store datasets used for multiplications in a convolution, specifically, the pixel FC(i, j) of the corrected-restored-image initial values 6, the pixel H(i, j) of the PSF 4, and the product of these pixels. The area at X addresses 253 to 276 in the right bank serves as the cumulative-sum computation area 43. The area at X addresses 277 to 304 in the right bank stores the addition dataset 44. The area at X addresses 305 to 316 in the right bank serves as the restored-image-pixel-value area 45.

Figure 11:
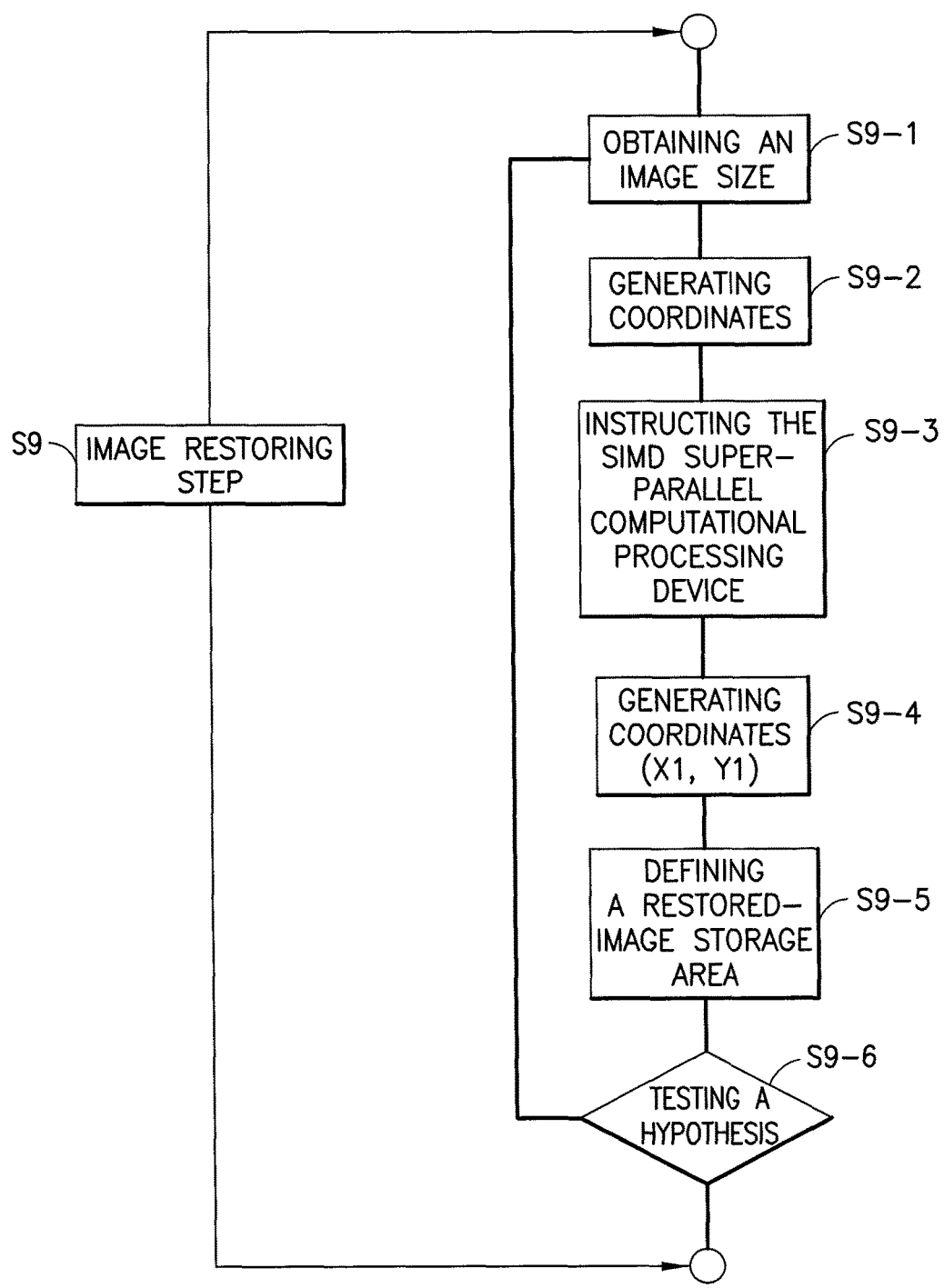
FIG. 11 is a flowchart showing an example of a processing procedure in an image restoring step according to the present invention.

FIG. 11 is a flowchart showing an example of a processing procedure in the image restoring step S9. The image restoring step S9 shown in FIG. 11 includes (S9-1) a step of obtaining an image size based on the number of pixels of the restored-image initial values 5, and according to the scanning method shown in FIG. 9, generating coordinates (x, y) 46 of a pixel of the restored-image initial values 5 at intervals of 1024 pixels while changing the coordinates of the pixel to be read by setting the top left corner of the restored-image initial values 5 as the origin, horizontally moving from a left-end pixel to a right-end pixel, then moving vertically downward by one pixel and returning to a left-end pixel, moving horizontally from the left-end pixel to a right-end pixel, and so forth, and storing the coordinates (x, y) in variable x( ) and variable y( ) of a large-capacity, high-speed memory 54; (S9-2) a step of generating coordinates including origin-pixel coordinates (x, y) according to the scanning method shown in FIG. 9 by using the pixel coordinates (x, y) 46 as a starting pixel while simultaneously generating labels "1-x-y" and "2-x-y" from the coordinates, reading the first datasets 39 and the second datasets 40 for 1024 pixels or a maximum number of pixels, and transferring the first datasets 39 to the left bank of the execution-data storage area 12 and the second datasets 40 to the right bank of the execution-data storage area 12 in the FIFO (First In First Out) order such that these datasets 39 and 40 are individually aligned to the left; (S9-3) by using the transferred first datasets 39 and second datasets 40 in the SIMD super-parallel computational processing device 11, a step of instructing the SIMD super-parallel computational processing device 11 to first execute multiplications constituting a convolution concurrently for the 1024 pixels, to then obtain the cumulative sum of the 25 products concurrently for the 1024 pixels, to then add together the value of the degraded image 1 and the value of the restored-image initial values 5 concurrently for the 1024 pixels, to subtract, from the resulting sums for the 1024 pixels, the cumulative sums for the 1024 pixels by a single computation, and to store the results as the 1024 pixels of the restored image 14 in the column of a restored-image-pixel-value area 45 in the right bank of the execution-data storage area 12, and detecting that the computation has ended; (S9-4) a step of generating coordinates (x1, y1) for 1024 pixels or the maximum number of pixels including the origin-pixel coordinates (x, y) 46 as a starting pixel according to the scanning method shown in FIG. 9, saving the coordinates (x1, y1) in variables x1 and y1 of the large-capacity, high-speed memory 54 while creating a label "F-x1-y1" from x1 and y1, creating a variable F-x1-y1( ), having this label as the variable name thereof, for saving the pixel value of the restored image 14 for each of the 1024 pixels or the maximum number of pixels, creating, in the large-capacity, high-speed memory 54, a temporary restored-pixel saving area 47 forming a column of variables, arrayed vertically in the order of creation, for storing the pixel values of the 1024 pixels or the maximum number of pixels, and then reading the pixel values of the 1024 pixels or the maximum number of pixels of the restored image 14 from the column of the restored-image-pixel-value area 45 in the right bank of the execution-data storage area 12 and transferring the pixel values to the temporary restored-pixel saving area 47 in the FIFO order; (S9-5) a step of repeating, for the 1024 pixels or the maximum number of pixels, the process of first defining, in the large-capacity, high-speed memory 54, a restored-image storage area 92 constituted of a storage area having the same size as a restored-image-initial-value storage area 90, having the origin at the top left corner thereof, and constituted of pixel-value storage areas corresponding to the pixel coordinates of the restored image 14, then reading pixel data for one pixel in order from the temporary restored-pixel saving area 47, analyzing the label to generate pixel coordinates (x, y), and storing the pixel value at the pixel coordinates (x, y) in the corresponding storage area of the restored-image storage area 92; and (S9-6) a step of testing a hypothesis that the 1024th pixel is absent from the pixel coordinates (x, y) of the restored-image initial values 5 according to the scanning method shown in FIG. 9 with reference to the image size of the restored-image initial values 5, returning to the data preparing step S9-1 if the test result is false, and terminating the procedure if the test result is true.

Figure 12:
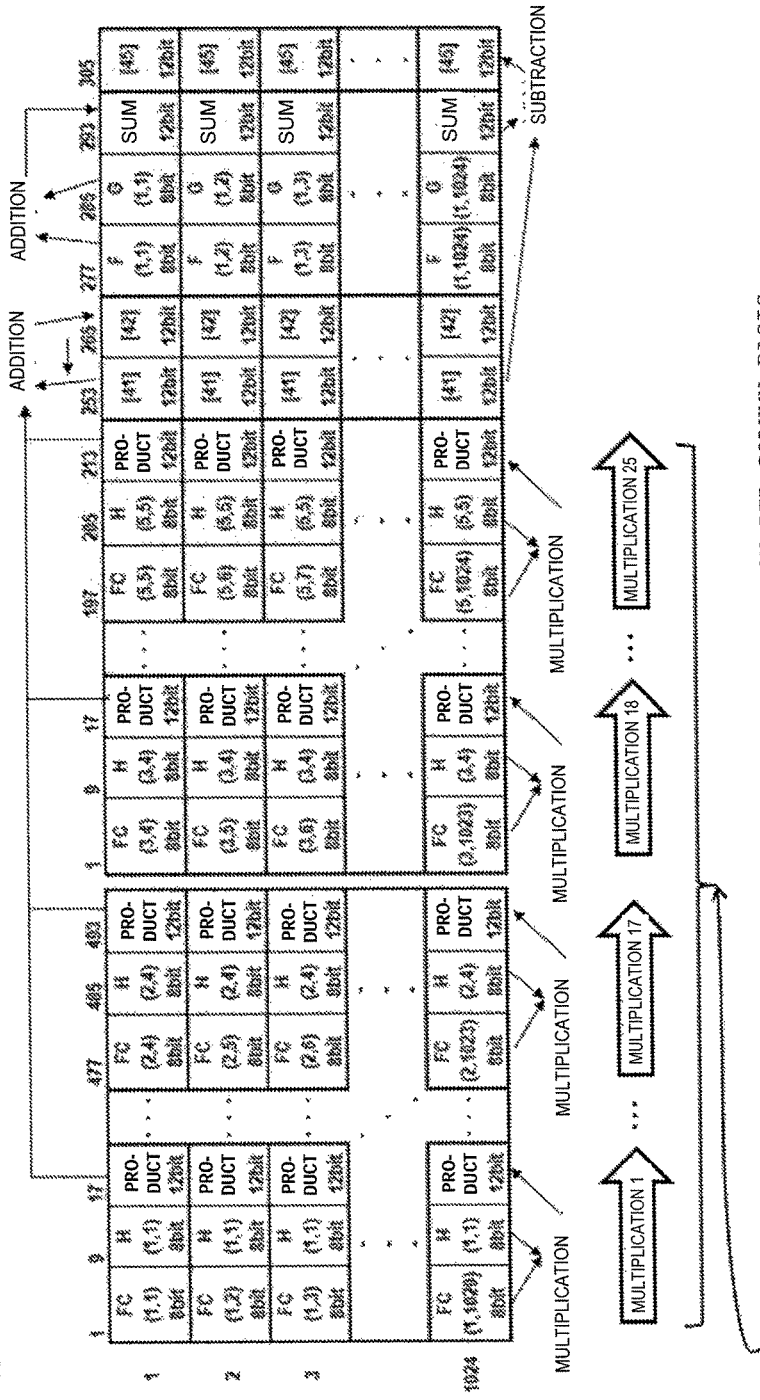
FIG. 12 is a drawing showing an example of a parallel computing method executed by an SIMD super-parallel computational processing device in the image restoring step according to the present invention.

FIG. 12 is a drawing showing an example of a parallel computation method executed in the SIMD super-parallel computational processing device 11 by using the first datasets 39 and the second datasets 40 in step S9-4. Referring to FIG. 12, the first datasets 39 and the second datasets 40 are assigned in the same manner as in FIG. 10. Multiplications, additions, and subtractions are executed concurrently on a per-column (Y addresses 1 to 1024 of the register) basis. Cumulative summation includes (1) a step of adding a product obtained by multiplication N (N is an integer and 1≤N≤25) to the value in the first cumulative-sum computation area 41 and storing the sum in the second cumulative-sum computation area 42; (2) a step of transferring the data in the second cumulative-sum computation area 42 to the first cumulative-sum computation area 41; and (3) a step of repeating (1) and (2) until these steps are executed for N=25. The cumulative sum is obtained by executing these steps.

Figure 13:
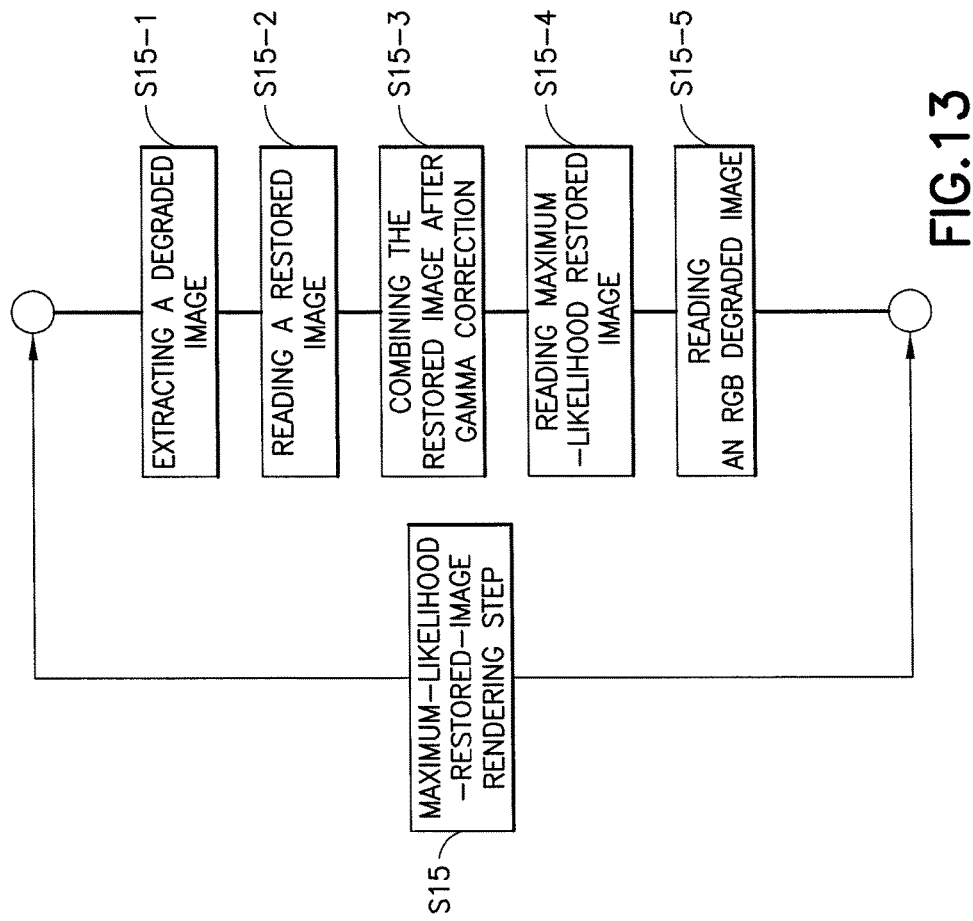
FIG. 13 is a flowchart showing an example of a maximum-likelihood-restored-image rendering step according to the present invention.

The maximum-likelihood-restored-image rendering step S15 is further divided into sub-steps. FIG. 13 is a flowchart showing an example relating to a processing procedure in the maximum-likelihood-restored-image rendering step S15. The maximum-likelihood-restored-image rendering step S15 shown in FIG. 13 includes (S15-1) a step of extracting a degraded image 1 in the RGB format from a degraded-image file 2 and subjecting the degraded image 1 to YUV conversion to extract a U degraded image 19 constituted of U color differences and a V degraded image 20 constituted of V color differences; (S15-2) a step of reading a restored image 14 constituted of a luminance distribution (Y) from the restored-image storage area 92 in the large-capacity, high-speed memory 54 and subjecting the restored image 14 to gamma correction; (S15-3) a step of combining the restored image 14 after the gamma correction, the U degraded image 19, and the V degraded image 20 to form a maximum-likelihood restored image 15 in the YUV format, defining a memory area matching the image size of the maximum-likelihood restored image 15 in a maximum-likelihood-restored-image storage area 114 in the large-capacity, high-speed memory 54, and storing the maximum-likelihood restored image 15 in the maximum-likelihood-restored-image storage area 114; (S15-4) a step of reading the maximum-likelihood restored image 15 in the YUV format from the maximum-likelihood-restored-image storage area 114, converting the maximum-likelihood restored image 15 into the RGB format, and storing the result in the maximum-likelihood-restored-image storage area 114 and outputting the result; and (S15-5) a step of reading an RGB degraded image 17 from an RGB-image storage area 84 and performing adjustment such that the RGB degraded image 17 fits the left half of the image window 25, reading the maximum-likelihood restored image 15 in the RGB format from the maximum-likelihood-restored-image storage area 114 and performing adjustment such that the maximum-likelihood restored image 15 fits the right half of the image window 25, initializing the monitor 3, and then displaying the RGB degraded image 17 and the maximum-likelihood restored image 15.

FIG. 14 is a flowchart showing an example of a processing procedure in the file rendering step S16. The file rendering step S16 shown in FIG. 14 includes (S16-1) a step of constantly monitoring designation, by clicking, of the maximum-likelihood restored image 15 in the image window 25 of the super-resolution-processing window 24; (S16-2) a step of testing a hypothesis that the maximum-likelihood restored image 15 has been designated, returning to step S16-1 if the test result is false, and proceeding to step S16-3 if the test result is true; (S16-3) a step of constantly monitoring clicking on the maximum-likelihood-restored-image-file saving button 30; (S16-4) a step of testing a hypothesis that the maximum-likelihood-restored-image-file saving button 30 has been clicked on, returning to step S16-3 if the test result is false, and proceeding to step S16-5 if the test result is true; (S16-5) a step of opening Explorer; (S16-6) a step of constantly monitoring closing of Explorer in response to the user 21 saving the file 16 of the maximum-likelihood restored image 15 in the storing step S17; (S16-7) a step of testing a hypothesis that the file has been saved and Explorer has been closed, proceeding to step S16-8 if the test result is false, and terminating the procedure if the test result is true; (S16-8) a step of displaying, in the information window 26, a message saying "The file saving failed. Click on the maximum-likelihood-restored-image-file saving button 30 to retry saving. Press the ESC (escape) button 49 on the keyboard 48 of the general-purpose computer 8 to cancel saving."; (S16-9) a step of constantly monitoring pressing of the ESC (escape) button 49 on the keyboard 48; (S16-10) a step of testing a hypothesis that the ESC (escape) button 49 on the keyboard 48 has been pressed, proceeding to step S16-11 if the test result is false, and terminating the procedure if the test result is true; (S16-11) a step of constantly monitoring clicking of the maximum-likelihood-restored-image-file saving button 30; and (S16-12) a step of testing a hypothesis that the maximum-likelihood-restored-image-file saving button 30 has been clicked on, returning to step S16-9 if the test result is false, and returning to step S16-5 if the test result is true. When super-resolution processing is completed in the super-resolution-processing window 24 and the maximum-likelihood restored image 15 is displayed in the image window 25, the user 21 clicks on and thereby designates the maximum-likelihood restored image 15 in the image window 25 in order to save the maximum-likelihood restored image 15. Then, when the user 21 clicks on the maximum-likelihood-restored-image-file saving button 30, since an OS from Microsoft (registered trademark) is used in the present invention, a window of a file system called "Explorer (registered trademark)" provided by the OS opens. In the storing step S17, the user 21 designates a suitable directory in the file system window, enters a filename, selects an appropriate image file format, and then clicks on "Save," whereby saving processing is completed.

Figures 15, 15A, 15B:
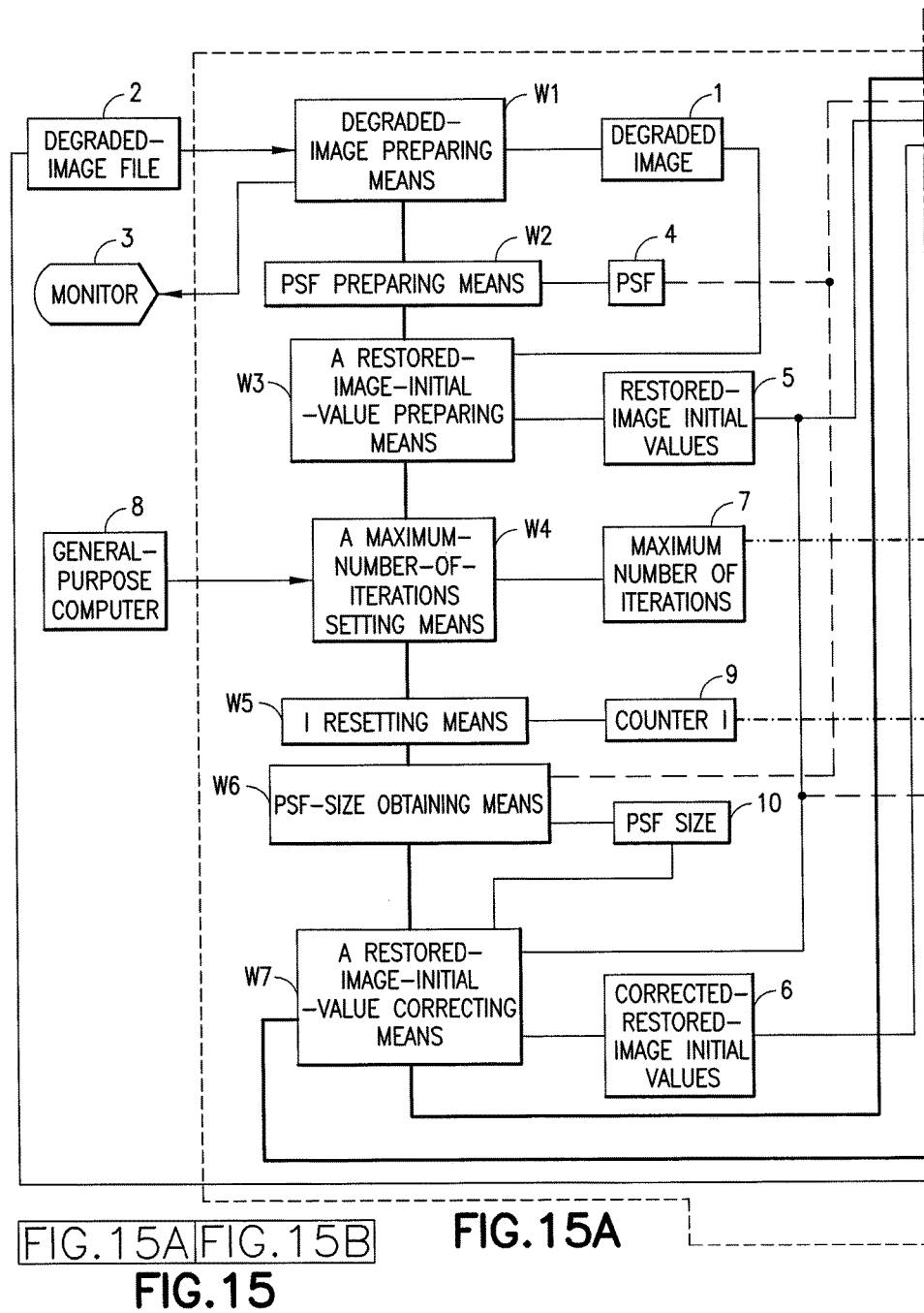
FIG. 15 is an example relating to the configuration of a super-resolution processing device for an SIMD super-parallel computing device.
Figure 15B:
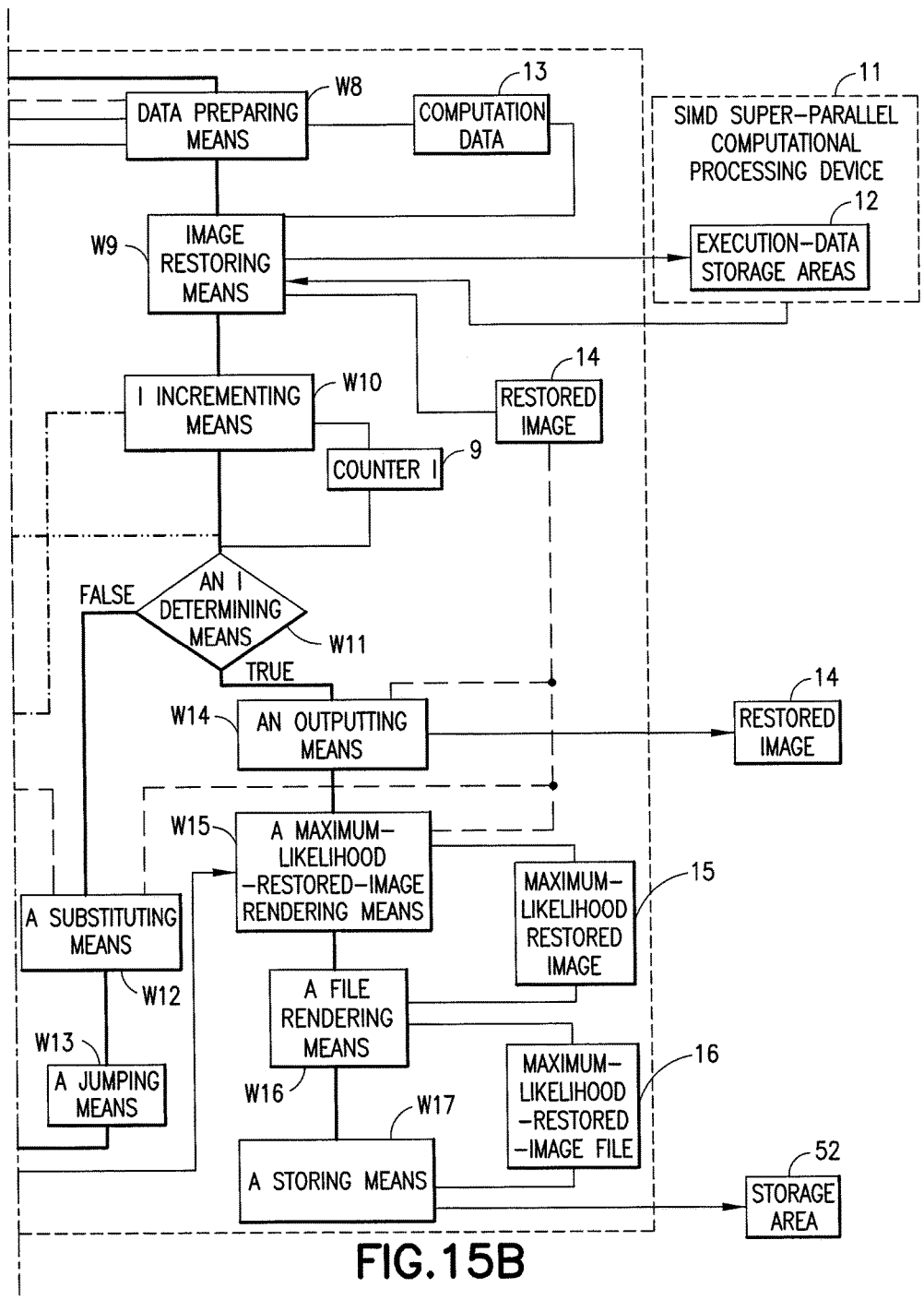

FIG. 15 is a diagram showing an example relating to the configuration of a super-resolution processing device 50 for an SIMD super-parallel computing device. With the super-resolution processing device 50 for an SIMD super-parallel computing device, shown in FIG. 15, in accordance with the super-resolution processing method for an SIMD super-parallel computing device of the first invention according to the present invention, a general-purpose computer 8 assigns some computations to an SIMD super-parallel computational processing device 11 according to a second program 80 written in a language that can be executed, loaded, and decoded, thereby reducing optical degradation included in a degraded image 1, whereby the degraded image 1 is restored to an image that is close to the pre-degradation image. Furthermore, in FIG. 15, black circles signify joints, and thick solid lines signify relationships about the order of execution.

The super-resolution processing device 50 for an SIMD super-parallel computing device, shown in FIG. 15, is characterized by including (W1) a degraded-image preparing means for preparing, from a designated degraded-image file 2, a degraded image 1 constituted of a luminance distribution and displaying the degraded image 1 on a monitor 3; (W2) a PSF preparing means for identifying a PSF 4 suitable for a degradation state of the degraded image 1 while the monitor 3 is being viewed; (W3) a restored-image-initial-value preparing means for copying the degraded image 1 and setting the degraded image 1 as restored-image initial values 5; (W4) a maximum-number-of-iterations setting means for setting a maximum number of iterations 7 with the general-purpose computer 8; (W5) an I resetting means for resetting a counter I 9 that counts the number of iterations by setting the counter I 9 to 0; (W6) a PSF-size obtaining means for obtaining the size of the PSF 4 to obtain a PSF size 10; (W7) a restored-image-initial-value correcting means for copying the restored-image initial values 5 and setting the restored-image initial values 5 as corrected-restored-image initial values 6, then calculating, from the PSF size 10, a region that becomes an excluded region when the PSF 4 is convolved with the corrected-restored-image initial values 6, and pasting the region in mirror symmetry to the outside of the corrected-restored-image initial values 6, thereby correcting the corrected-restored-image initial values 6; (W8) a data preparing means for creating and preparing computation data 13 such that datasets for one iteration can be assigned with maximum efficiency in execution-data storage areas 12 in an SIMD super-parallel computational processing device 11; (W9) an image restoring means for transferring the computation data 13 to the execution-data storage areas 12 in the SIMD super-parallel computational processing device 11 and executing computation to obtain a restored image 14; (W10) an I incrementing means for incrementing the counter I 9 by 1; (W11) an I determining means for testing a hypothesis that the value of the counter I 9 is greater than or equal to the maximum number of iterations 7, proceeding to (W12) if the test result is false, and proceeding to (W14) if the test result is true; (W12) a substituting means for substituting the restored image 14 for the restored-image initial values 5; (W13) a jumping means for returning to means (W7); (W14) an outputting means for outputting the restored image 14; (W15) a maximum-likelihood-restored-image rendering means for obtaining a maximum-likelihood restored image 15 in an RGB format from the degraded-image file 2 and the restored image 14; (W16) a file rendering means for rendering the maximum-likelihood restored image 15 into a maximum-likelihood-restored-image file 16; and (W17) a storing means for storing the maximum-likelihood-restored-image file 16 in a designated storage area 52.

The super-resolution processing device 50 for an SIMD super-parallel computing device, which constitutes a second invention according to the present invention, is an example of a device that operates in accordance with the super-resolution processing method for an SIMD super-parallel computing device, which constitutes the first invention according to the present invention. The super-resolution processing device 50 for an SIMD super-parallel computing device includes minimum necessary and sufficient means in the configuration thereof and generates a maximum-likelihood-restored-image file 16 in the RGB format at high-speed by removing optically degraded information from a degraded-image file in the RGB format.

Figure 16:
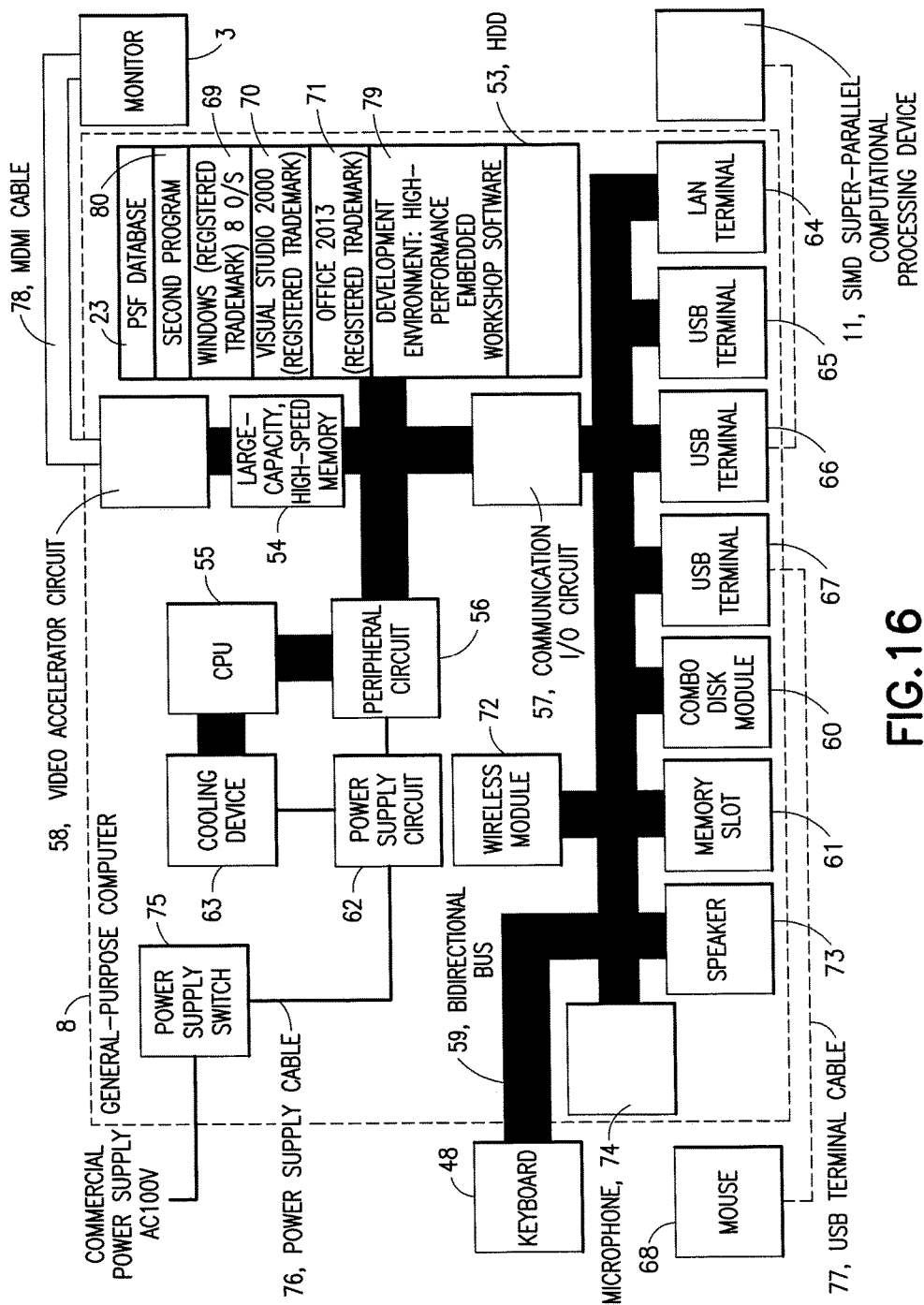
FIG. 16 is a diagram showing an example relating to the configuration of a general-purpose computer used in the present invention.

FIG. 16 is a diagram showing an example relating to the configuration of the general-purpose computer 8 used in the present invention. In FIG. 16, an SIMD super-parallel computational processing device 11 is also included as a component. The general-purpose computer 8 shown in FIG. 8 includes all the following components: a monitor 3 having a touchscreen; the SIMD super-parallel computational processing device 11; a PSF database 23; a keyboard 48; the second program 80; an HDD (Hard Disk Drive) 53 that allows high-speed random access, reading, writing, deleting, and editing and that has a capacity greater than or equal to 1 TByte; a large-capacity, high-speed memory 54 constituted of an SDRAM (Synchronous Dynamic Random Access Memory), a PSRAM (Pseudo Static Random Access Memory), an SRAM (Static Random Access Memory), and a flash memory; a 64-bit-instruction set, 32-bit CPU 55 having four or more CPU cores and a clock speed of 2 GHz or higher; a peripheral circuit 56 that manages data communication and the large-capacity, high-speed memory, controls buses, and so forth; a communication I/O circuit 57 that includes a TCP/IP (Transmission Control Protocol/Internet Protocol) modem and that supports a variety of I/O (Input/Output interfaces) including a USB (Universal Serial Bus) I/O, a LAN (Local Area Network) I/O, the PSTN (Public Switched Telephone Network) I/O, an HDMI (High-Definition Multimedia Interface, registered trademark) I/O, an I/O for communication with the keyboard 48, a memory card I/O, a combo disk module I/O that allows playing, recording, and deleting on CDs, DVDs, and Blu-ray discs, and a monitor I/O and an audio I/O that provide video data to the monitor 3 and that forward data received from the touchscreen of the monitor 3 to the CPU 55; a video accelerator circuit that sends and receives video data, that codes and decodes video data, and that executes various kinds of image processing; a bilateral bus 59; a combo disk module 60; a memory slot 61; a power supply circuit 62; a cooling device that performs cooling as appropriate according to instructions from the CPU 55; a LAN terminal 64; USB terminals 65 to 67; a mouse 68; Microsoft Windows (registered trademark) 8 O/S 69; Microsoft Visual Studio 2010 (registered trademark) (including Visual C++ 2010) 70; Microsoft Office 2013 (registered trademark) (Excel 2013 (registered trademark), Word 2013 (registered trademark), Power Point 2013 (registered trademark)) 71; a wireless communication module such as WiFi (Wireless Fidelity) or Bluetooth (registered trademark) module 72; a speaker 73; a microphone 74; a power supply switch 75; a power supply cable 76; a USB cable 77; an MDMI (registered trademark) cable 78; and a development environment, High-performance Embedded Workshop software 79.

Referring to FIG. 16, the PSF database 23, the first program 51, the Windows (registered trademark) 8 O/S 69, Visual Studio 2010 (registered trademark) 70, Office 2013 (registered trademark), and the development environment High-performance Embedded Workshop software 79 are already stored in the HDD 53.

As the general-purpose computer 8 shown in FIG. 16, various products available on the market, such as Windows (registered trademark)-based notebook PCs or desktop PCs, can be used. Furthermore, as the SIMD super-parallel computational processing device 11, for example, "MX development toolkit for the Super RISC engine family" from Renesas Electronics Corporation, and this kit is used in the present invention. This kit is constituted of a board having the SIMD super-parallel computational processing device 11 called "MX core" mounted thereon and software needed to drive hardware in the circuit board, for example, "MX code generating-tool" for translating a source program prepared in C into an object program executable by the MX core, a debugger, and a simulator. In the super-resolution processing device 50 for an SIMD super-parallel computing device according to the present invention, as shown in FIG. 16, the general-purpose computer 8 and the SIMD super-parallel computational processing device 11 are connected to each other via the USB cable 77, and the integrated development environment High-performance Embedded Workshop software 79, needed to run the SIMD super-parallel computational processing device 11 via the general-purpose computer 8, is installed in advance on the general-purpose computer 8.

A third invention according to the present invention is a first program 51 for causing the general-purpose computer 8 to execute the super-resolution processing method for an SIMD super-parallel computing device according to the first invention. The first program 51 is written in C++, HTML, XTML, and JAVA (registered trademark).

A fourth invention according to the present invention is a first storage medium characterized in that it stores the first program according to the third invention, in that it allows connection to the general-purpose computer 8, and in that it allows loading and execution of the first program by the general-purpose computer 8. As the first storage medium, a DVD (Digital Versatile Disc), a CD (Compact Disc), a flash memory card, an SD memory card, a USB memory, etc. can be used. The first program can be recorded in an encrypted form, read by the general-purpose computer 8 in the encrypted form, and decrypted and then installed on the general-purpose computer 8. Furthermore, a USB memory or SDHC memory card that includes an encryption/decryption circuit and that allows password locking may also be used. In the present invention, a USB memory that includes an encryption/decryption circuit is used. Furthermore, AES with an encryption strength of 256 bits, DES, etc. may be used for encryption.

A fifth invention according to the present invention is a second program 80 for causing the general-purpose computer 8 to function as the super-resolution processing device 50 for an SIMD super-parallel computing device according to the second invention. The second program 80 is written in the same language as the first program 51.

Figure 17:
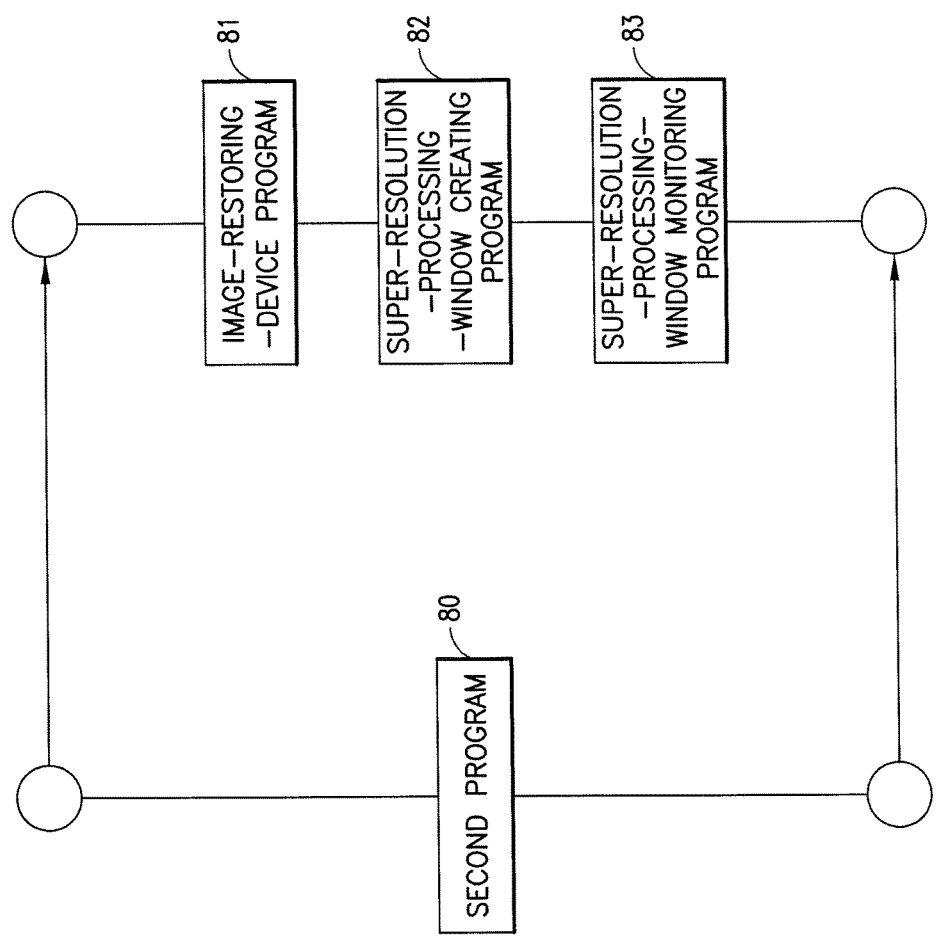
FIG. 17 is a diagram showing an example relating to the structure of a second program according to the present invention.

FIG. 17 is a diagram showing an example relating to the structure of the second program 80. The second program 80 shown in FIG. 17 includes an image-restoring-device program 81 for virtually implementing, in the general-purpose computer 8, all the means constituting the super-resolution processing device 50 for an SIMD super-parallel computing device; a super-resolution-processing-window creating program 82 for creating the super-resolution-processing window 24 and displaying the super-resolution-processing window 24 on the monitor 3; and a super-resolution-processing-window monitoring program 83 for constantly monitoring images and buttons in the super-resolution-processing window 24, the ESC button 49, Enter button, Page Up button, and Page down button on the keyboard 48 and executing necessary processing in cooperation with the image-restoring-device program 81. Furthermore, in FIG. 17, thick solid lines signify relationships about the order of execution.

A sixth invention according to the present invention is a second storage medium characterized in that it stores the second program 80 according to the fifth invention, in that it allows connection to the general-purpose computer 8, and in that it allows loading and execution of the second program by the general-purpose computer 8. The same kind of storage media used as the first storage medium can also be used as the second storage medium. In the present invention, the same kind of USB memory including an encryption/decryption circuit used as the first storage medium is used as the second storage medium.

Figure 18:
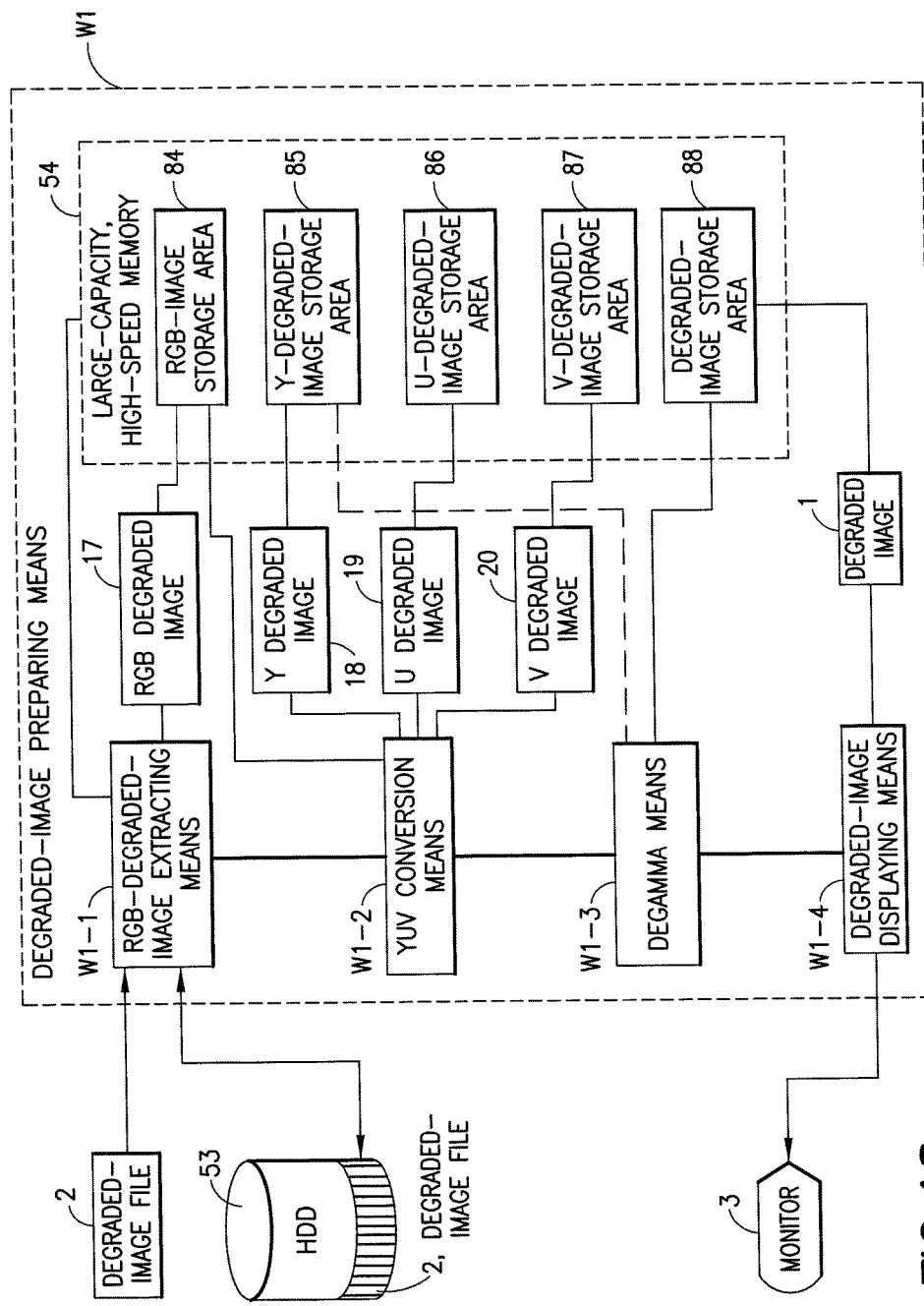
FIG. 18 is a diagram showing an example relating to the configuration of a degraded-image preparing means according to the present invention.

FIG. 18 shows an example relating to the configuration of the degraded-image preparing means W1. The degraded-image preparing means W1 shown in FIG. 18 includes an RGB-degraded-image extracting means W1-1, a YUV conversion means W1-2, a degamma means W1-3, and a degraded-image displaying means W1-4. The "RGB-degraded-image extracting means W1-1" reads a degraded-image file 2 and stores it in the HDD 53, extracts, from the degraded-image file 2 stored in the HDD 53, an RGB degraded image 17 constituted of RGB pixel data, defines memory areas matching the image size of the RGB degraded image 17 in the large-capacity, high-speed memory 54 as an RGB-image storage area 84, a Y-degraded-image storage area 85, a U-degraded-image storage area 86, a V-degraded-image storage area 87, and a degraded-image storage area 88, and then stores the RGB degraded image 17 in the RGB-image storage area 84. The "YUV conversion means W1-2" subjects the RGB degraded image 17 stored in the RGB-image storage area 84 to YUV conversion, extracts a Y degraded image 18 constituted of Y (luminance) components and stores it in the Y-degraded-image storage area 85, extracts a U degraded image 19 constituted of U (blue color difference) components and stores it in the U-degraded-image storage area 86, and extracts a V degraded image 20 constituted of V (red color difference) components and stores it in the V-degraded-image storage area 87. The "degamma means W1-3" subjects the Y degraded image 18 stored in the Y-degraded-image storage area 85 to degamma processing and stores the Y degraded image 18 after the degamma processing in the degraded-image storage area 88 to form a degraded image 1. The "degraded-image display means W1-4" reads the degraded image 1 from the degraded-image storage area 88 and displays it on the monitor 3.

Figure 19B:
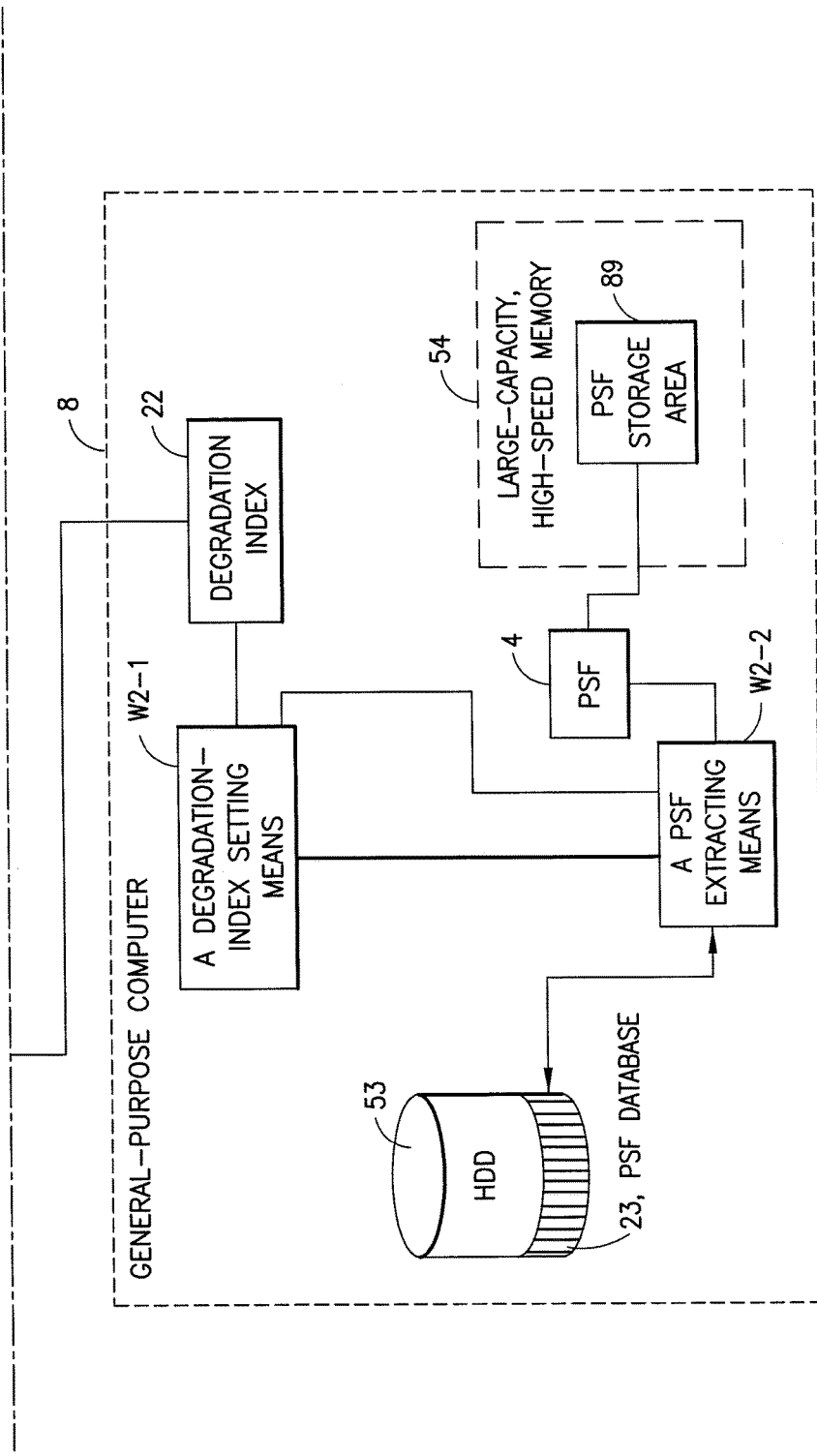
FIG. 19 is a diagram showing an example relating to the configuration of a PSF preparing means according to the present invention.

FIG. 19 is a diagram showing an example relating to the configuration of the PSF preparing means W2. The PSF preparing means W2 shown in FIG. 19 includes (W2-1) a degradation-index setting means with which the user 21 sets a degradation index 22 corresponding to a degradation state of the degraded image 1 by operating the degradation-index setting button 27 in the super-resolution-processing window 24 while viewing the degraded image 1 displayed in the image window 25 in the super-resolution-processing window 24 displayed on the monitor 3 of the general-purpose computer 8; and (W2-2) a PSF extracting means, having stored in the HDD 53 a PSF database 23 created by organizing PSFs in association with degradation indices, for searching the PSF database 23 in the HDD 53 for a PSF 4 matching the degradation index 22, and obtaining a hit PSF 4 and storing it in the PSF storage area 89 in the large-capacity, high-speed memory 54, thereby selecting and extracting the PSF 4 matching the degradation index 22. Furthermore, in FIG. 19, thick solid lines signify relationships about the order of execution.

An example relating to the processing in the restored-image-initial-value preparing means W3 is as follows. The degraded image 1 is read from the degraded-image storage area 88, memory areas matching the image size of the degraded image 1 are prepared in the restored-image-initial-value storage area 90 in the large-capacity, high-speed memory 54, and then the degraded image 1 is stored in the restored-image-initial-value storage area 90. Furthermore, the degraded image 1 is set as the restored-image initial values 5 by reading the degraded image 1 from the restored-image-initial-value storage area 90 as the restored-image initial values 5. The restored-image-initial-value storage area 90 is implemented by a two-dimensional array that is larger than the total number of pixels of the degraded image 1, and the coordinates of the pixels of the degraded image 1 and the coordinates of the two-dimensional array correspond one-to-one with each other. Furthermore, it is possible to freely modify the restored-image-initial-value storage area 90 before actually storing restored-image initial values 5 by declaring it such that the array size thereof matches the image size of the restored-image initial values 5.

An example relating to the processing in the maximum-number-of-iterations setting means W4 is as follows. When the user selects an arbitrary maximum number of iterations 7 by operating the maximum-number-of-iterations setting button 28 in the super-resolution-processing window 24 displayed on the monitor 3 of the general-purpose computer 8, it is stored in a variable I_max in the large-capacity, high-speed memory 54. This makes it possible to set the maximum number of iterations 7 via the general-purpose computer 8.

The counter I 9 in the I resetting means W5, which counts the number of iterations, is used, for example, as follows. An integer-type variable I is prepared in advance in the large-capacity, high-speed memory 54 and is reset by assigning 0 to I. After the PSF-size obtaining means W6 to image restoring means W9 are executed, the I incrementing means W10 is executed to increment I by 1. Then, the I determining means W1 is executed, the outputting means W14 is executed if the value of I is greater than or equal to the maximum number of iterations 7, and otherwise the substituting means W12 and the jumping means W13 are executed. When used in this manner, the variable I works as a counter. This way of usage is widely known.

The PSF-size obtaining means W6, in an example relating to the configuration thereof, is characterized by including (W6-1) an H-size calculating means for reading the PSF 4 stored in the PSF storage area 89, obtaining a PSF size 10 in the form of numerical values representing the horizontal number of pixels HW and the vertical number of pixels HL, and storing these values individually in variables HW and HL in the large-capacity, high-speed memory 54; and (W6-2) a corrected-value computing means for, on the basis of the PSF size 10, setting the integer part of the quotient obtained by dividing HW by 2 as a horizontal-size corrected value Cw and storing it in a variable Cw in the large-capacity, high-speed memory 54, and setting the integer part of the quotient obtained by dividing HL by 2 as a vertical-size corrected value Cl and storing it in a variable Cl in the large-capacity, high-speed memory 54.

Figure 20:
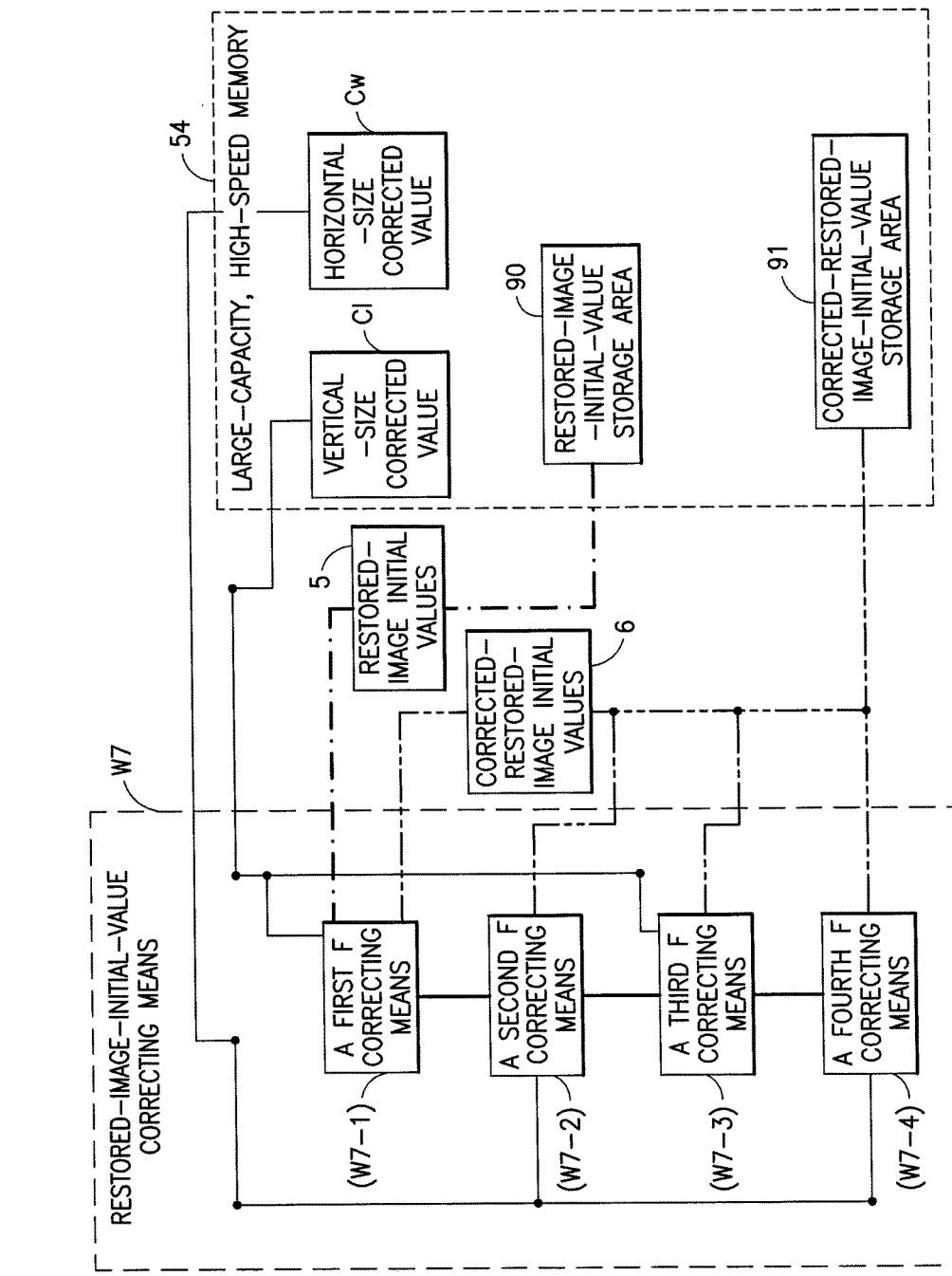
FIG. 20 is a diagram showing an example relating to the configuration of a restored-image-initial-value correcting means according to the present invention.

FIG. 20 is a diagram showing an example relating to the configuration of the restored-image-initial-value correcting means W7. The restored-image-initial-value correcting means W7 shown in FIG. 20 includes (W7-1) a first F correcting means for reading the restored-image initial values 5 stored in the restored-image-initial-value storage area 90, setting the size of the corrected-restored-image-initial-value storage area 91 in the large-capacity, high-speed memory 54 to be equal to the result of adding 2Cw to the horizontal size and adding 2Cl to the horizontal size of the restored-image initial values 5, and then storing the corrected-restored-image initial values 6 in the corrected-restored-image-initial-value storage area 91, the corrected-restored-image initial values 6 being created by copying, in mirror symmetry, Cl pixel rows located on the inner side of the top edge of the restored-image initial values 5 to the outer side of the top edge of the restored-image initial values 5; (W7-2) a second F correcting means for reading the corrected-restored-image initial values 6 stored in the corrected-restored-image-initial-value storage area 91, copying, in mirror symmetry, Cw pixel columns located on the inner side of the right edge of the corrected-restored-image initial values 6 to the outer side of the right edge of the corrected-restored-image initial values 6, and storing the result in the corrected-restored-image-initial-value storage area 91; (W7-3) a third F correcting means for reading the corrected-restored-image initial values 6 stored in the corrected-restored-image-initial-value storage area 91, copying, in mirror symmetry, Cl pixel rows located on the inner side of the bottom edge of the corrected-restored-image initial values 6 to the outer side of the bottom edge of the corrected-restored-image initial values 6, and storing the result in the corrected-restored-image-initial-value storage area 91; and (W7-4) a fourth F correcting step of reading the corrected-restored-image initial values 6 stored in the corrected-restored-image-initial-value storage area 91, copying, in mirror symmetry, Cw pixel columns located on the inner side of the left edge of the corrected-restored-image initial values 6 to the outer side of the left edge of the corrected-restored-image initial values 6, and storing the result in the corrected-restored-image-initial-value storage area 91. Furthermore, in FIG. 20, black circles signify joints, and thick solid lines signify relationships about the order of execution.

Figure 21:
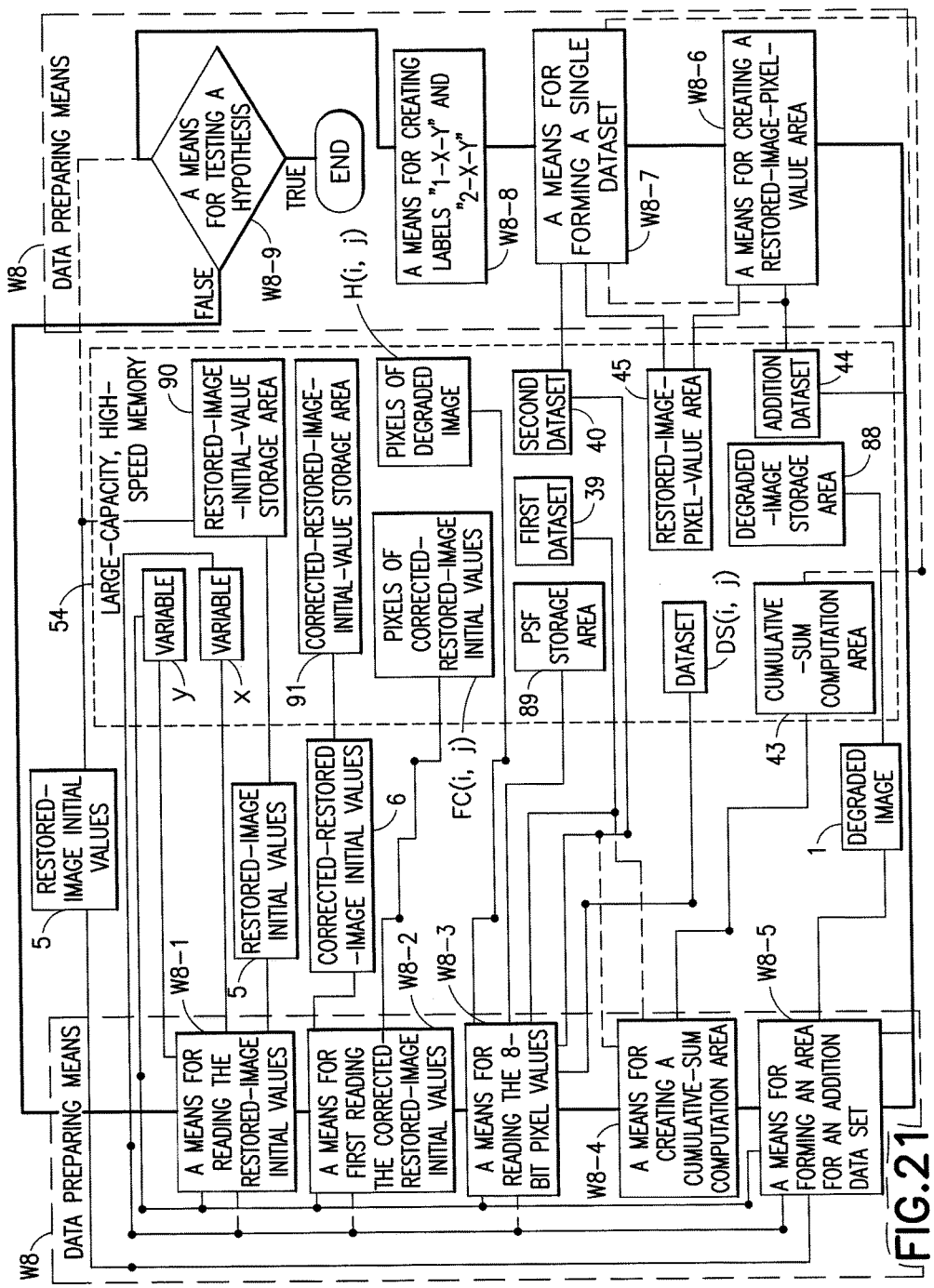
FIG. 21 is a diagram showing an example relating to the configuration of a data preparing means according to the present invention.

FIG. 21 is a diagram showing an example relating to the configuration of the data preparing means W8. The data preparing means W8 shown in FIG. 21 includes (W8-1) a means for reading the restored-image initial values 5 stored in the restored-image-initial-value storage area 90, obtaining an image size based on the number of pixels of the restored-image initial values 5, and generating coordinates (x, y) of a pixel in order by using the pixel at the top left corner of the restored-image initial values 5 as the origin, moving horizontally from a left-end pixel to a right-end pixel, then moving vertically downward by one pixel and returning to a left-end pixel, moving horizontally from this left-end pixel to a right-end pixel, and so forth according to the method shown in FIG. 9, and storing the coordinates (x, y) in the variables x and y in the large-capacity, high-speed memory 54; (W8-2) a means for first reading the corrected-restored-image initial values 6 stored in the corrected-restored-image-initial-value storage area 91, newly setting, among the pixels of the corrected-restored-image initial values 6, the pixel at coordinates (x, y) having coordinates x and y stored in the variables x and y in the large-capacity, high-speed memory 54 as the origin (i=1, j=1), reading the 8-bit pixel values of the pixels in a region including the origin (i=1, j=1) and formed of 5 pixels in the rightward direction (i in a range of 1 to 5) and five pixels in the downward direction (j in a range of 1 to 5), and storing the pixel values in a 5×5 two-dimensional array variable FC(i, j), thereby constituting FC(i, j); (W8-3) a means for reading the 8-bit pixel values of the 5×5 pixels (i in a range of 1 to 5 and j in a range of 1 to 5) of the PSF 4 stored in the PSF storage area 89, storing the pixel values in a 5×5 two-dimensional array variable H(i, j) having the origin (1, 1) at the top left corner thereof, thereby constituting H(i, j), and in order to allow multiplication of the pixel values of FC(i, j) by the pixel values of H(i, j) having the same coordinates, while changing the coordinates of H(i, j) and FC(i, j) so as to move vertically downward from the origin, then moving horizontally by one pixel, again moving vertically downward, and so forth, creating, for each combination of i (integer from 1 to 5) and j (integer from 1 to 5), a dataset DS(i, j) in which the 8-bit value of FC(i, j), the 8-bit value of H(i, j) having the same coordinates, and a 12-bit product storage area used to write the product of these values are concatenated together in this order, storing the datasets DS(i, j) individually in a two-dimensional array variable DS(i, j) in the large-capacity, high-speed memory 54, defining the first 17 datasets DS(i, j) in ascending order of the sum of i and j, concatenated together in that order, as a first dataset 39 in the large-capacity, high-speed memory 54, the first dataset 39 being transferred to and stored in a predetermined Y address area in the left bank of the execution-data storage area 12 as aligned to the left, and defining the remaining 8 datasets DS(i, j) constituted of the eighteenth to twenty-fifth datasets DS(i, j) in ascending order of the sum of i and j, concatenated together in that order, as a second dataset 40 in the large-capacity, high-speed memory 54, the second dataset 40 being transferred to and stored at the Y addresses in the right bank of the execution-data storage area 12, coinciding with the Y addresses of the left bank, as aligned to the left; (W8-4) a means for creating a cumulative-sum computation area 43 by creating the cumulative-sum computation area 43 in the large-capacity, high-speed memory 54, the cumulative-sum computation area 43 being formed by concatenating together a first cumulative-sum computation area 41 and a second cumulative-sum computation area 42, the first cumulative-sum computation area 41 having a 12-bit width and used to read products from the product storage areas of the first dataset 39 and the second dataset 40 one by one while avoiding duplicates and to add up the products, and the second cumulative-sum computation area 42 having a 12-bit width and used to store the sum obtained by adding up the products; (W8-5) assuming that the degraded image 1 stored in the degraded-image storage area 88 has the origin at the top left corner of the pixel plane thereof and an arbitrary pixel of the degraded image 1 can be indicated as G(x, y) and that the restored-image initial values 5 stored in the restored-image-initial-value storage area 90 have the origin at the top left corner of the pixel plane thereof and an arbitrary pixel of the restored-image initial values 5 can be indicated as F(x, y), a means for forming an area for an addition data set 44 by defining it in the large-capacity, high-speed memory 54, the addition dataset 44 being a concatenation of a data pair formed so as to allow addition of the 8-bit pixel value of G(x, y) and the 8-bit pixel value of F(x, y) and an empty 12-bit area for storing the result of addition; (W8-6) a means for creating a restored-image-pixel-value area 45 by defining it in the large-capacity, high-speed memory 54, the restored-image-pixel-value area 45 having a 12-bit width and used to subtract the result stored last in the first cumulative-sum computation area 41 from the value in the result storage area in the addition dataset 44 and to store the pixel value of the restored image 14 obtained by the subtraction; (W8-7) a means for concatenating the cumulative-sum computation area 43 after the second dataset 40, further concatenating the addition dataset 44, and further concatenating the restored-image-pixel-value area 45, thereby forming a single dataset and newly creating this dataset as a second dataset 40 by defining it in the large-capacity, high-speed memory 54; (W8-8) a means for creating labels "1-$x$-$y$" and "2-$x$-$y$" from x and y and labeling the first dataset 39 as "1-$x$-$y$" and the second dataset 40 as "2-$x$-$y$"; and (W8-9) a means for testing a hypothesis that no pixel for which computation has not been executed remains in the restored-image initial values 5, returning to S8-1 if the test result is false, and terminating the procedure if the test result is true. Furthermore, in FIG. 21, black circles signify joints, and thick solid lines signify relationships about the order of execution.

In the left and right banks of the execution-data storage area 12, the top left corner is considered as the origin, and a 1-bit register exists at each of the intersections of x addresses 1 to 512 and y addresses 1 to 1024 (FIGS. 10 and 12). In the present invention, data is set and computed under the rule of 1 pixel/Y address, and the pixel values of the restored image 14 are stored in the restored-image-pixel-value area 45. Thus, the first dataset 39 and the second dataset 40 are transferred to the left bank and the right bank, respectively, of the execution-data storage area 12 at a single Y address. Furthermore, labels are assigned to the first dataset 39 and the second dataset 40. The labels are useful in transferring the first dataset 39 and the second dataset 40 to the left bank and the right bank of the execution-data storage area 12 and in transferring the pixel values of the restored image 14 from the restored-image-pixel-value area 45. An example of the first datasets 39 and the second datasets 40 that are created is shown in FIG. 10.

The means W8-8 newly assigns a label "1-$x$-$y$" to the first dataset 39 in the large-capacity, high-speed memory 54. This is possible by creating in advance a variable 1-$x$-$y$( ) declared as a binary variable, having a 512-bit width, and having a variable name "1-$x$-$y$", reading the first dataset 39 in the large-capacity, high-speed memory 54, and copying the first dataset 39 to the variable 1-$x$-$y$( ). This method is a known part of ordinary program creating methods.

Figure 22:
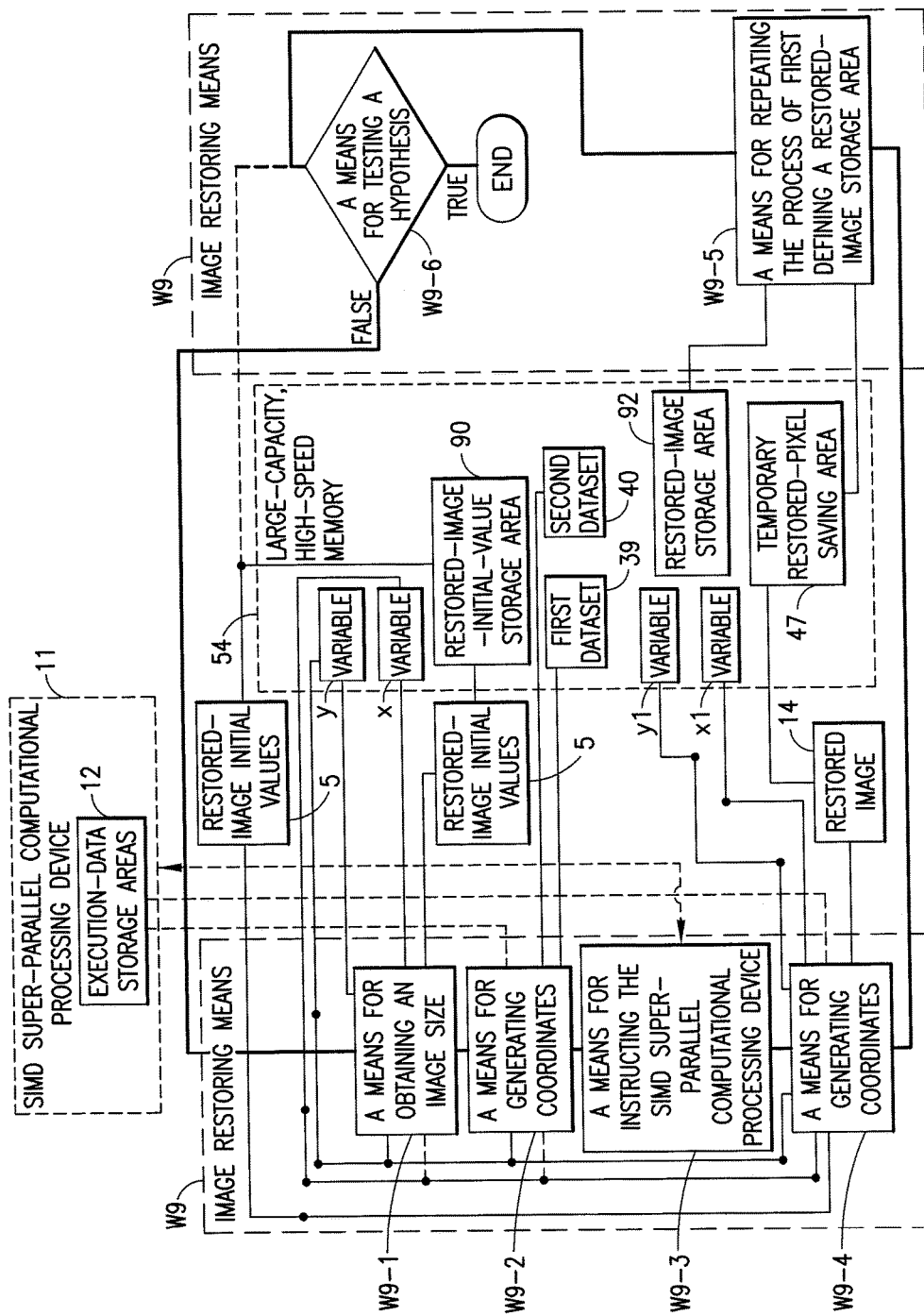
FIG. 22 is a diagram showing an example of an image restoring means according to the present invention.

FIG. 22 is a diagram showing an example relating to the configuration of the image restoring means W9. The image restoring means W9 shown in FIG. 22 includes (W9-1) a means for obtaining an image size based on the number of pixels of the restored-image initial values 5 stored in the restored-image-initial-value storage area 90, and according to the scanning method shown in FIG. 9, generating coordinates (x, y) 46 of a pixel of the restored-image initial values 5 at intervals of 1024 pixels while changing the coordinates of the pixel to be read by horizontally moving from a left-end pixel to a right-end pixel, then moving vertically downward by one pixel and returning to a left-end pixel, moving horizontally from the left-end pixel to a right-end pixel, and so forth, and storing the coordinates (x, y) in variable x( ) and variable y( ) of a large-capacity, high-speed memory 54; (W9-2) a means for generating coordinates including origin-pixel coordinates (x, y) according to the scanning method shown in FIG. 9 by using the coordinates (x, y) 46 as a starting pixel while simultaneously generating labels "1-$x$-$y$" and "2-$x$-$y$" from the coordinates, reading the first datasets 39 and the second datasets 40 for 1024 pixels or a maximum number of pixels from the large-capacity, high-speed memory 54, and transferring the first datasets 39 to the left bank of the execution-data storage area 12 and the second datasets 40 to the right bank of the execution-data storage area 12 in the FIFO order such that these datasets 39 and 40 are individually aligned to the left; (W9-3) by using the transferred first datasets 39 and second datasets 40 in the SIMD super-parallel computational processing device 11, a means for instructing the SIMD super-parallel computational processing device 11 to first execute multiplications constituting a convolution concurrently for the 1024 pixels, to then obtain the cumulative sum of the 25 products concurrently for the 1024 pixels, to then add together the value of the degraded image 1 and the value of the restored-image initial values 5 concurrently for the 1024 pixels, to subtract, from the resulting sums for the 1024 pixels, the cumulative sums for the 1024 pixels by a single computation, and to store the results as the 1024 pixels of the restored image 14 in the column of a restored-image-pixel-value area 45 in the right bank in the execution-data storage area 12, and detecting that the computation has ended; (W9-4) a means for generating coordinates (x1, y1) for 1024 pixels or the maximum number of pixels including the pixel coordinates (x, y) 46 as a starting pixel according to the scanning method shown in FIG. 9, saving the coordinates (x1, y1) in variables x1 and y1 of the large-capacity, high-speed memory 54 while creating a label "F-x1-$y$1" from x1 and y1, creating a variable F-x1-$y$1( ), having this label as the variable name thereof, for saving the pixel value of the restored image 14 for each of the 1024 pixels or the maximum number of pixels, creating, in the large-capacity, high-speed memory 54, a temporary restored-pixel saving area 47 forming a column of variables, arrayed vertically in the order of creation, for storing the pixel values of the 1024 pixels or the maximum number of pixels, and then reading the pixel values of the 1024 pixels or the maximum number of pixels of the restored image 14 from the column of the restored-image-pixel-value area 45 in the right bank of the execution-data storage area 12 and transferring the pixel values to the temporary restored-pixel saving area 47 in the FIFO order; (W9-5) a means for repeating, for the 1024 pixels or the maximum number of pixels, the process of first defining, in the large-capacity, high-speed memory 54, a restored-image storage area 92 constituted of a storage area having the same size as a restored-image-initial-value storage area 90, having the origin at the top left corner thereof, and constituted of pixel-value storage areas corresponding to the pixel coordinates of the restored image 14, then reading pixel data for one pixel in order from the temporary restored-pixel saving area 47, analyzing the label to generate pixel coordinates (x, y), and storing the pixel value at the pixel coordinates (x, y) in the corresponding restored-image storage area 92; and (W9-6) a means for testing a hypothesis that the 1024th pixel is absent from the pixel coordinates (x, y) of the restored-image initial values 5 according to the scanning method shown in FIG. 9 with reference to the image size of the restored-image initial values 5, returning to the data preparing means W9-1 if the test result is false, and terminating the procedure if the test result is true. FIG. 12 shows an example of computation executed by the image restoring means W9. The image restoring means W9 executes computation in units of 1024 pixels or the maximum number of pixels to store and configure a restored image 14 in the restored-image storage area 92. Furthermore, in FIG. 22, black circles signify joints, and thick solid lines signify relationships about the order of execution.

As an example of the processing procedure executed by the substituting means W12, the restored image 14 stored in the restored-image storage area 92 is transferred to the restored-image-initial-value storage area 90 in the FIFO order to substitute the restored image 14 for the restored-image initial values 5.

Figure 23:
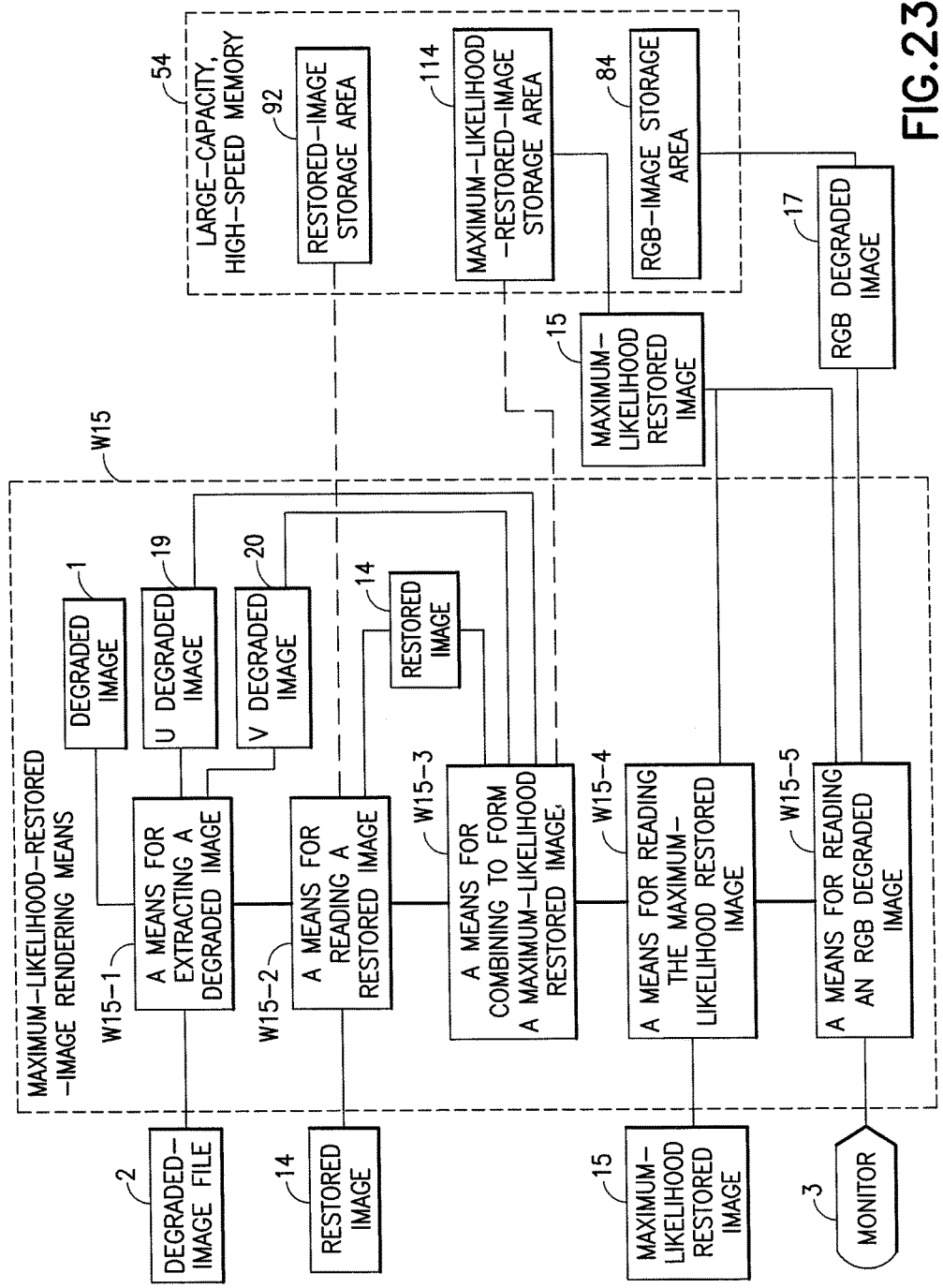
FIG. 23 is a diagram showing an example relating to the configuration of a maximum-likelihood-restored-image rendering means according to the present invention.

The maximum-likelihood-restored-image rendering means W15 is further divided into sub-means. FIG. 23 is a diagram showing an example relating to the configuration of the maximum-likelihood-restored-image rendering means W15. The maximum-likelihood-restored-image rendering means W15 shown in FIG. 23 includes (W15-1) a means for extracting a degraded image 1 in the RGB format from a degraded-image file 2 and subjecting the degraded image 1 to YUV conversion to extract a U degraded image 19 constituted of U color differences and a V degraded image 20 constituted of V color differences; (W15-2) a means for reading a restored image 14 constituted of a luminance distribution (Y) from the restored-image storage area 92 in the large-capacity, high-speed memory 54 and subjecting the restored image 14 to gamma correction; (W15-3) a means for combining the restored image 14 after the gamma correction, the U degraded image 19, and the V degraded image 20 to form a maximum-likelihood restored image 15 in the YUV format, defining a memory area matching the image size of the maximum-likelihood restored image 15 in a maximum-likelihood-restored-image storage area 114 in the large-capacity, high-speed memory 54, and storing the maximum-likelihood restored image 15 in the maximum-likelihood-restored-image storage area 114; (W15-4) a means for reading the maximum-likelihood restored image 15 in the YUV format from the maximum-likelihood-restored-image storage area 114, converting the maximum-likelihood restored image 15 into the RGB format, and storing the result in the maximum-likelihood-restored-image storage area 114 and outputting the result; and (W15-5) a means for reading an RGB degraded image 17 from an RGB-image storage area 84 and performing adjustment such that the RGB degraded image 17 fits the left half of the image window 25, reading the maximum-likelihood restored image 15 in the RGB format from the maximum-likelihood-restored-image storage area 114 and performing adjustment such that the maximum-likelihood restored image 15 fits the right half of the image window 25, initializing the monitor 3, and then displaying the RGB degraded image 17 and the maximum-likelihood restored image 15. Furthermore, in FIG. 23, thick solid lines signify relationships about the order of execution.

Figure 24:
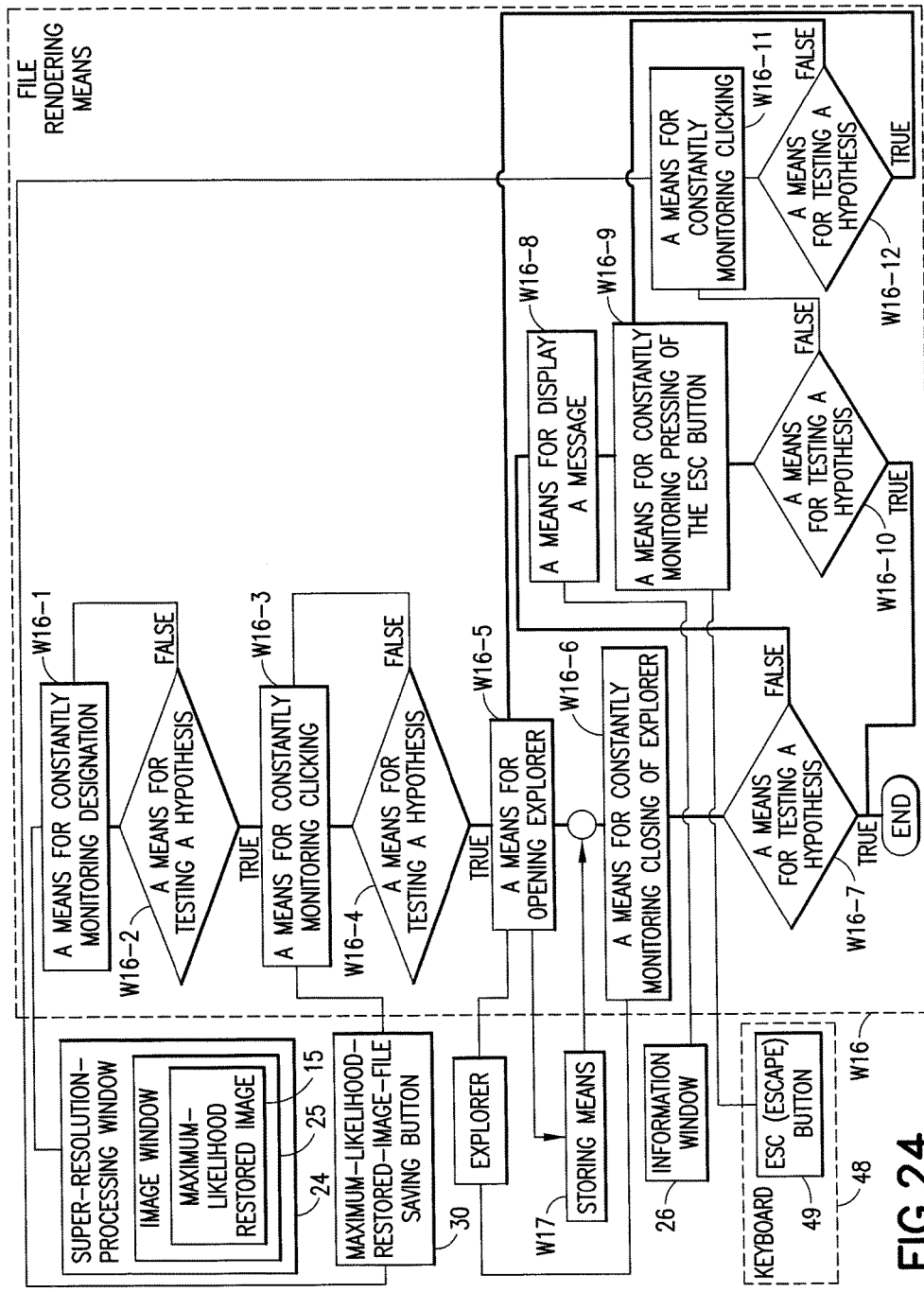
FIG. 24 is an example relating to the configuration of a file rendering means according to the present invention.

FIG. 24 is a diagram showing an example relating to the configuration of the file rendering means W16. The file rendering means W16 shown in FIG. 24 includes (W16-1) a means for constantly monitoring designation, by clicking, of the maximum-likelihood restored image 15 in the image window 25 of the super-resolution-processing window 24; (W16-2) a means for testing a hypothesis that the maximum-likelihood restored image 15 has been designated, returning to means W16-1 if the test result is false, and proceeding to means W16-3 if the test result is true; (W16-3) a means for constantly monitoring clicking on the maximum-likelihood-restored-image-file saving button 30; (W16-4) a means for testing a hypothesis that the maximum-likelihood-restored-image-file saving button 30 has been clicked on, returning to means W16-3 if the test result is false, and proceeding to means W16-5 if the test result is true; (W16-5) a means for opening Explorer; (W16-6) a means for constantly monitoring closing of Explorer in response to the user 21 saving the file 16 of the maximum-likelihood restored image 15 with the storing means W17; (W16-7) a means for testing a hypothesis that the file has been saved and Explorer has been closed, proceeding to means W16-8 if the test result is false, and terminating the procedure if the test result is true; (W16-8) a means for displaying, in the information window 26, a message saying "The file saving failed. Click on the maximum-likelihood-restored-image-file saving button 30 to retry saving. Press the ESC (escape) button 49 on the keyboard 48 of the general-purpose computer 8 to cancel saving."; (W16-9) a means for constantly monitoring pressing of the ESC (escape) button 49 on the keyboard 48; (W16-10) a means for testing a hypothesis that the ESC (escape) button 49 on the keyboard 48 has been pressed, proceeding to means W16-11 if the test result is false, and terminating the procedure if the test result is true; (W16-11) a means for constantly monitoring clicking of the maximum-likelihood-restored-image-file saving button 30; and (W16-12) a means for testing a hypothesis that the maximum-likelihood-restored-image-file saving button 30 has been clicked on, returning to means W16-9 if the test result is false, and returning to means W16-5 if the test result is true. When super-resolution processing is completed in the super-resolution-processing window 24 and the maximum-likelihood restored image 15 is displayed in the image window 25, the user 21 clicks on and thereby designates the maximum-likelihood restored image 15 in the image window 25 in order to save the maximum-likelihood restored image 15. Then, when the user 21 clicks on the maximum-likelihood-restored-image-file saving button 30, since an OS from Microsoft is used in the present invention, a window of a file system called "Explorer (registered trademark)" provided by the OS opens. With the storing means W17, the user 21 designates a suitable directory in the file system window, enters a filename, selects an appropriate image file format, and then clicks on "Save," whereby saving processing is completed. Furthermore, in FIG. 24, thick solid lines signify relationships about the order of execution.

Figure 25:
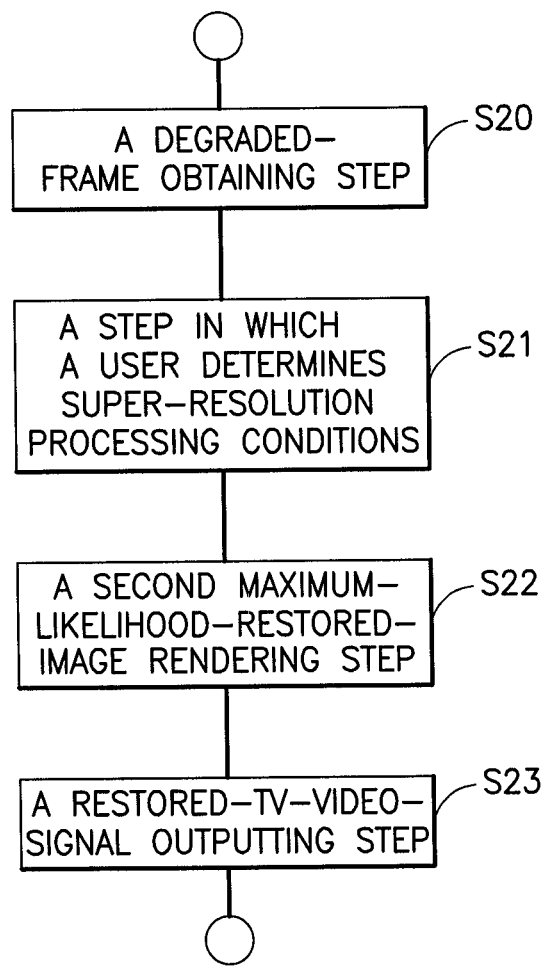
FIG. 25 is a flowchart showing an example of a processing procedure in a TV-video super-resolution processing method for an SIMD super-parallel computing device according to the present invention.

FIG. 25 is a flowchart showing an example relating to a processing procedure in a TV-video super-resolution processing method for an SIMD super-parallel computing device, which constitutes a seventh invention according to the present invention. The TV-video super-resolution processing method for an SIMD super-parallel computing device is a method of removing optical degradation from TV video by using the super-resolution processing method for an SIMD super-parallel computing device according to the first invention.

The TV-video super-resolution processing method for an SIMD super-parallel computing device, shown in FIG. 25, is characterized by including (S20) a degraded-frame obtaining step of extracting a degraded image 1 constituted of a single-frame luminance distribution from TV video signals 93, outputting, with a delay corresponding to one frame, TV video signals 94 remaining after removing single-frame signals from the TV video signals 93, storing color differences U 95 and V 96 of the degraded image 1, and then displaying the degraded image 1 on a monitor 3 while subjecting the degraded image 1 to degamma processing; (S21) a step in which a user 21 determines super-resolution processing conditions constituted of a maximum number of iterations 7 and a degradation index 22 by using an image restoring computation step constituted of steps S2 to S14 constituting the super-resolution processing method for an SIMD super-parallel computing device and in which a restored image 14 is obtained from the degraded image 1 in accordance with the super-resolution processing conditions; (S22) a second maximum-likelihood-restored-image rendering step of subjecting the restored image 14 output in the outputting step S14 of the image restoring computation step S21 to gamma processing and obtaining a maximum-likelihood restored image 15 in an RGB format from the restored image 14 and the color differences U 95 and V 96 of the degraded image 1 stored in the degraded-frame obtaining step; and (S23) a restored-TV-video-signal outputting step of combining the maximum-likelihood restored image 15 in the RGB format and the remaining TV video signals 94 into a single-frame restored TV video signal 97 and outputting the single-frame restored TV video signal 97. Furthermore, in FIG. 25, thick solid lines signify relationships about the order of execution.

An example relating to a processing procedure in the second maximum-likelihood-restored-image rendering step S22 is as follows. The second maximum-likelihood-restored-image rendering step S22 includes (S22-1) a step of subjecting a restored image 14 constituted of a luminance distribution (Y) to gamma correction; (S22-2) a step of combining the restored image 14 after the gamma correction and the color differences U 95 and V 96 into a maximum-likelihood restored image 15 in the YUV format; and (S22-3) a step of converting the maximum-likelihood restored image 15 in the YUV format into the RGB format.

Figure 26:
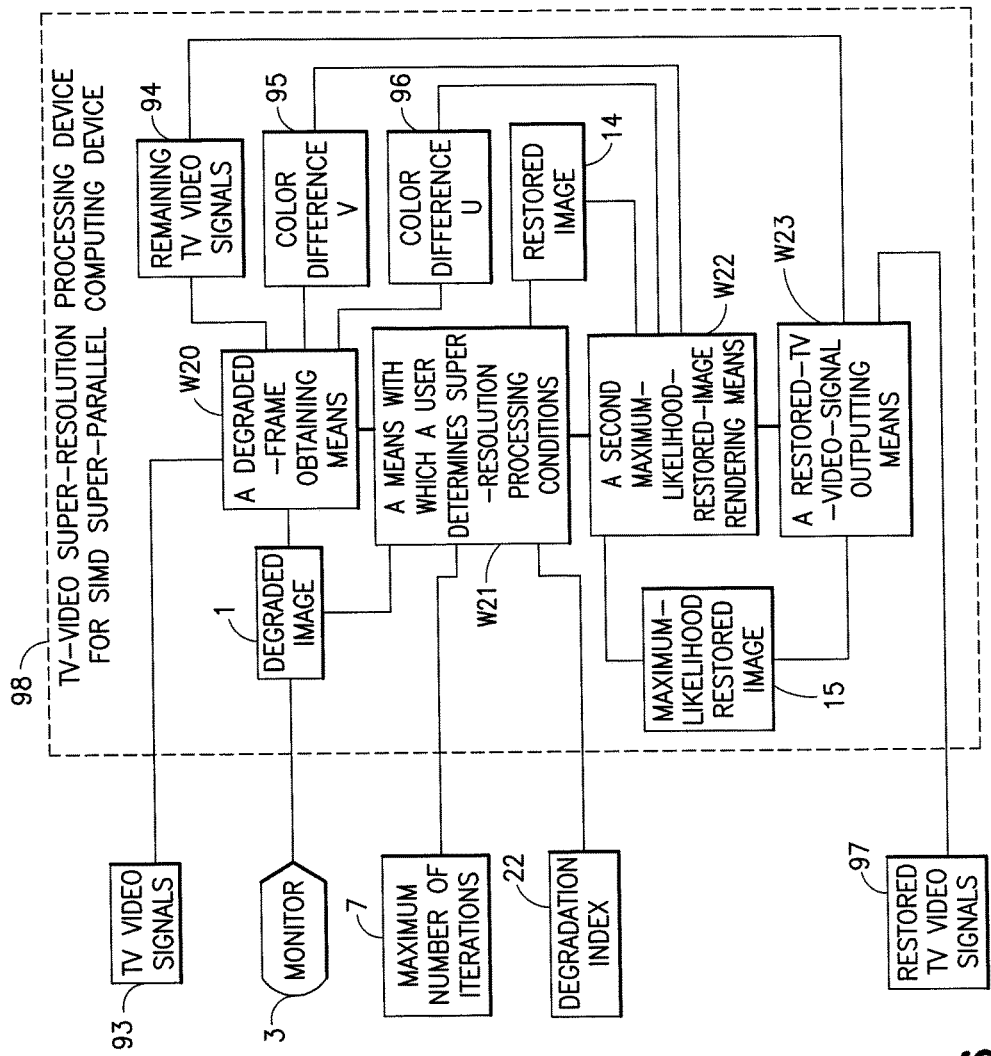
FIG. 26 is a diagram showing an example relating to the configuration of a TV-video super-resolution processing device for an SIMD super-parallel computing device according to the present invention.

FIG. 26 is a diagram showing an example relating to the configuration of a TV-video super-resolution processing device 98 for an SIMD super-parallel computing device, which constitutes an eighth invention according to the present invention. The TV-video super-resolution processing device 98 for an SIMD super-parallel computing device is a device for removing optical degradation from TV video by using the TV-video super-resolution processing method for an SIMD super-parallel computing device according to the seventh invention.

The TV-video super-resolution processing device 98 for an SIMD super-parallel computing device, shown in FIG. 26, is characterized by including (W20) a degraded-frame obtaining means for extracting a degraded image 1 constituted of a single-frame luminance distribution from TV video signals 93, outputting, with a delay corresponding to one frame, TV video signals 94 remaining after removing single-frame signals from the TV video signals 93, storing color differences U 95 and V 96 of the degraded image 1, and then displaying the degraded image 1 on a monitor 3 while subjecting the degraded image 1 to degamma processing; (W21) a means with which a user 21 determines super-resolution processing conditions constituted of a maximum number of iterations 7 and a degradation index 22 by using an image restoring computation means constituted of means W2 to W14 constituting the super-resolution processing device 50 for an SIMD super-parallel computing device and in which a restored image 14 is obtained from the degraded image 1 in accordance with the super-resolution processing conditions; (W22) a second maximum-likelihood-restored-image rendering means for subjecting the restored image 14 output from the outputting means W14 of the image restoring computation means W21 to gamma processing and obtaining a maximum-likelihood restored image 15 in an RGB format from the restored image 14 and the color differences U 95 and V 96 of the degraded image 1 stored by the degraded-frame obtaining means; and (W23) a restored-TV-video-signal outputting means for combining the maximum-likelihood restored image 15 in the RGB format and the remaining TV video signals 94 into a single-frame restored TV video signal 97 and outputting the single-frame restored TV video signal 97.

An example relating to the configuration of the second maximum-likelihood-restored-image rendering means W22 is as follows. The second maximum-likelihood-restored-image rendering means W22 includes (W22-1) a means for subjecting a restored image 14 constituted of a luminance distribution (Y) to gamma correction; (W22-2) a means for combining the restored image 14 after the gamma correction and the color differences U 95 and V 96 into a maximum-likelihood restored image 15 in the YUV format; and (W22-3) a means for converting the maximum-likelihood restored image 15 in the YUV format into the RGB format.

A ninth invention according to the present invention is a third program for causing the general-purpose computer 8 to execute the TV-video super-resolution processing method for an SIMD super-parallel computing device according to the seventh invention. The third program is written in the same language as the first program 51.

A tenth invention according to the present invention is a third storage medium characterized in that it stores the third program according to the ninth invention, in that it allows connection to the general-purpose computer 8, and in that it allows loading and execution of the third program by the general-purpose computer 8.

An eleventh invention according to the present invention is a fourth program for causing the general-purpose computer 8 to function as the TV-video super-resolution processing device for an SIMD super-parallel computing device according to the eighth invention. The fourth program is written in the same language as the first program 51.

A twelfth invention according to the present invention is a fourth storage medium characterized in that it stores the fourth program according to the tenth invention, in that it allows connection to the general-purpose computer 8, and in that it allows loading and execution of the fourth program by the general-purpose computer 8.

Embodiments

A first embodiment is the super-resolution processing device 50 for an SIMD super-parallel computing device according to the present invention. The super-resolution processing device 50 for an, SIMD super-parallel computing device is implemented virtually on the general-purpose computer 8 shown in FIG. 15 according to the second program 80. In order to implement the super-resolution processing device 50 for an SIMD super-parallel computing device on the general-purpose computer 8, first, the second program 80 is installed on the general-purpose computer 8 from the second storage medium, and then the second program 80 is executed. Then, the image-restoring-device program 81 in the second program 80 virtually implements all the means of the super-resolution processing device 50 for an SIMD super-parallel computing device in the general-purpose computer 8. Then, the super-resolution-processing-window creating program 82 in the second program 80 is activated, and then the super-resolution-processing window 24 is displayed on the monitor 3. Then, the super-resolution-processing-window monitoring program 83 is activated, and then the buttons in the super-resolution-processing window 24 and events in the image window 25 are constantly monitored, and suitable processing is executed when an event is detected. In this state, it becomes possible for the user 21 to perform all operations relating to super-resolution processing via the super-resolution-processing window 24, and the super-resolution processing device 50 for an SIMD super-parallel computing device becomes activated. In the first embodiment, a 16-GByte USB memory that allows encryption/decryption is used as the second storage medium, alternatively, an SDHC memory card that allows encryption and decryption may be used. A variety of USB memories and SDHC memory cards are mass-produced and sold by a number of manufacturers, of which any product can be used as long as it can be connected to and read by the general-purpose computer 8.

Figure 27:
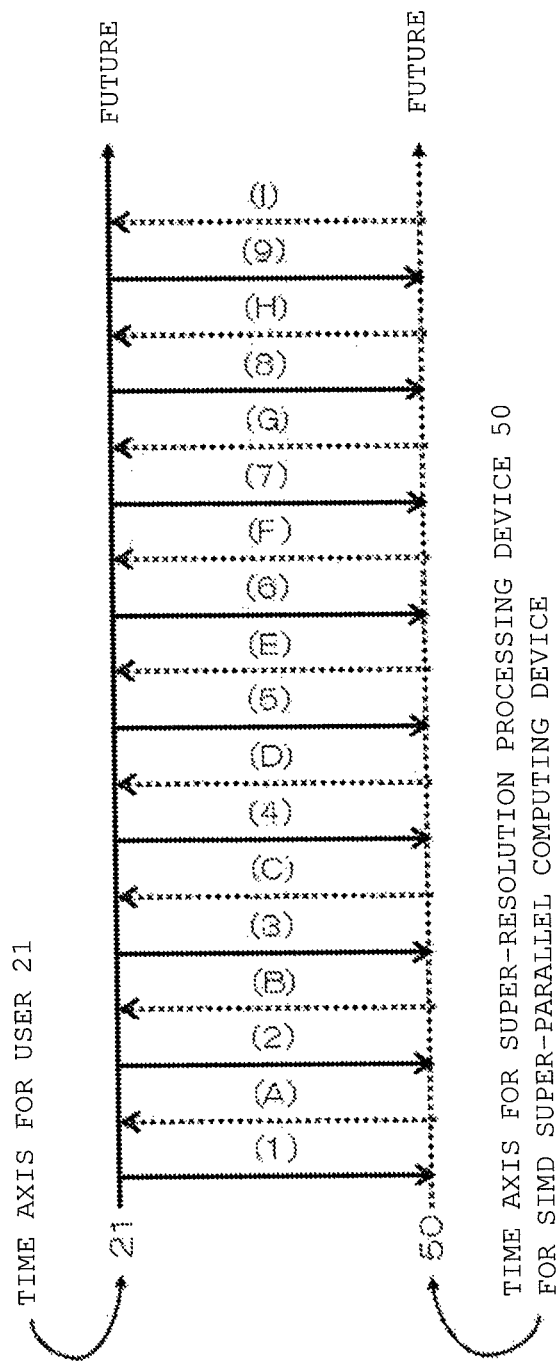
FIG. 27 is a diagram showing, in the form of a transaction table, an example of a super-resolution processing procedure in a super-resolution processing device for an SIMD super-parallel computing device of a first embodiment according to the present invention.

FIG. 27 shows, in the form of a transaction table, an example of a processing procedure in the super-resolution processing device 50 for an SIMD super-parallel computing device of the first embodiment according to the present invention. The transaction table shown in FIG. 25 is constituted of a time axis (solid line) relating to operations performed by the user 21, a time axis (dotted line) relating to responses and processing by the super-resolution processing device 50 for an SIMD super-parallel computing device, and arrows each extending in one direction from one of these time axes to the other or vice versa.

Referring to FIG. 27, the user 21 performs the following operations (solid arrows) in order to execute super-resolution processing, and responses and processing (dotted arrows) by the super-resolution processing device 50 for an SIMD super-parallel computing device are returned to the user 21. (1) The user 21 touches the icon for the super-resolution processing device 50 for an SIMD super-parallel computing device on the monitor 3 to activate the super-resolution processing device 50 for an SIMD super-parallel computing device of the general-purpose computer 8. (A) Then, the super-resolution processing device 50 for an SIMD super-parallel computing device displays the super-resolution-processing window 24 shown in FIG. 5 on the monitor 3. (2) Then, the user 21 touches the degraded-image-file designating button 29 in the super-resolution-processing window 24. Then, (B) the super-resolution processing device 50 for an SIMD super-parallel computing device opens Explorer. (3) Then, the user 21 touches and selects the degraded-image file 2 that the user 21 wishes to be handled. (C) Then, the super-resolution processing device 50 for an SIMD super-parallel computing device displays the selected degraded-image file 2 in an inverted color. (4) Then, the user 21 touches the Open button of Explorer. (D) Then, the super-resolution processing device 50 for an SIMD super-parallel computing device reads the degraded-image file 2, closes Explorer displayed on the topmost layer, and instead displays the degraded image 1 in such a way as to fit in the image window 25. (5) Then, the user 21 touches the degradation-index setting button 27 while checking the degraded image 1 in the image window 25. (E) Then, the super-resolution processing device 50 for an SIMD super-parallel computing device expands and displays the pull-down menu of the degradation-index setting button 27. (6) Then, the user 21 selects a degradation index 22 (the default value is 60 among 255 levels) suitable for the degree of degradation of the degraded image 1. (F) Then, the super-resolution processing device 50 for an SIMD super-parallel computing device reads the degradation index 22 and closes the pull-down menu of the degradation-index setting button 27. (7) Then, the user 21 touches the maximum-number-of-iterations setting button 28. (G) Then, the super-resolution processing device 50 for an SIMD super-parallel computing device opens a combo box. (8) Then, the user 21 sets a maximum number of iterations 7 (the default value is 5). (H) Then, the super-resolution processing device 50 for an SIMD super-parallel computing device records the set maximum number of iterations 7 and closes the combo box. (9) Then, the user 21 touches the super-resolution-processing start button 31. (I) Then, the super-resolution processing device 50 for an SIMD super-parallel computing device starts super-resolution processing, displays the restored image 14 side by side with the degraded image 1 in the image window 25, and terminates the procedure.

Figure 28:
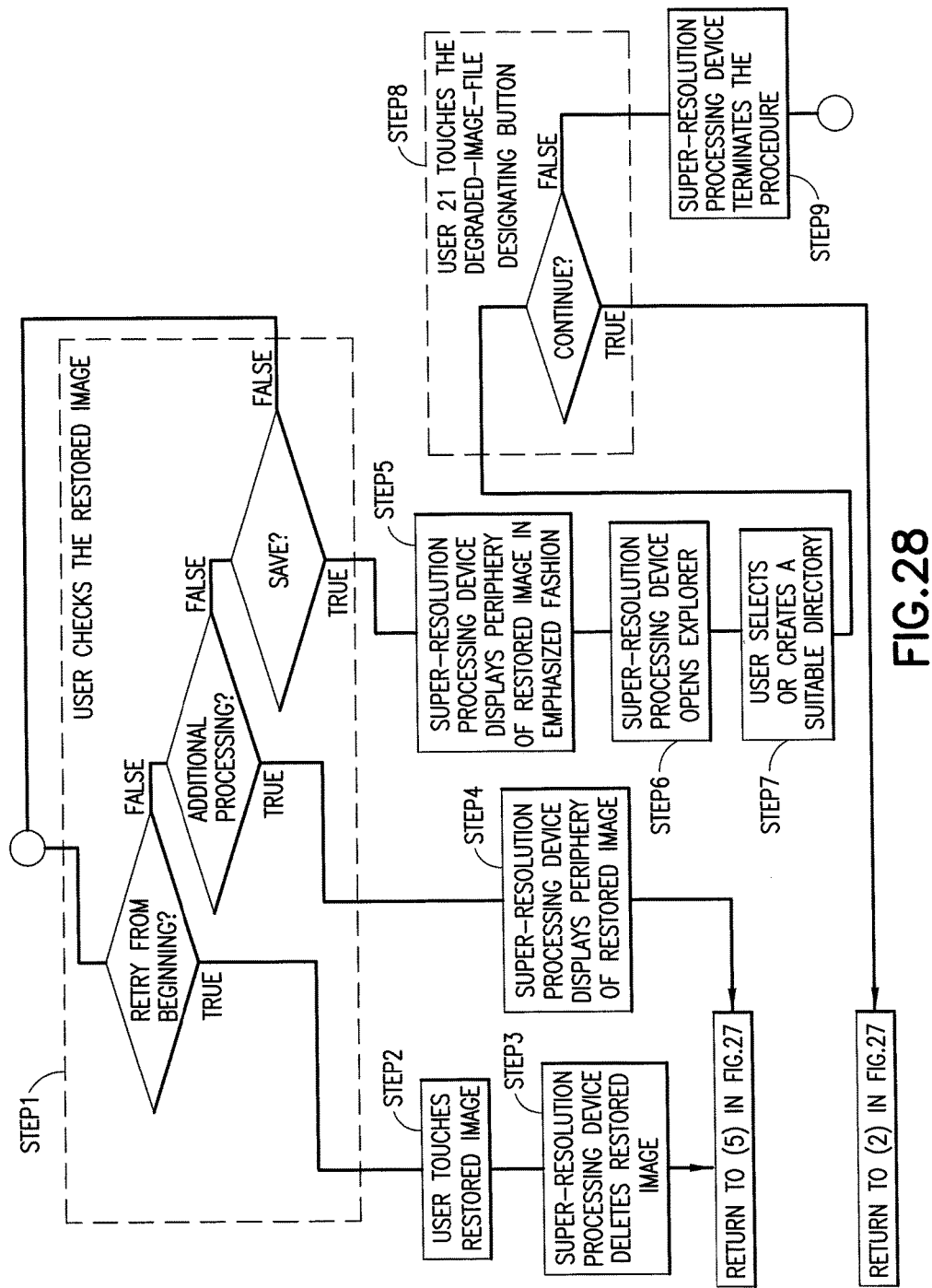
FIG. 28 is a flowchart showing an example of a processing procedure performed after super-resolution processing in the super-resolution processing device for an SIMD super-parallel computing device of the first embodiment according to the present invention.

The super-resolution-processing procedure in FIG. 27 shows the procedure until the end of super-resolution processing. After the end of super-resolution processing, processing is executed in accordance with the super-resolution-processing quality. FIG. 28 is a flowchart showing an example of a processing procedure executed after super-resolution processing. (Step 1) The user 21 checks the restored image 14 displayed in the image window 25. If the user 21 is not satisfied with the super-resolution-processing quality and wishes to execute super-resolution processing from the beginning, the user 21 proceeds to step S. If the user 21 wishes to execute additional super-resolution processing on the restored image 14, the user 21 proceeds to step 4. If the user 21 considers the super-resolution-processing quality as being good and wishes to save the result, the user 21 proceeds to step 5. (Step 2) If the user 21 is not satisfied with the super-resolution-processing quality, the user 21 touches the restored image 14 in the image window 25. Then, the super-resolution processing device 50 for an SIMD super-parallel computing device displays the periphery of the restored image 14 in the image window 25 in an emphasized fashion. (Step 3) When the user 21 presses the Delete button on the keyboard 48, the super-resolution processing device 50 for an SIMD super-parallel computing device deletes the restored image 14. Then, the user 21 touches the degradation-index setting button 27 in the super-resolution-processing window 24 and then returns to (5) shown in FIG. 27. (Step 4) If the user 21 considers that much noise is contained, the user 21 touches the restored image 14 in order to execute an additional iteration. Then, the super-resolution processing device 50 for an SIMD super-parallel computing device displays the periphery of the restored image 14 in the image window 25 in an emphasized fashion. Then, the user 21 touches the degradation-index setting button 27 in the super-resolution-processing window 24 and then returns to (5) shown in FIG. 27. (Step 5) When the user 21 touches and selects the restored image 14 in the image window 25, the super-resolution processing device 50 for an SIMD super-parallel computing device displays the periphery of the restored image 14 in the image window 25 in an emphasized fashion. (Step 6) When the user 21 touches the degradedimage-file designating button 29, the super-resolution processing device 50 for an SIMD super-parallel computing device opens Explorer. (Step 7) The user 21 selects or creates a suitable directory, enters a filename, selects an image file format, such as bmp, ttf, dib, or jpg, and touches "Save" in Explorer. Then, the super-resolution processing device 50 for an SIMD super-parallel computing device saves the restored image 14 as a maximum-likelihood-restored-image file 16 in the suitable directory, closes Explorer displayed in the topmost layer, and displays the super-resolution-processing window 24 in which the restored image 14 and the degraded image 1 are displayed side by side. (Step 8) If the user 21 wishes to continue super-resolution processing, the user 21 touches the degraded-image-file designating button 29 in the super-resolution-processing window 24 and returns to (2) shown in FIG. 27. On the other hand, if the user 21 wishes to quit super-resolution processing, close the super-resolution-processing window 24, and deactivate the super-resolution processing device 50 for an SIMD super-parallel computing device, the user 21 proceeds to step 9. (Step 9) When the user 21 touches the close button 38, the super-resolution processing device 50 for an SIMD super-parallel computing device safely closes all the open files, releases the memory area, and terminates the procedure.

With the super-resolution processing device 50 for an SIMD super-parallel computing device, enlarging/reducing images does not affect super-resolution processing, and only the size of the image in the image window 25 is enlarged/reduced. Thus, the user 21 proceeds to super-resolution processing without changing the magnification factor.

While checking the degraded image 1 in the image window 25, the user 21 touches the degradation-index setting button 27, and selects 30 among the 255 levels (the default value is 60) as a degradation index 22 suitable for the degree of degradation of the degraded image 1. Then, the user 21 touches the maximum-number-of-iterations setting button 28 and sets 2 (the default value is 5) as a maximum number of iterations 7. Then, the user 21 touches the super-resolution-processing start button 31 to start super-resolution processing. Then, the restored image 14 is immediately displayed in the image window 25 side by side with the degraded image 1. The user 21 confirms this and considers that the result of super-resolution processing is satisfactory. Then, the user 21 touches the restored image 14 in the image window 25, then touches the degraded-image-file designating button 29, opens Explorer, selects or creates a suitable directory, then enters a filename, selects an image file format, such as bmp, ttf, dib, or jpg, and touches "Save" in Explorer. Then, the restored image 14 is saved in the suitable directory as a maximum-likelihood-restored-image file 16, Explorer displayed in the topmost layer is closed, and the super-resolution-processing window 24 showing the restored image 14 and the degraded image side by side is displayed.

Figure 29:
FIG. 29 is a drawing showing an example for verification of the effect of super-resolution processing by the super-resolution processing device for an SIMD super-parallel computing device of the first embodiment according to the present invention.

FIG. 29 is a drawing showing an example for verifying the super-resolution effect attained by the super-resolution processing device 50 for an SIMD super-parallel computing device of the first embodiment according to the present invention. Referring to FIG. 29, an image (left) captured by using an endoscope was subjected to super-resolution processing by the super-resolution processing device 50 for an SIMD super-parallel computing device through two iterations with a degradation index 22 of 40 and a maximum number of iterations 7 of 2, whereby a restored image (right) was obtained. It is understood that tissue details, blood vessels, etc., which were not clear in the image on the left side, were sharply restored in the restored image on the right side. That is, an adequate image restoring effect and super-resolution effect were attained.

Figure 30:
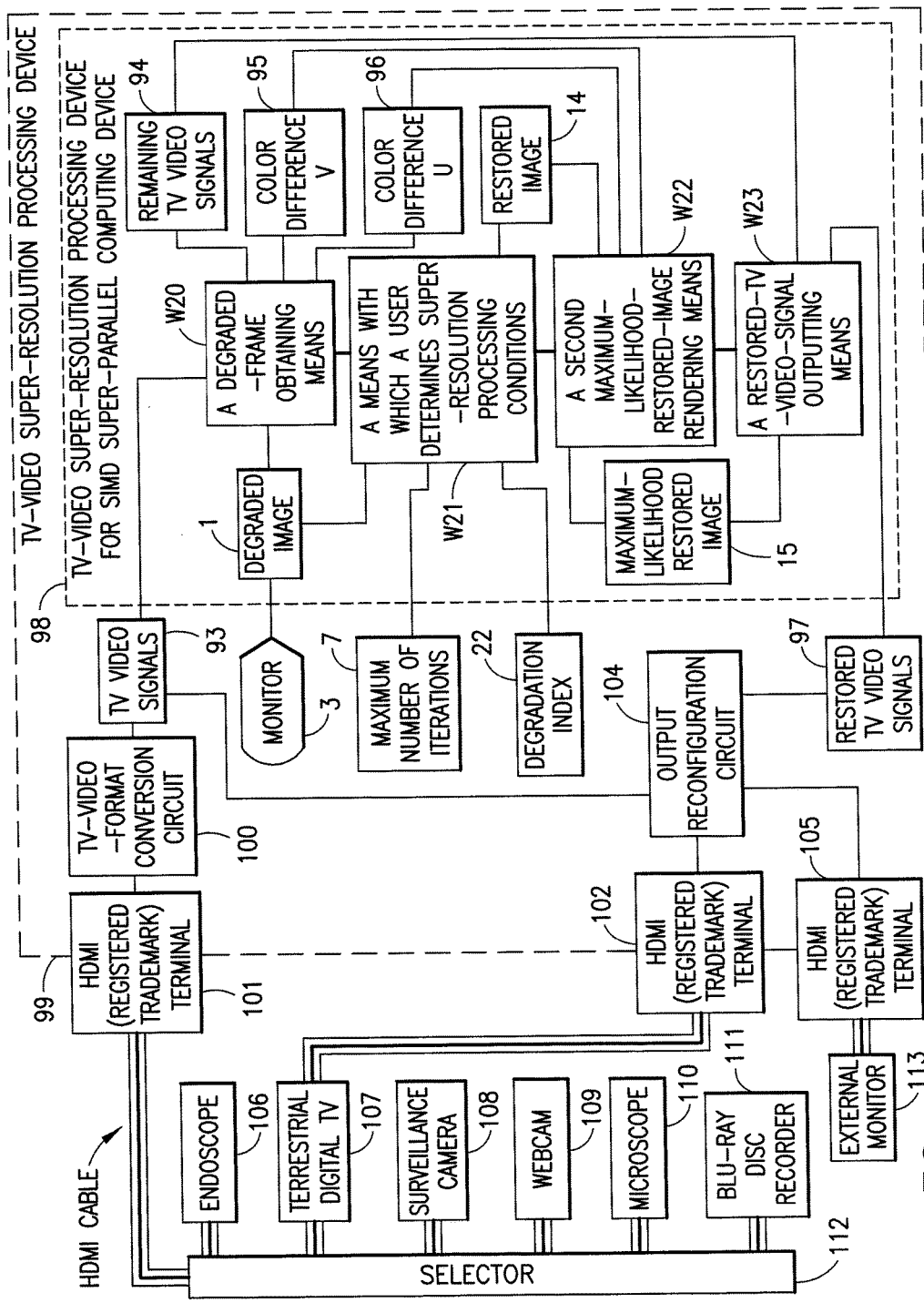
FIG. 30 is a diagram showing an example relating to the configuration of a TV-video super-resolution processing device of a second embodiment according to the present invention.

A second embodiment is a TV-video super-resolution processing device 99, which is an application of the TV-video super-resolution processing device 98 for an SIMD super-parallel computing device according to the present invention. FIG. 30 is a diagram showing an example relating to the configuration of the TV-video super-resolution processing device 99. The TV-video super-resolution processing device 99 shown in FIG. 30 is formed by adding, to the TV-video super-resolution processing device 98 for an SIMD super-parallel computing device, a TV-video-format conversion circuit 100 that receives digital TV video signals from an HDMI (registered trademark) terminal 101, that automatically determines whether the digital TV video signals are interlaced or progressive, and that always outputs progressive digital TV video signals 93; the HDMI (registered trademark) terminal 101 for receiving digital TV video signals; an output-image-mode selecting button 103 for designating the display mode of the degraded image 1 and the maximum-likelihood restored image 15, provided in the super-resolution-processing window 24; an output reconfiguration circuit 104 that outputs, by using TV video signals 93 and a restored TV video signal 97, the restored TV video signal 97 in which the display layout of the degraded image 1 and the maximum-likelihood restored image 15 is adjusted according to the display mode selected by using the output-image-mode selecting button 103; an output HDMI (registered trademark) terminal 102 for outputting the restored TV video signal 97; and an HDMI (registered trademark) terminal 105 serving as an output terminal for an external monitor, to which the output to the HDMI (registered trademark) terminal 102 is distributed. Super-resolution processing is executed on a per-frame basis to output the restored TV video signal 97 to the HDMI (registered trademark) terminal 102.

Referring to FIG. 30, an endoscope 106, a terrestrial digital TV 107, a surveillance camera 108, a webcam 109, a microscope 110, and a Blu-ray disc recorder 111 are connected, as TV-video input sources, to the TV-video-format conversion circuit 100 via a selector 112, an HDMI (registered trademark) cable, and the HDMI (registered trademark) terminal 101. Furthermore, an external monitor 113 is connected, as a monitor, to the HDMI (registered trademark) terminal 105. Furthermore, the terrestrial digital TV 107 is connected to the HDMI (registered trademark) terminal 102. Furthermore, it is also possible to constantly monitor the degraded image 1 and the maximum-likelihood restored image 15 on the monitor 3.

The output-image-mode selecting button 103 is newly added to the super-resolution-processing window 24 in the TV-video super-resolution processing device 98 for an SIMD super-parallel computing device. Each time this button is clicked on, the output image mode changes as follows: "Mode 1: Display the degraded image 1 and the maximum-likelihood restored image 15 side by side"→"Mode 2: Display only the degraded image 1"→"Mode 3: Display only the maximum-likelihood restored image 15"→Mode 1. Furthermore, the setting of the output-image-mode selecting button can be changed anytime, even during super-resolution processing, similarly to other buttons.

In order to implement the TV-video super-resolution processing device 98 for an SIMD super-parallel computing device, the fourth storage medium is connected to the general-purpose computer 8, and the fourth program is read and installed. Then, an icon for activating the TV-video super-resolution processing device 98 for an SIMD super-parallel computing device is displayed on the monitor 3. Then, the user 21 can activate the fourth program to virtually implement and activate the TV-video super-resolution processing device 98 for an SIMD super-parallel computing device anytime just by clicking on the icon for activating the TV-video super-resolution processing device 98 for an SIMD super-parallel computing device. When the user 21 clicks on the icon for activating the TV-video super-resolution processing device 98 for an SIMD super-parallel computing device, first, a TV-video super-resolution-processing-device program in the fourth program is activated, whereby all the means of the TV-video super-resolution processing device 98 for an SIMD super-parallel computing device are virtually implemented in the general-purpose computer 8. Then, a super-resolution-processing-window creating program in the fourth program is activated, whereby the super-resolution-processing window 24 is displayed on the monitor 3. Then, a super-resolution-processing-window monitoring program is activated. Then, buttons in the super-resolution-processing window 24 and events in the image window 25 are constantly monitored, and suitable processing is executed when an event is detected. Thus, the user 21 can perform all operations relating to super-resolution processing via the super-resolution-processing window 24. That is, the TV-video super-resolution processing device 98 for an SIMD super-parallel computing device becomes activated. The procedure for activating the TV-video super-resolution processing device 98 for an SIMD super-parallel computing device is the same as the procedure shown in FIG. 27, and the operational procedure performed after super-resolution processing is also the same as the procedure shown in FIG. 28. In the image window 25, degraded video constituted of successive degraded images 1 and restored video constituted of successive restored images 14 are displayed side by side. This makes it possible to check the status during restoration computation in the image window 25.

The TV-video-format conversion circuit 100 and the output reconfiguration circuit 104 are implemented in hardware by using FPGAs (Field Programmable Gate Arrays) and required high-frequency ICs (Integrated Circuits). The TV-video-format conversion circuit 100 and the output reconfiguration circuit 104 can operate anytime when electric power is supplied thereto, and can execute processing in cooperation with the activated TV-video super-resolution processing device 98 for an SIMD super-parallel computing device, constituting the TV-video super-resolution processing device 99. This configuration enables super-resolution processing substantially in real time.

The selector 112 has a plurality of input HDMI (registered trademark) terminals and one or more output HDMI (registered trademark) terminals. The selector 112 is a device that enables noiseless input switching to any one of the TV-video input sources, such as the endoscope 106 or the terrestrial digital TV 107, by way of manual switching using a dedicated commander or by way of automatic switching according to instructions from the general-purpose computer 8. A variety of products of this kind are sold from a number of manufacturers, of which any product can be used.

The super-resolution-processing ability of the TV-video super-resolution processing device 99 of the second embodiment can be evaluated by extracting one frame of the TV video signals 93 and the corresponding restored TV video signal 97. The result in an example of such evaluation did not differ from the result shown in FIG. 29.

INDUSTRIAL APPLICABILITY

The present invention is applicable to any application that utilizes TV video. Thus, the present invention can be utilized in the precision equipment industry and electronics industry that develop and manufacture video cameras and digital cameras, the software industry involving applications, games, etc., the medical equipment industry involving endoscopes, MRI, etc., the information equipment industry involving monitors, etc., the anti-disaster and anti-crime equipment industry involving surveillance cameras, etc., the archiving industry, etc.

REFERENCE SIGNS LIST

1 Degraded image
2 Degraded-image file
3 Monitor
4 PSF
5 Restored-image initial values
6 Corrected-restored-image initial values
7 Maximum number of iterations
8 General-purpose computer
9 Counter I
10 PSF size
11 SIMD super-parallel computational processing device
12 Execution-data storage areas
13 Computation data
14 Restored image
15 Maximum-likelihood restored image
16 Maximum-likelihood-restored-image file
17 RGB degraded image
18 Y degraded image
19 U degraded image
20 V degraded image
21 User
22 Degradation index
23 PSF database
24 Super-resolution-processing window
25 Image window
26 Information window
27 Degradation-index setting button
28 Maximum-number-of-iterations setting button
29 Degraded-image-file designating button
30 Maximum-likelihood-restored-image-file saving button
31 Super-resolution-processing start button
32 Super-resolution-processing suspend button
33 Super-resolution-processing resume button
34 Super-resolution-processing stop button
35 Help button
36 Image enlarge/reduce button
37 Image-display-mode designating button
38 Close button
39 First dataset
40 Second dataset
41 First cumulative-sum computation area
42 Second cumulative-sum computation area
43 Cumulative-sum computation area
44 Addition dataset
45 Restored-image-pixel-value area
46 Coordinates (x, y) of pixels of restored-image initial values
47 Temporary restored-pixel saving area
48 Keyboard
49 ESC (escape) button
50 Image restoring device for SIMD super-parallel computational processing device
51 First program
52 Storage area
53 HDD
54 Large-capacity, high-speed memory 55 CPU
56 Peripheral circuit
57 Communication I/O circuit
58 Video accelerator circuit
59 Bidirectional bus
60 Combo disk module
61 Memory slot
62 Power supply circuit
63 Cooling device
64 LAN terminal
65 USB terminal
66 USB terminal
67 USB terminal
68 Mouse
69 Windows (registered trademark) 8 O/S
70 Visual Studio 2000 (registered trademark)
71 Office 2013 (registered trademark)
72 Wireless module
73 Speaker
74 Microphone
75 Power supply switch
76 Power supply cable
77 USB terminal cable
78 MDMI cable
79 Development environment: High-performance Embedded Workshop software
80 Second program
81 Image-restoring-device program
82 Super-resolution-processing-window creating program
83 Super-resolution-processing-window monitoring program
84 RGB-image storage area
85 Y-degraded-image storage area
86 U-degraded-image storage area
87 V-degraded-image storage area
88 Degraded-image storage area
89 PSF storage area
90 Restored-image-initial-value storage area
91 Corrected-restored-image-initial-value storage area
92 Restored-image storage area
93 TV video signals
94 Remaining TV video signals
95 Color difference V
96 Color difference U
97 Restored TV video signals
98 TV-video super-resolution processing device for SIMD super-parallel computing device
99 TV-video super-resolution processing device
100 TV-video-format conversion circuit
101 HDMI (registered trademark) terminal
102 HDMI (registered trademark) terminal
103 Output-image-mode selecting button
104 Output reconfiguration circuit
105 HDMI (registered trademark) terminal
106 Endoscope
107 Terrestrial digital TV
108 Surveillance camera
109 Webcam
110 Microscope
111 Blu-ray disc recorder
112 Selector
113 External monitor
114 Maximum-likelihood-restored-image storage area
(1) to (9) Operations by user 21
(A) to (I) Responses and processing by super-resolution processing device 50 for SIMD super-parallel computing device
1-$x$-$y$ Label
2-$x$-$y$ Label
F-$x1$-$y1$ Label
Cl Vertical-size corrected value
Cw Horizontal-size corrected value
Explorer Explorer
F(x, y) Pixels of restored-image initial values
FC(i, j) Pixels of corrected-restored-image initial values
G(x, y) Pixels of degraded image
H(i, j) Pixels of degraded image
HL Vertical PSF size
HW Horizontal PSF size
I Variable
I_max Variable
x Variable
x1 Variable
y Variable
y1 Variable
Steps 1 to 9 Steps
S1 Degraded-image preparing step
S1-1 RGB-degraded-image extracting step
S1-2 YUV conversion step
S1-3 Degamma step
S1-4 Degraded-image displaying step
S2 PSF preparing step
S2-1 Degradation-index setting step
S2-2 PSF extracting step
S3 Restored-image-initial-value preparing step
S4 Maximum-number-of-iterations setting step
S5 I resetting step
S6 PSF-size obtaining step
S7 Restored-image-initial-value correcting step
S7-1 H-size calculating step
S7-2 Corrected-value computing step
S7-3 First F correcting step
S7-4 Second F correcting step
S7-5 Third F correcting step
S7-6 Fourth F correcting step
S8 Data preparing step
S8-1 to S8-9 Steps
S9 Image restoring step
S9-1 to S9-5 Steps
S10 I incrementing step
S11 I determining step
S12 Substituting step
S13 Jumping step
S14 Outputting step
S15 Maximum-likelihood-restored-image rendering step
S15-1 to S15-4 Steps
S16 File rendering step
S16-1 to S16-12 Steps
S17 Storing step
S20 to S23 Steps
W1 Degraded-image preparing means
W1-1 RGB-degraded-image extracting means
W1-2 YUV conversion means
W1-3 Degamma means
W1-4 Degraded-image displaying means
W2 PSF preparing means
W2-1 Degradation-index setting means
S2-2 PSF extracting means W3 Restored-image-initial-value preparing means
W4 Maximum-number-of-iterations setting means
W5 I resetting means
W6 PSF-size obtaining means
W6-1 H-size calculating means
W6-2 Corrected-value computing means
W7 Restored-image-initial-value correcting means
W7-1 First F correcting means
W7-2 Second F correcting means
W7-3 Third F correcting means
W7-4 Fourth F correcting means
W8 Data preparing means
W8-1 to W8-9 Means
W9 Image restoring means
W10 I incrementing means
W11 I determining means
W12 Substituting means
W13 Jumping means
W14 Outputting means
W15 Maximum-likelihood-restored-image rendering means
W15-1 to W15-4 Means
W16 File rendering means
W16-1 to W16-12 Means
W17 Storing means
W20 Degraded-frame obtaining means
W21 to W23 Means

The invention claimed is:

1. A TV-video super-resolution processing method for a Single Instruction Multiple Data (SIMD) super-parallel computing device, in which optical degradation in TV video is reduced substantially in real time by using a super-resolution processing method for an SIMD super-parallel computing device to restore the TV video to TV video that is close to the pre-degradation TV video, wherein, in the super-resolution processing method for an SIMD super-parallel computing device, a general-purpose computer assigns some computations to an SIMD super-parallel computational processing device according to a first program written in a language that can be executed, loaded, and decoded, thereby reducing optical degradation included in a degraded image substantially in real time, whereby the degraded image is restored to an image that is close to the pre-degradation image, the super-resolution processing method for an SIMD super-parallel computing device being characterized by comprising:

(S1) a degraded-image preparing step of preparing, from a designated degraded-image file, a degraded image constituted of a luminance distribution and displaying the degraded image on a monitor;

(S2) a PSF (Point Spread Function) preparing step of identifying a PSF suitable for a degradation state of the degraded image while the monitor is being viewed;

(S3) a restored-image-initial-value preparing step of copying the degraded image and setting the degraded image as restored-image initial values;

(S4) a maximum-number-of-iterations setting step of setting a maximum number of iterations with the general-purpose computer;

(S5) an I resetting step of resetting a counter I that counts the number of iterations by setting the counter I to 0;

(S6) a PSF-size obtaining step of obtaining the size of the PSF to obtain a PSF size;

(S7) a restored-image-initial-value correcting step of copying the restored-image initial values and setting the restored-image initial values as corrected-restored-image initial values, then calculating, from the PSF size, a region that becomes an excluded region when the PSF is convolved with the corrected-restored-image initial values, and pasting the region in mirror symmetry to the outside of the corrected-restored-image initial values, thereby correcting the corrected-restored-image initial values;

(S8) a data preparing step of creating and preparing computation data such that datasets for one iteration can be assigned with maximum efficiency in an execution-data storage area in the SIMD super-parallel computational processing device;

(S9) an image restoring step of transferring the computation data to the execution-data storage area in the SIMD super-parallel computational processing device and executing computation to obtain a restored image;

(S10) an I incrementing step of incrementing the counter I by 1;

(S11) an I determining step of testing a hypothesis that the value of the counter I is greater than or equal to the maximum number of iterations, proceeding to (S12) if the test result is false, and proceeding to (S14) if the test result is true;

(S12) a substituting step of substituting the restored image for the restored-image initial values;

(S13) a jumping step of returning to step (S7);

(S14) an outputting step of outputting the restored image;

(S15) a maximum-likelihood-restored-image rendering step of obtaining a maximum-likelihood restored image in an RGB format from the degraded-image file and the restored image;

(S16) a file rendering step of rendering the maximum-likelihood restored image into a maximum-likelihood-restored-image file; and (S17) a storing step of storing the maximum-likelihood-restored-image file in a designated storage area;

wherein the TV-video super-resolution processing method for an SIMD super-parallel computing device being characterized by comprising:

(S18) a degraded-frame obtaining step of extracting a degraded image constituted of a single-frame luminance distribution from TV video signals, outputting, with a delay corresponding to one frame, TV video signals remaining after removing single-frame signals from the TV video signals, storing color differences U and V of the degraded image, and then displaying the degraded image on a monitor while subjecting the degraded image to degamma processing;

(S19) a step in which a user determines super-resolution processing conditions constituted of a maximum number of iterations and a degradation index by using an image restoring computation step constituted of steps S2 to S14 constituting the super-resolution processing method for an SIMD super-parallel computing device and in which a restored image is obtained from the degraded image in accordance with the super-resolution processing conditions;

(S20) a second maximum-likelihood-restored-image rendering step of subjecting the restored image output in the outputting step of the image restoring computation step to gamma processing and obtaining a maximum-likelihood restored image in an RGB format from the restored image and the color differences U and V of the degraded image stored in the degraded-frame obtaining step; and (S21) a restored-TV-video-signal outputting step of combining the maximum-likelihood restored image in the RGB format and the remaining TV video signals into a single-frame restored TV video signal and outputting the single-frame restored TV video signal.

2. A first program stored on a non-transitory computer readable medium for causing the general-purpose computer to execute the super-resolution processing method for an SIMD super-parallel computing device according to claim 1.

3. A program stored on a non-transitory computer readable medium for causing the general-purpose computer to execute the TV-video super-resolution processing method for an SIMD super-parallel computing device according to claim 1.

4. A TV-video super-resolution processing device for an SIMD super-parallel computing device, in which optical degradation in TV video is reduced substantially in real time in accordance with the TV-video super-resolution processing method for an SIMD super-parallel computing device according to claim 1 to restore the TV video to TV video that is close to the pre-degradation TV video, the TV-video super-resolution processing device for an SIMD super-parallel computing device being characterized by comprising:

a degraded-frame obtaining means for extracting a degraded image constituted of a single-frame luminance distribution from TV video signals, outputting, with a delay corresponding to one frame, TV video signals remaining after removing single-frame signals from the TV video signals, storing color differences U and V of the degraded image, and then displaying the degraded image on a monitor while subjecting the degraded image to degamma processing;

a means with which the user determines the super-resolution processing conditions constituted of the maximum number of iterations and the degradation index by using an image restoring computation means with which a restored image is obtained from the degraded image in accordance with the super-resolution processing conditions;

a second maximum-likelihood-restored-image rendering means for subjecting the restored image output from the outputting means of the image restoring computation means to gamma processing and obtaining a maximum-likelihood restored image in an RGB format from the restored image and the color differences U and V of the degraded image stored by the degraded-frame obtaining means; and a restored-TV-video-signal outputting means for combining the maximum-likelihood restored image in the RGB format and the remaining TV video signals into a single-frame restored TV video signal and outputting the single-frame restored TV video signal;

wherein the image restoring computation means comprises:

(W2) a PSF preparing means for identifying a PSF suitable for a degradation state of the degraded image while the monitor is being viewed;

(W3) a restored-image-initial-value preparing means for copying the degraded image and setting the degraded image as restored-image initial values;

(W4) a maximum-number-of-iterations setting means for setting a maximum number of iterations with the general-purpose computer;

(W5) an I resetting means for resetting a counter I that counts the number of iterations by setting the counter I to 0;

(W6) a PSF-size obtaining means for obtaining the size of the PSF to obtain a PSF size;

(W7) a restored-image-initial-value correcting means for copying the restored-image initial values and setting the restored-image initial values as corrected-restored-image initial values, then calculating, from the PSF size, a region that becomes an excluded region when the PSF is convolved with the corrected-restored-image initial values, and pasting the region in mirror symmetry to the outside of the corrected-restored-image initial values, thereby correcting the corrected-restored-image initial values;

(W8) a data preparing means for creating and preparing computation data such that datasets for one iteration can be assigned with maximum efficiency in execution-data storage areas in the SIMD super-parallel computational processing device;

(W9) an image restoring means for transferring the computation data to the execution-data storage areas in the SIMD super-parallel computational processing device and executing computation to obtain a restored image;

(W10) an I incrementing means for incrementing the counter I by 1;

(W11) an I determining means for testing a hypothesis that the value of the counter I is greater than or equal to the maximum number of iterations, proceeding to (W12) if the test result is false, and proceeding to (W14) if the test result is true;

(W12) a substituting means for substituting the restored image for the restored-image initial values;

(W13) a jumping means for returning to means (W7); and (W14) an outputting means for outputting the restored image.

5. A program stored on a non-transitory computer readable medium for causing the general-purpose computer to function as the TV-video super-resolution processing device for an SIMD super-parallel computing device according to claim 4.

* * * * *